(12) United States Patent
Fountain, III

(10) Patent No.: US 10,974,638 B2
(45) Date of Patent: Apr. 13, 2021

(54) RATCHETLESS TIE-DOWN ASSEMBLIES AND RELATED METHODS

(71) Applicant: Fred Liden Fountain, III, Holcomb, MS (US)

(72) Inventor: Fred Liden Fountain, III, Holcomb, MS (US)

(73) Assignee: Midsouth Cargo Control LLC, Greenwood, MS (US)

( * ) Notice: Subject to any disclaimer, the term of this patent is extended or adjusted under 35 U.S.C. 154(b) by 0 days.

(21) Appl. No.: 16/410,790

(22) Filed: May 13, 2019

(65) Prior Publication Data

US 2019/0344701 A1 Nov. 14, 2019

Related U.S. Application Data

(60) Provisional application No. 62/670,009, filed on May 11, 2018.

(51) Int. Cl.
*B60P 7/08* (2006.01)
*A44B 11/12* (2006.01)
(Continued)

(52) U.S. Cl.
CPC .......... *B60P 7/0838* (2013.01); *A44B 11/125* (2013.01); *B25B 25/00* (2013.01); *B60P 7/0869* (2013.01); *B65D 63/16* (2013.01); *F16G 11/12* (2013.01); *Y10T 24/1424* (2015.01); *Y10T 24/2121* (2015.01); *Y10T 24/2147* (2015.01); *Y10T 24/2175* (2015.01)

(58) Field of Classification Search
CPC . Y10T 24/2175; Y10T 24/2143; Y10T 24/21; Y10T 24/2145; Y10T 24/2157; Y10T 24/2191; Y10T 24/2192; Y10T 24/2196; B60P 7/0838; A44B 11/125; A44B 11/14
See application file for complete search history.

(56) References Cited

U.S. PATENT DOCUMENTS 3,180,623 A 4/1965 Huber
3,679,175 A 7/1972 Drayton
(Continued)

FOREIGN PATENT DOCUMENTS

EP 0 311 828 A2 4/1989
WO 2009102330 A1 8/2009

OTHER PUBLICATIONS

International Search Report and Written Opinion, PCT/US2019/032031, dated Jul. 31, 2019 (13 pp.).

*Primary Examiner* — Robert Sandy
*Assistant Examiner* — Michael S Lee
(74) *Attorney, Agent, or Firm* — Eversheds Sutherland (US) LLP

(57) ABSTRACT

Tie-down assemblies and methods of their use are provided. In one embodiment, a tie-down assembly may include a buckle, a first strap, and a second strap. The buckle may include a frame, a handle pivotably attached to the frame and configured to pivot about a first axis between an open position and a closed position, and a drum rotatably attached to the handle and configured to rotate about a second axis, wherein the second axis is spaced apart from and extends parallel to the first axis. The first strap may be attached to the frame, and the second strap may be configured to removably attach to the drum.

35 Claims, 36 Drawing Sheets

(51) Int. Cl.
*B25B 25/00* (2006.01)
*B65D 63/16* (2006.01)
*F16G 11/12* (2006.01)

(56) References Cited

U.S. PATENT DOCUMENTS

| | | |
|---|---|---|
| 4,573,842 A | 3/1986 | Mantela et al. |
| 5,611,520 A * | 3/1997 | Soderstrom ............. B60P 7/083 |
| | | 24/68 CD |
| 6,158,092 A | 12/2000 | Huang |
| 6,195,848 B1 | 3/2001 | Jackson et al. |
| 6,637,077 B2 | 10/2003 | Doty |
| 8,099,836 B2 | 1/2012 | Breeden et al. |
| 9,242,592 B1 | 1/2016 | Meszaros |
| 9,266,462 B2 | 2/2016 | Miller |
| 9,376,050 B1 | 6/2016 | Gill |
| 9,623,788 B2 | 4/2017 | Eenigenburg et al. |
| 9,725,029 B2 | 8/2017 | Chou |
| 9,751,450 B1 | 9/2017 | Zhou |
| 9,878,653 B2 | 1/2018 | Roe |
| 10,086,745 B2 | 10/2018 | Gill |
| 10,414,323 B2 | 9/2019 | Willodson |
| 2003/0131451 A1* | 7/2003 | Brown ................ A44B 11/125 |
| | | 24/68 CD |
| 2005/0283951 A1* | 12/2005 | Chang .................. A44B 11/125 |
| | | 24/68 CD |
| 2006/0026803 A1* | 2/2006 | Chang .................. B60P 7/0838 |
| | | 24/68 CD |
| 2007/0193001 A1* | 8/2007 | Huang ................. A44B 11/065 |
| | | 24/71 ST |
| 2007/0283540 A1* | 12/2007 | Chang .................. B60P 7/0838 |
| | | 24/68 CD |
| 2009/0106957 A1* | 4/2009 | Chang .................... B25B 25/00 |
| | | 24/68 CD |
| 2009/0126171 A1* | 5/2009 | Gopal .................. B60P 7/0838 |
| | | 24/68 CD |
| 2009/0133234 A1* | 5/2009 | Chang .................. B60P 7/0838 |
| | | 24/68 CD |
| 2010/0000061 A1 | 1/2010 | Gopal et al. |
| 2011/0316208 A1 | 12/2011 | Hancock |
| 2013/0326847 A1* | 12/2013 | Zheng .................. B60P 7/0846 |
| | | 24/68 CD |
| 2015/0063937 A1 | 3/2015 | Brewster et al. |
| 2015/0191114 A1* | 7/2015 | Blankenship ......... B60P 7/0838 |
| | | 24/69 CT |
| 2016/0016502 A1 | 1/2016 | Durand |
| 2016/0159268 A1 | 6/2016 | Davies et al. |
| 2018/0141479 A1 | 5/2018 | Anderson |
| 2019/0077295 A1 | 3/2019 | Gill |

\* cited by examiner

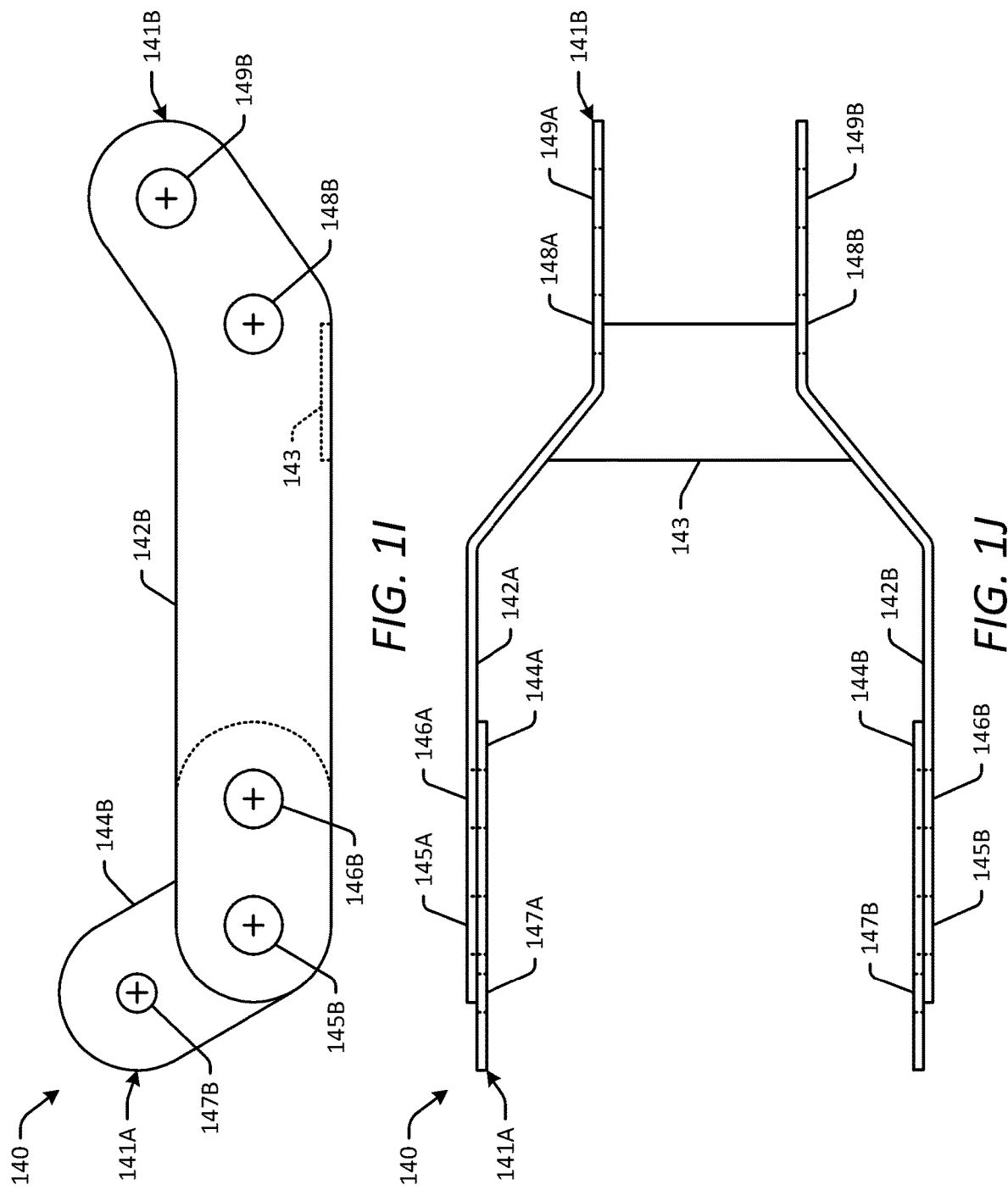

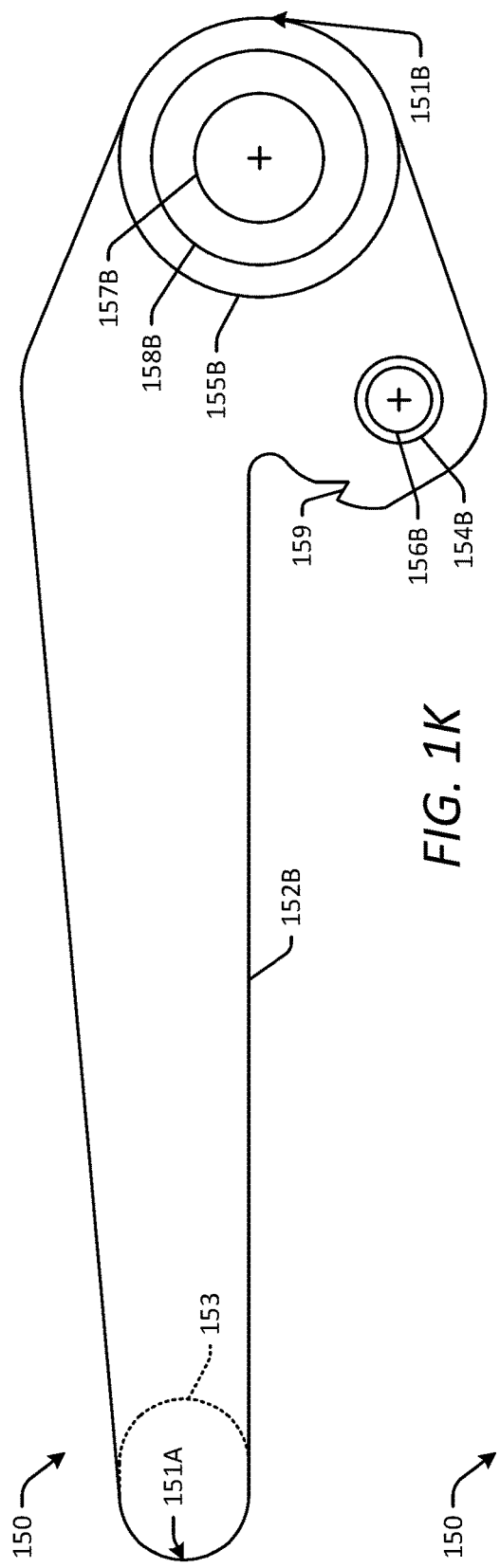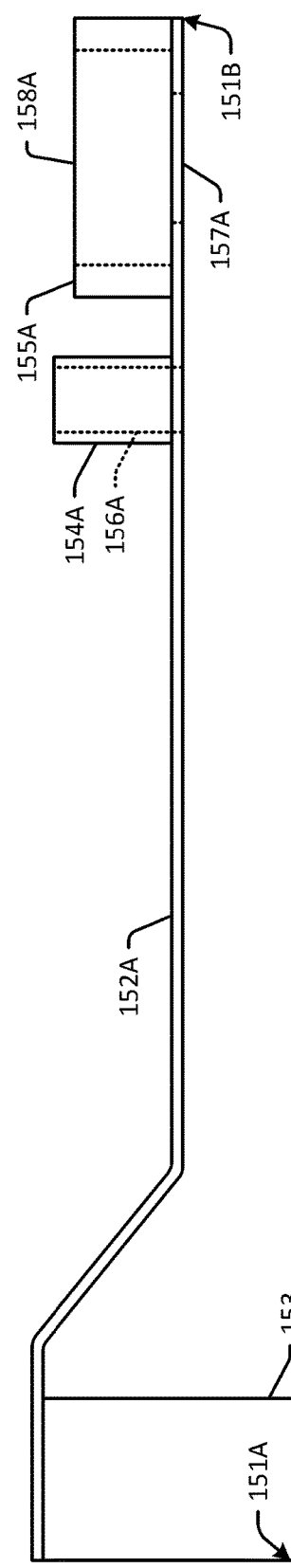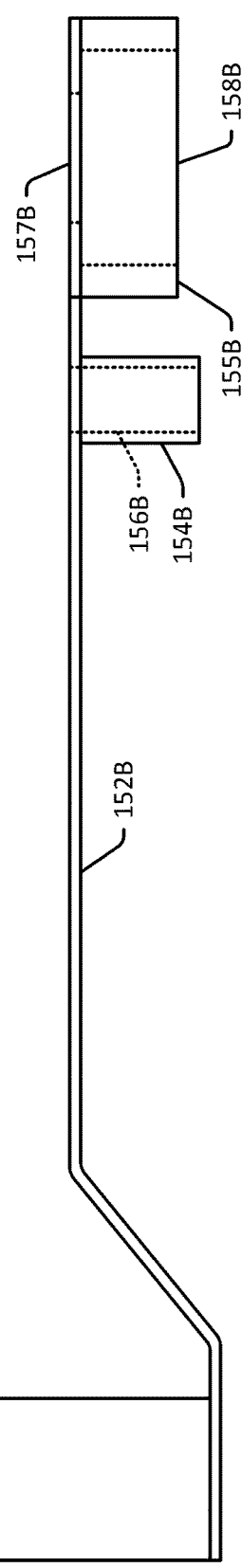

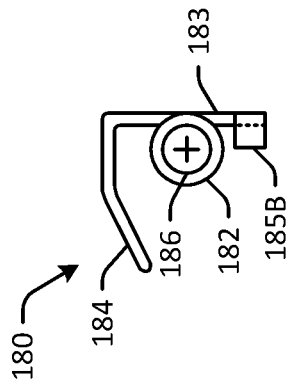
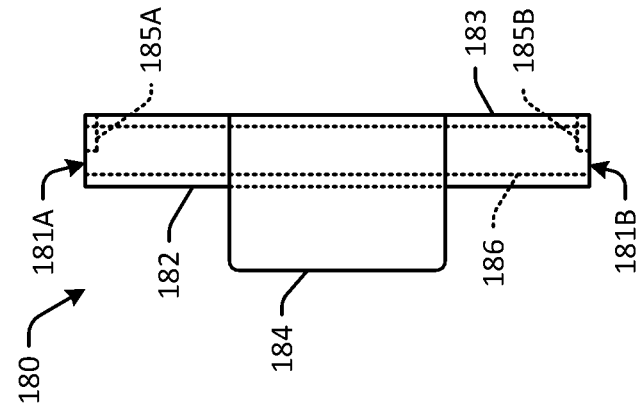
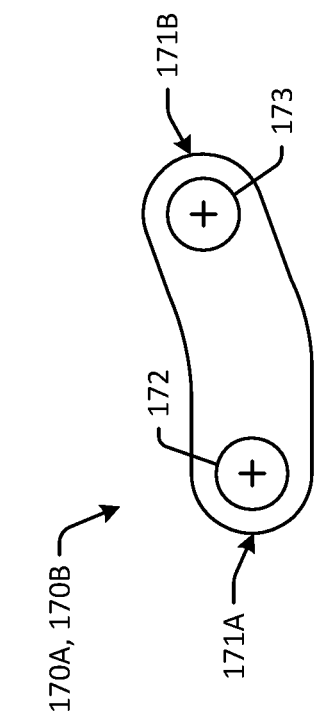
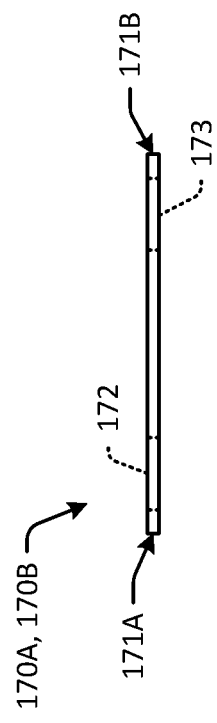

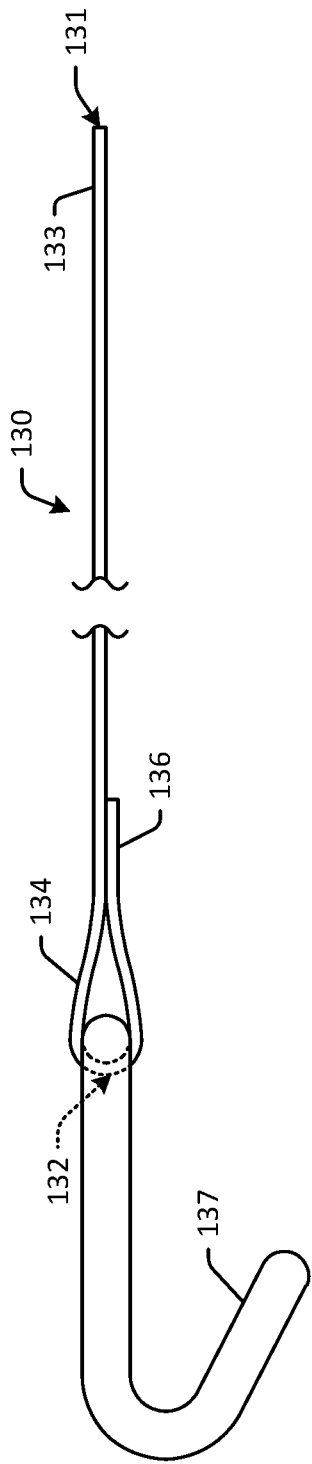
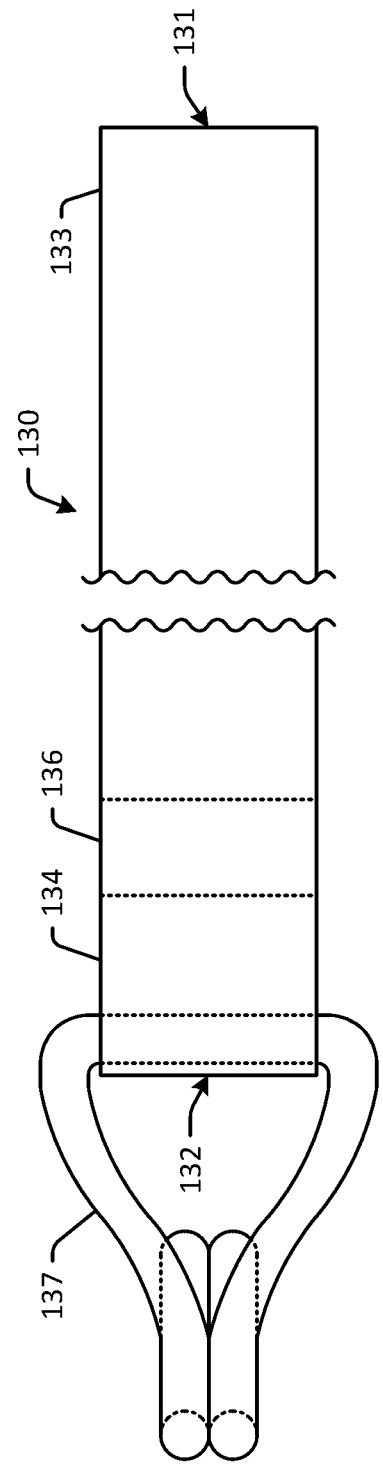
FIG. 1W
FIG. 1X

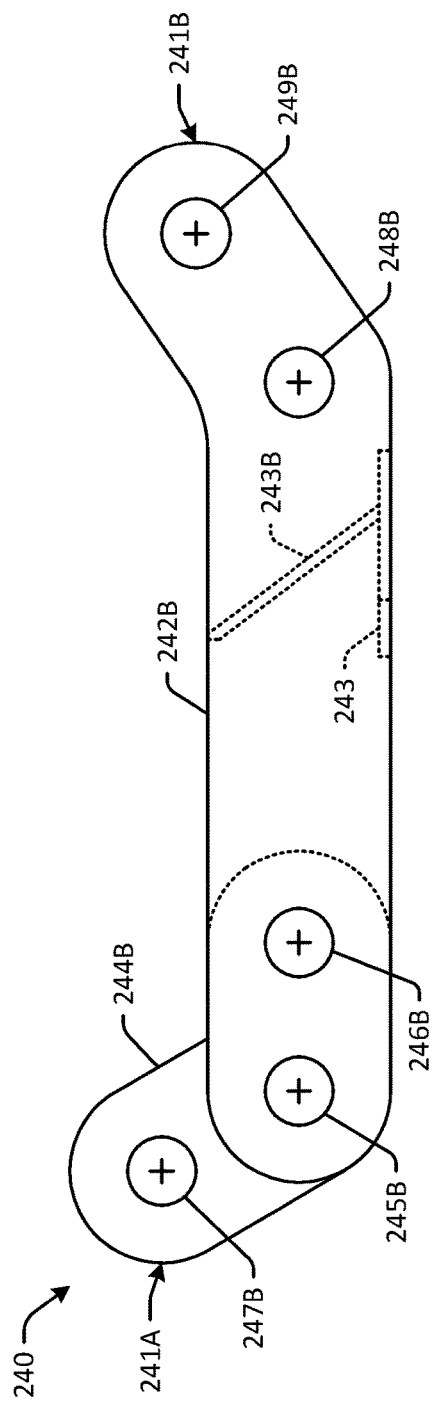
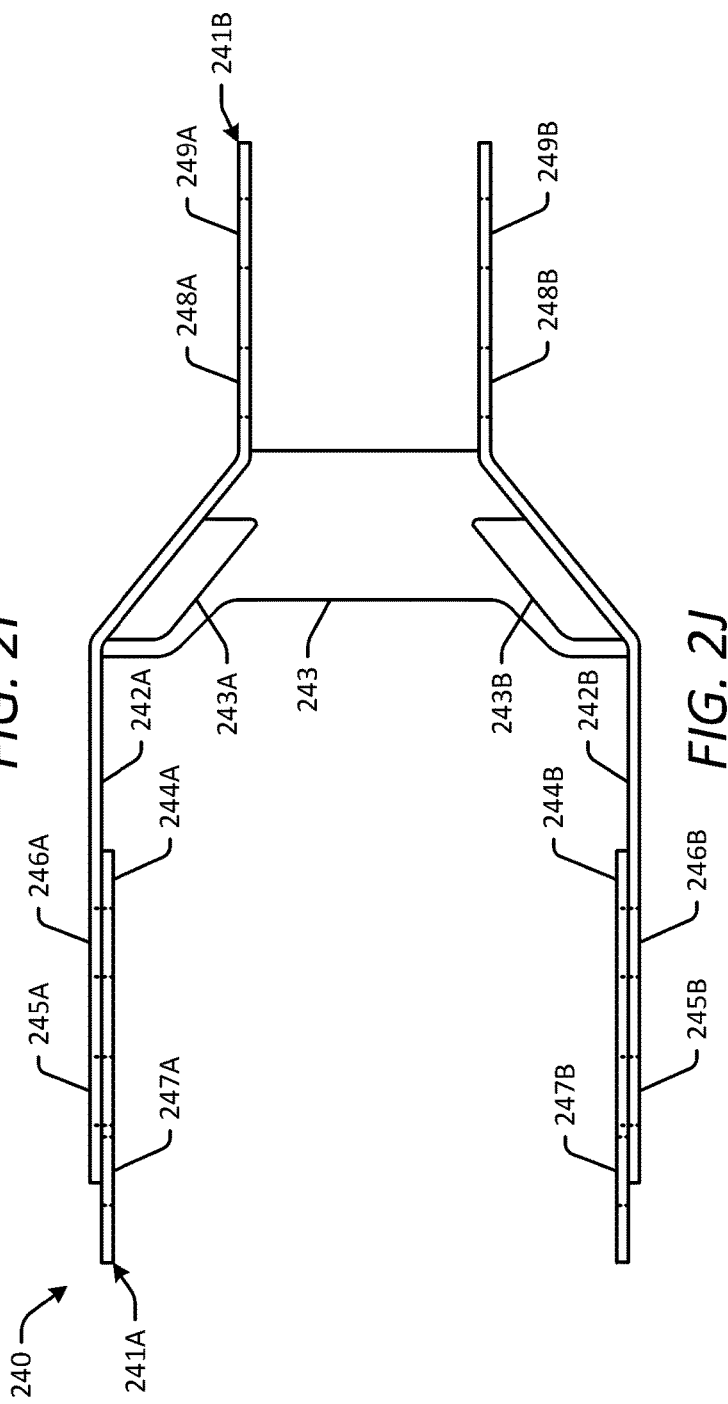

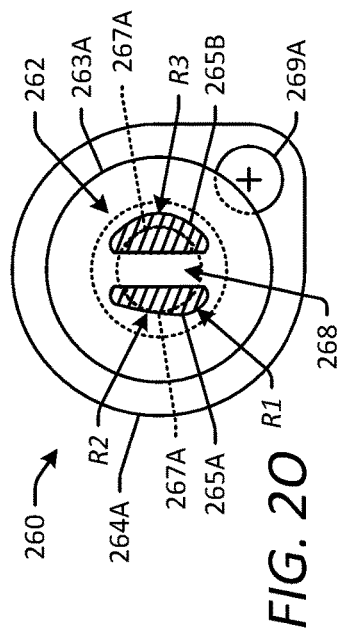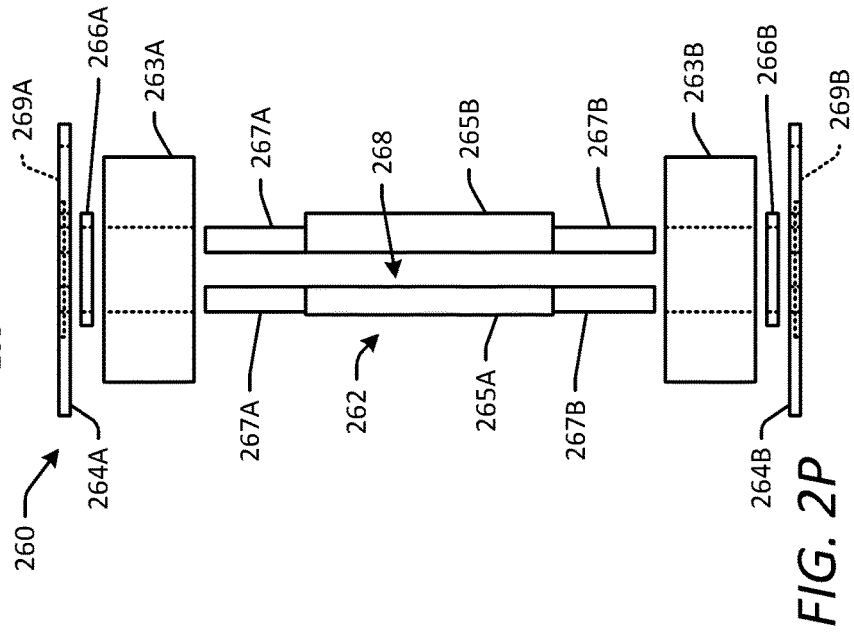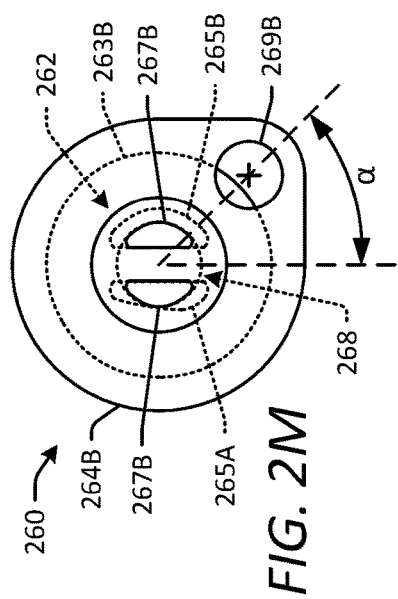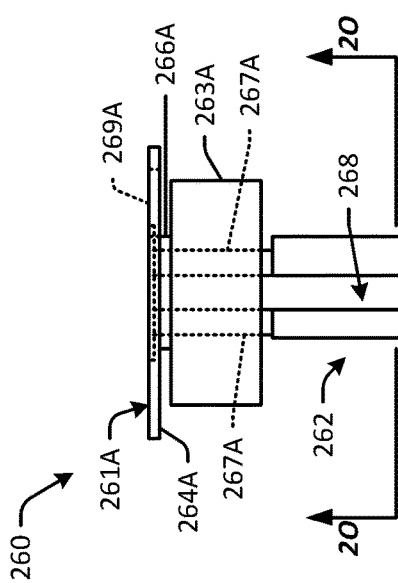

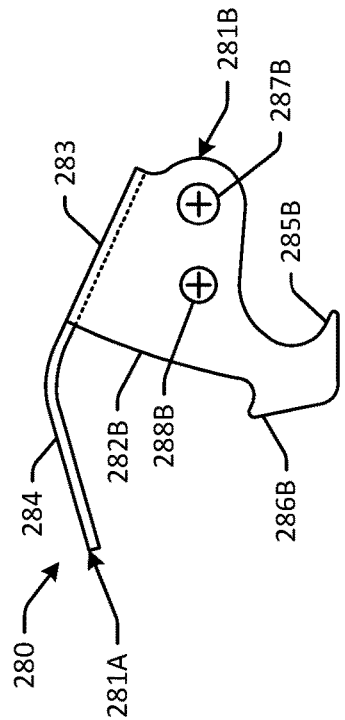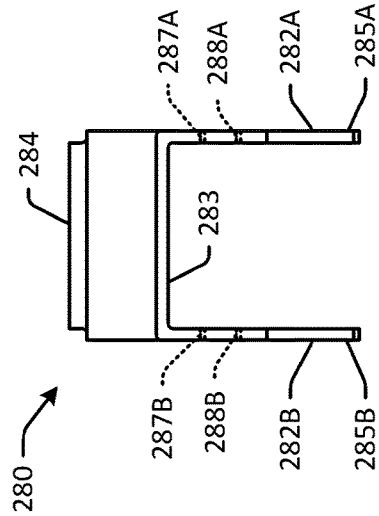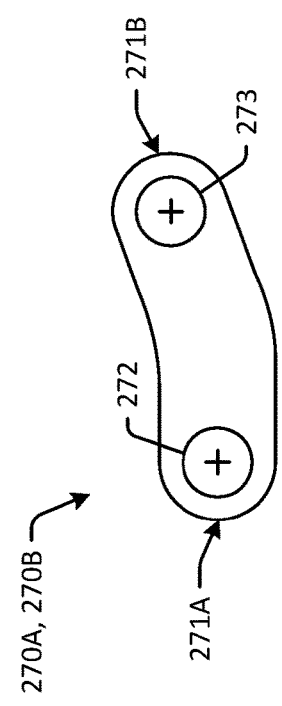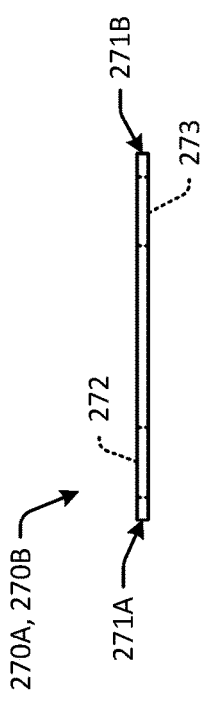

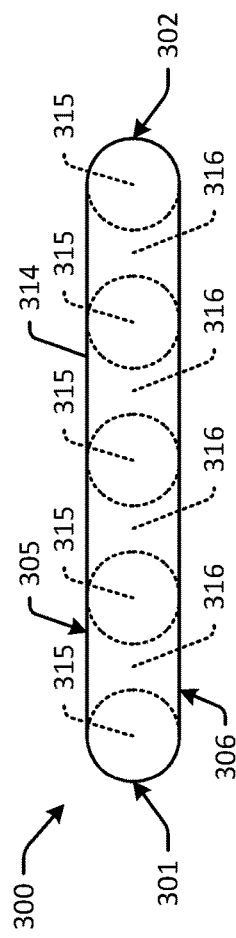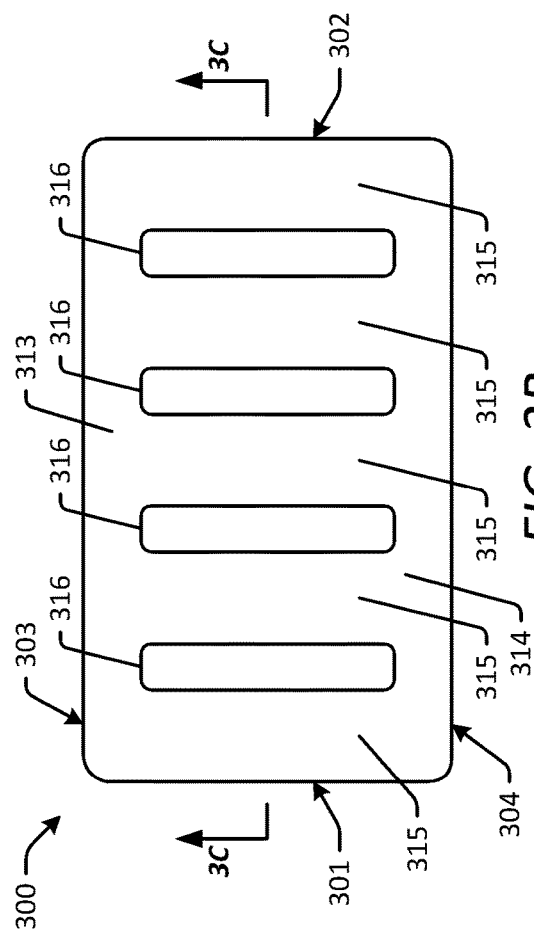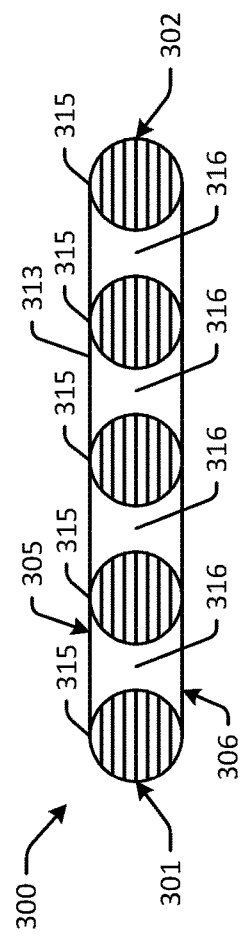

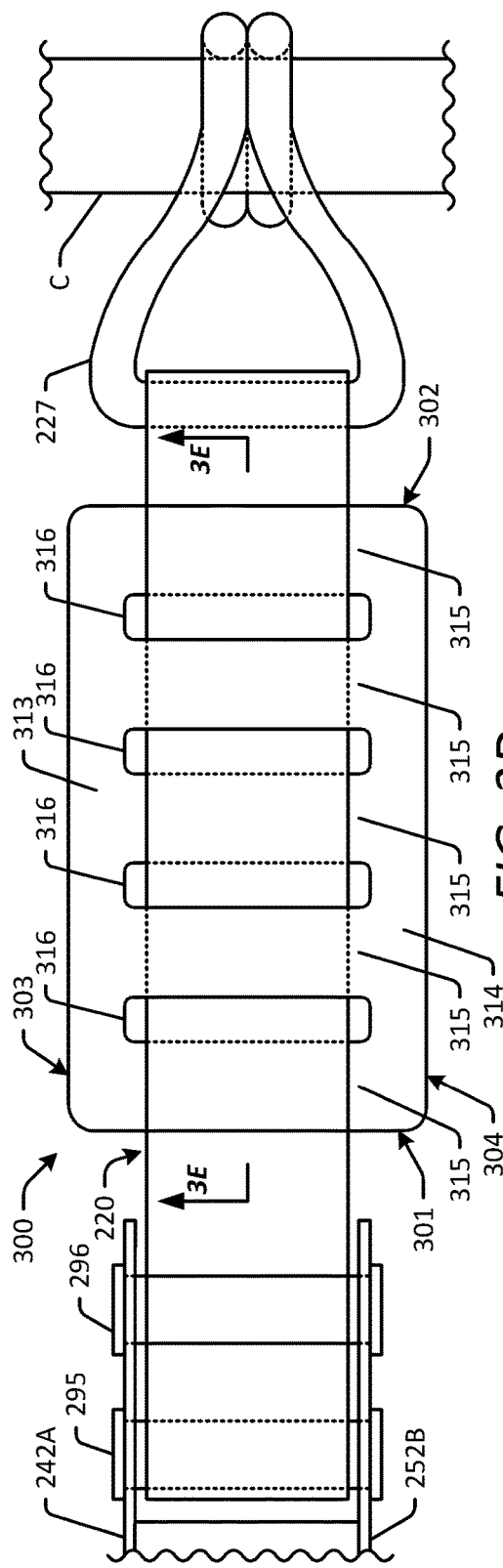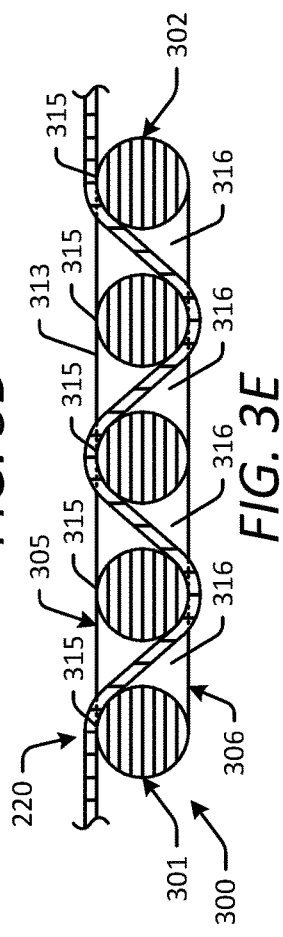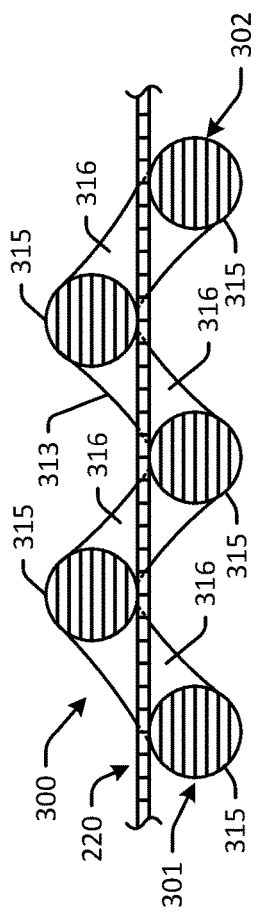

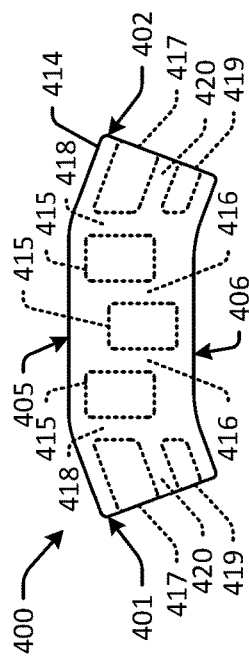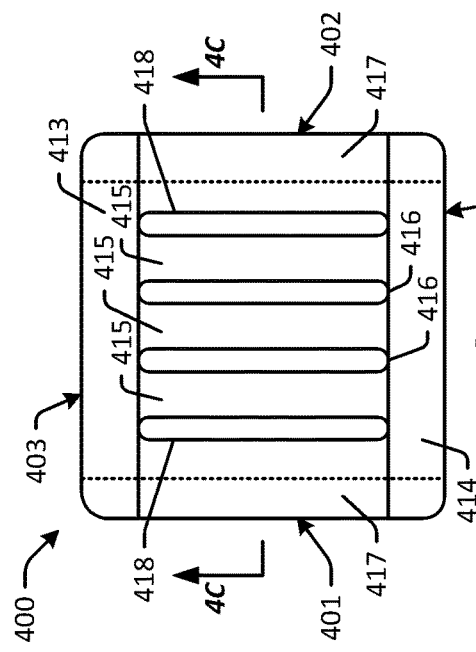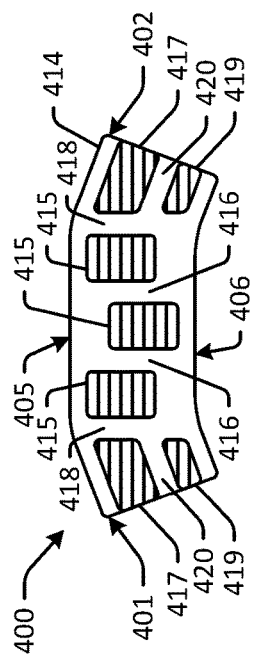

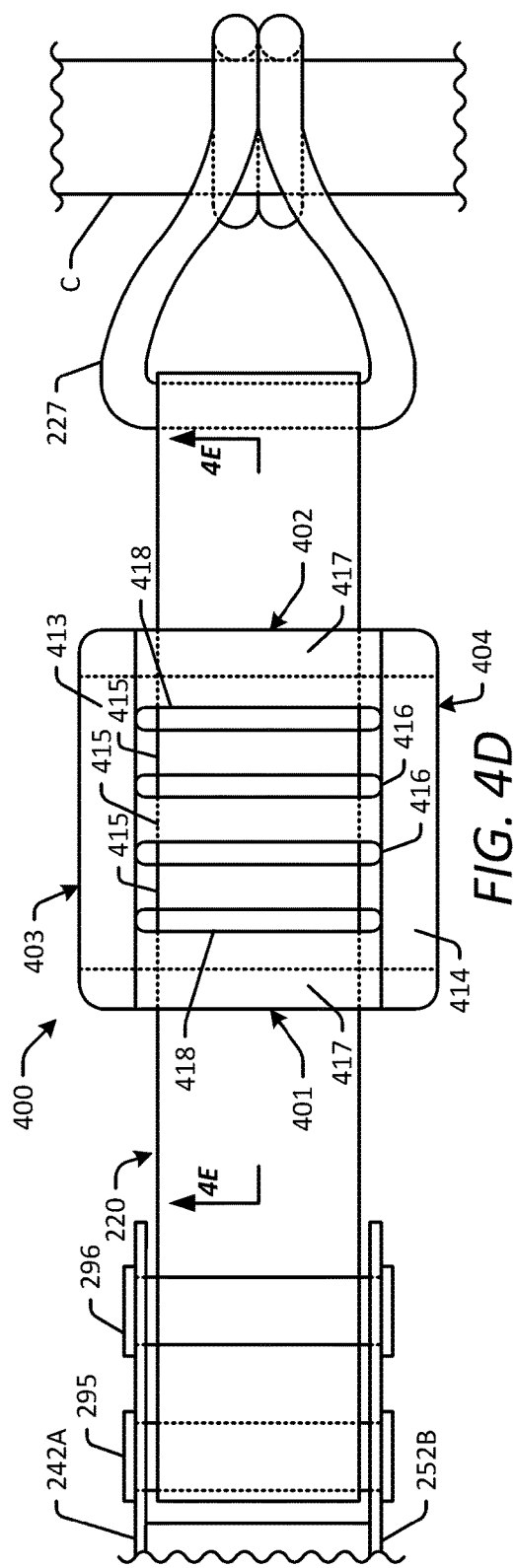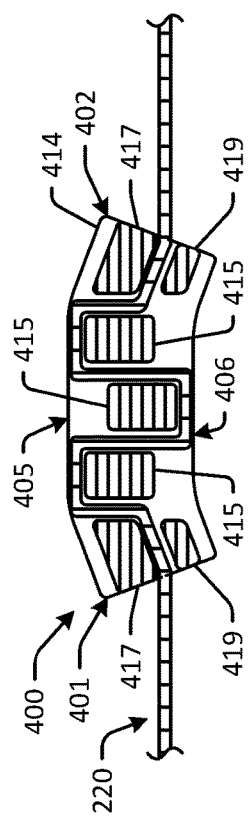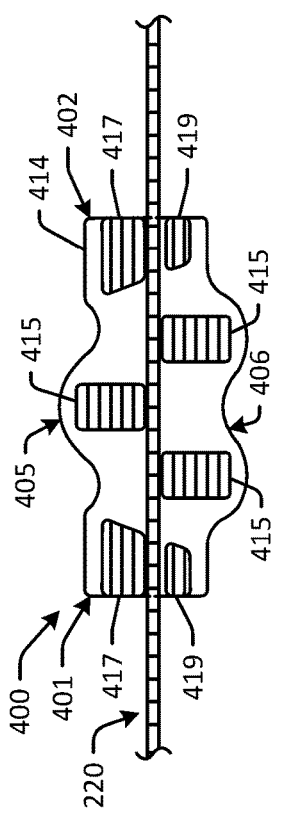

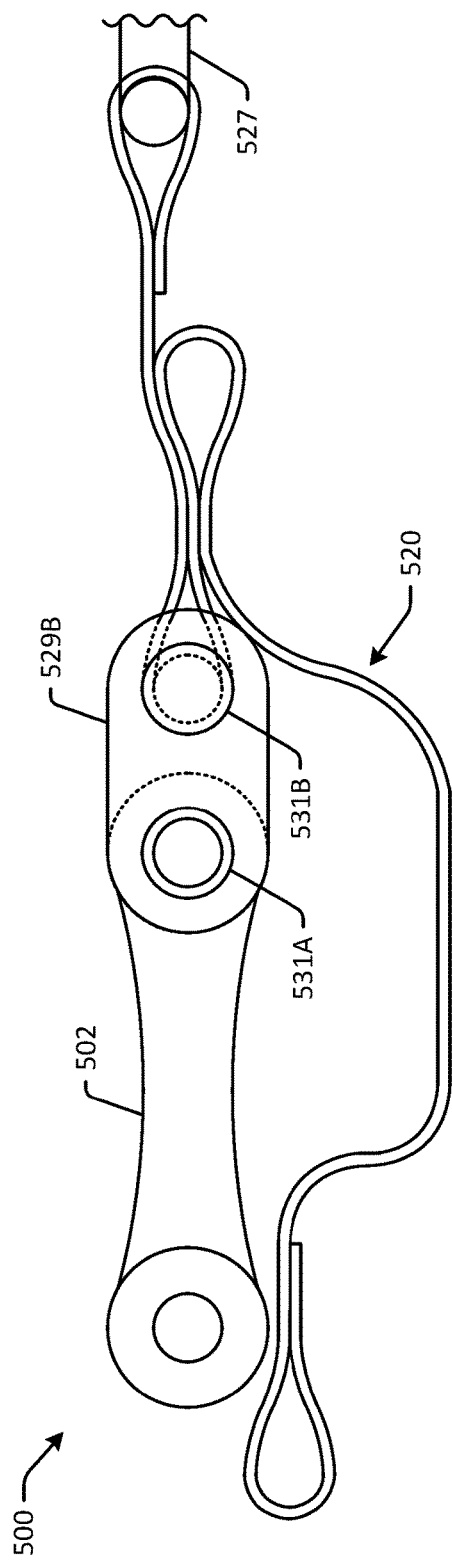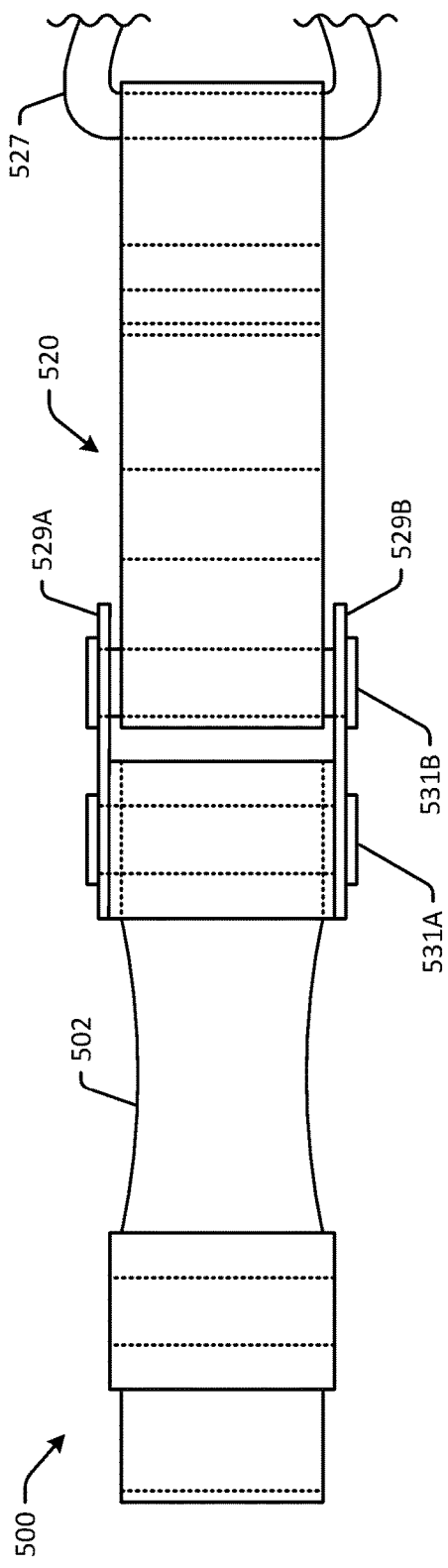
FIG 5A
FIG. 5B

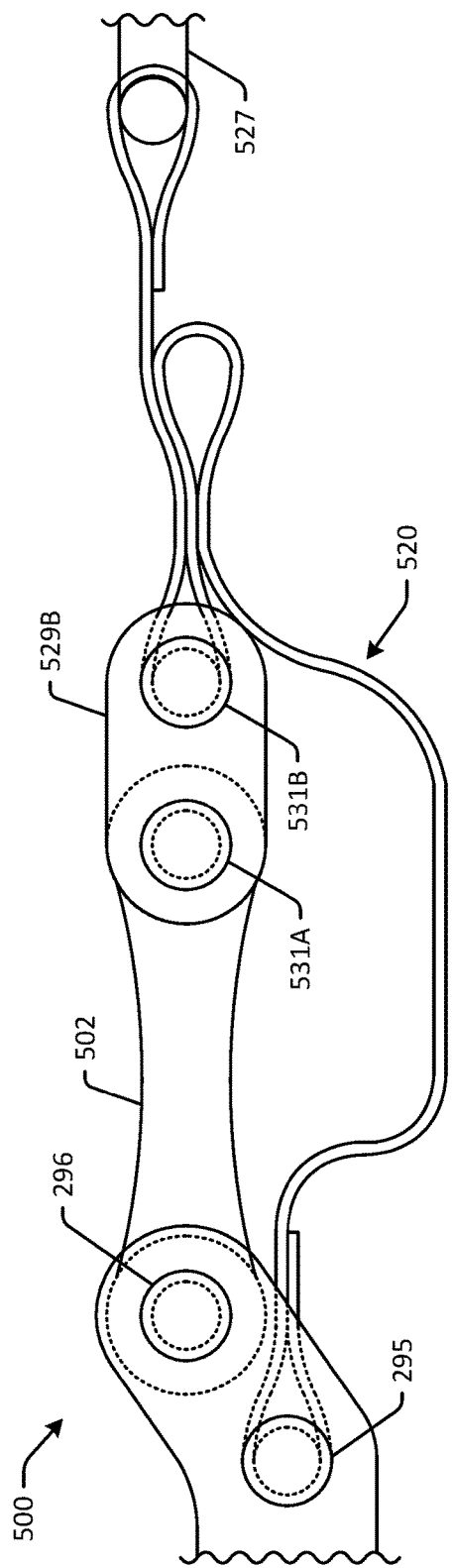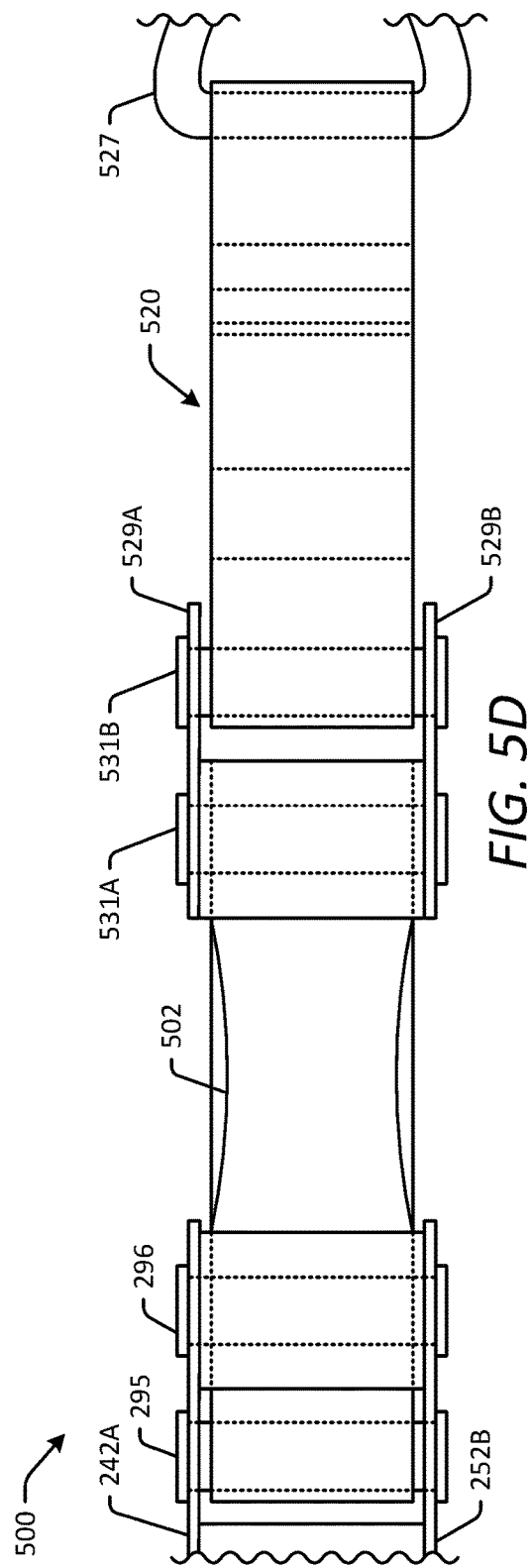

RATCHETLESS TIE-DOWN ASSEMBLIES AND RELATED METHODS

CROSS-REFERENCE TO RELATED APPLICATIONS

This application claims the benefit of U.S. Provisional Application No. 62/670,009, filed on May 11, 2018, the entire contents of which are incorporated by reference herein.

TECHNICAL FIELD

The present disclosure relates generally to tie-down assemblies and methods, and more particularly to ratchetless tie-down assemblies and related methods of using such assemblies to secure cargo to a support structure for transport or storage.

BACKGROUND

Various types of tie-down members or assemblies may be used to secure cargo to a support structure during transport or storage of the cargo. For example, in light-duty applications, simple straps, ropes, or bungee cords may be used to secure cargo to a truck bed, a trailer, or a container of a vehicle. In some instances, one or more straps may be used together with a buckle, such as a cam buckle or a spring buckle, to facilitate a reliable hold between the cargo and the support structure upon tightening of the straps. In heavy-duty applications, more complex tie-down assemblies may be used to ensure that the cargo is maintained in a secure manner with respect to the support structure. For example, ratchet tie-down assemblies often may be used to secure heavy cargo, such as a car, a motorcycle, or an all-terrain vehicle to a support structure, such as a trailer, in a manner that reliably inhibits movement of the cargo relative to the support structure during transport.

A ratchet tie-down assembly generally may include a ratchet buckle, a first strap that is fixedly attached to the buckle, and a second strap that is removably attached to the buckle. The first strap may include a first end that is attached to the ratchet buckle and a second end that is attached to a first hook or other hardware component for removably attaching to a cargo item or a support structure. The second strap may include a first end that is configured for removably attaching to the ratchet buckle and a second end that is attached to a second hook or other hardware component for removably attaching to the cargo item or the support structure. The ratchet buckle may be configured for tightening the first strap and the second strap between the attachment points provided by the first hook and the second hook. Although various configurations may be used, the ratchet buckle generally may include a frame, a drum, a ratchet mechanism, a handle, and a release mechanism. The first strap may be fixedly attached to the frame and extend therefrom for connecting the frame to the cargo item or the support structure via the first hook. The drum may be rotatably attached to the frame and configured to receive the second strap therethrough. Upon rotation of the drum relative to the frame in a first direction, the second strap may be wrapped around the drum in an overlapping manner, thereby securing the second strap to the drum. The ratchet mechanism may be attached to the frame and/or the handle and configured to engage the drum. In particular, the ratchet mechanism may be configured to allow the drum to rotate in the first direction and to inhibit rotation of the drum in an opposite second direction. The handle may be pivotably attached to the frame and configured to pivot relative to the frame between an open position and a closed position. When the handle is pivoted from the open position to the closed position, the handle may cause the drum to rotate in the first direction, thereby wrapping the second strap around the drum. When the handle is pivoted from the closed position to the open position, the ratchet mechanism may maintain the existing rotational orientation of the drum. The release mechanism may be attached to the frame and/or the handle and configured to engage the ratchet mechanism. When the release mechanism is disengaged from the ratchet mechanism, the drum may be allowed to rotate in the second direction, thereby allowing the second strap to be unwrapped and removed from the drum.

Use of such a ratchet tie-down assembly may begin by attaching the first hook to one of a cargo item or a support structure. In this manner, the ratchet buckle may be connected to the one of the cargo item or the support structure via the first strap and the first hook. Meanwhile, the second hook may be attached to the other of the cargo item or the support structure. The first end of the second strap then may be passed through an opening of the drum and back over a top portion of the drum toward the second hook. In this manner, the ratchet buckle may be connected to the other of the cargo item or the support structure via the second strap and the second hook. In some instances, the first end of the second strap may be pulled toward the second hook to remove some slack in the second strap. The ratchet buckle then may be actuated to tighten the first strap and the second strap between the attachment points provided by the first hook and the second hook. In particular, the handle may be pivoted from the open position to the closed position, thereby causing the drum to rotate in the first direction and the second strap to be wrapped around the drum. In this manner, the degree of tension in the second strap may be increased as the second strap is wrapped around the drum. In many instances, a single actuation of the handle (i.e., pivotal movement of the handle from the open position to the closed position) may be insufficient to cause the drum to grab the second strap. The second strap generally may not be grabbed by the drum until the second strap is wrapped around the drum in an overlapping manner to generate a sufficient amount of friction between overlapping layers of the second strap. With many existing ratchet tie-down assemblies, a single actuation of the handle generally may not result in a desired degree of wrapping of the second strap around the drum and thus may not generate a desired degree of tension in the second strap. Accordingly, the handle may be moved from the closed position to the open position and then back to the closed position to wrap the second strap further around the drum and further increase tension in the second strap. In some instances, numerous actuations of the handle may be carried out in order to achieve the desired degree of wrapping of the second strap around the drum and the desired degree of tension in the second strap. After doing so, the handle may be maintained in the closed position, and the ratchet mechanism may maintain the drum in the existing rotational orientation. The tension generated in the first strap and the second strap may ensure that the cargo item is secured relative to the support structure by the ratchet tie-down assembly during transport. After transporting the cargo item to its destination, the ratchet tie-down assembly may be removed from the cargo item and the support structure. In particular, the handle may be moved from the closed position to the open position, and the release mechanism may be actuated to disengage the ratchet mechanism.

Actuation of the release mechanism may allow the second strap to be removed from the drum. For example, the portion of the second strap between the drum and the second hook may be pulled away from drum, thereby causing the drum to rotate in the second direction and the second strap to be unwrapped from the drum. Finally, the first hook and the second hook may be detached from the cargo item and the support structure.

Although conventional ratchet tie-down assemblies generally may be suitable for securing a cargo item to a support structure for transport or storage, the use of such assemblies may suffer from certain drawbacks. For example, ratchet tie-down assemblies may be cumbersome and time-consuming to use. As described above, achieving a desired degree of wrapping of the second strap around the drum and a desired degree of tension in the second strap often may necessitate numerous actuations of the handle. As a result, a user may waste a significant amount of time and effort in actuating the handle multiple times. This may be undesirable in certain applications, particularly when several tie-down assemblies are being used to secure a cargo item. Furthermore, a user may experience confusion in determining how many actuations of the handle may be necessary to achieve a desired degree of wrapping of the second strap around the drum and a desired degree of tension in the second strap. Additionally, when using certain ratchet tie-down assemblies, it may be challenging to feed the second strap through and around the drum due to the configuration of the other components of the ratchet buckle. For example, it may be difficult to access the drum and clearly view the first end of the second belt while the first end is fed through and around the drum. Removal of the second strap after use of certain ratchet tie-down assemblies also may be challenging. For example, when the second strap has been wrapped around the drum multiple times, it may be difficult for a user to remove the second strap from the drum simply by pulling the portion of the second strap between the drum and the second hook. As a result, the user may have to unwrap the second strap manually from the drum, which may be challenging due to the configuration of the other components of the ratchet buckle. Further drawbacks may result from the use of the ratchet mechanism for controlling rotation of the drum. For example, certain ratchet mechanisms may include numerous moving components that cooperate with one another in order to ensure proper operation of the tie-down assembly. Such configurations may increase the complexity and overall cost of the tie-down assembly. Additionally, over time, such components may become worn and/or debris may be introduced into exposed portions of the ratchet mechanism, which may prevent proper operation of the tie-down assembly and jeopardize the cargo item secured thereby.

There remains a need for improved tie-down assemblies and methods of using such assemblies to secure cargo to a support structure for transport or storage. In particular, it would be advantageous to provide a tie-down assembly that addresses one or more of the above-described drawbacks associated with conventional ratchet tie-down assemblies and includes a robust mechanism for securing a cargo item to a support structure in a simple and intuitive manner.

BRIEF SUMMARY

Tie-down assemblies and methods of using such tie-down assemblies to secure a cargo item to a support structure are provided. According to one aspect, a tie-down assembly is provided. In one embodiment, the tie-down assembly may include a buckle, a first strap, and a second strap. The buckle may include a frame, a handle pivotably attached to the frame and configured to pivot about a first axis between an open position and a closed position, and a drum rotatably attached to the handle and configured to rotate about a second axis, wherein the second axis is spaced apart from and extends parallel to the first axis. The first strap may be attached to the frame, and the second strap may be configured to removably attach to the drum.

According to another aspect, a buckle for a tie-down assembly is provided. In one embodiment, the buckle may include a frame, a handle pivotably attached to the frame and configured to pivot about a first axis between an open position and a closed position, and a drum rotatably attached to the handle and configured to rotate about a second axis, wherein the second axis is spaced apart from and extends parallel to the first axis.

According to another aspect, a tie-down assembly is provided. In one embodiment, the tie-down assembly may include a buckle, a first strap, a first hook, a second strap, and a second hook. The buckle may include a frame, a handle, a drum, a first end plate, a second end plate, a first link arm, and a second link arm. The frame may include a first side plate and a second side plate spaced apart from one another. The handle may be pivotably attached to each of the first side plate and the second side plate and configured to pivot about a first axis between an open position and a closed position. The drum may be rotatably attached to the handle and configured to rotate about a second axis. The second axis may spaced apart from and extend parallel to the first axis. The first end plate may be attached to a first end of the drum. The second end plate may be attached to a second end of the drum. The first link arm may be pivotably attached to each of the first side plate and the first end plate. The second link arm may be pivotably attached to each of the second side plate and the second end plate. The first strap may be attached to the frame. The first hook may be attached to an end of the first strap. The second strap may be configured to removably attach to the drum. The second hook may be attached to an end of the second strap.

These and other aspects and embodiments of the present disclosure will be apparent or will become apparent to one of ordinary skill in the art upon review of the following detailed description when taken in conjunction with the drawings and the appended claims.

BRIEF DESCRIPTION OF THE DRAWINGS

FIG. 1I is a side view of a frame of the buckle of the tie-down assembly of FIG. 1A.

FIG. 1J is a top view of the frame of the buckle of the tie-down assembly of FIG. 1A.

FIG. 1K is a side view of a handle of the buckle of the tie-down assembly of FIG. 1A.

FIG. 1L is a top view of the handle of the buckle of the tie-down assembly of FIG. 1A.

FIG. 1Q is a side view of a link arm of the buckle of the tie-down assembly of FIG. 1A.

FIG. 1R is a top view of the link arm of the buckle of the tie-down assembly of FIG. 1A.

FIG. 1S is a side view of a latch of the buckle of the tie-down assembly of FIG. 1A.

FIG. 1T is a top view of the latch of the buckle of the tie-down assembly of FIG. 1A.

FIG. 1W is a side view of the second strap and the second hook of the tie-down assembly of FIG. 1A.

FIG. 1X is a top view of the second strap and the second hook of the tie-down assembly of FIG. 1A.

FIG. 2I is a side view of a frame of the buckle of the tie-down assembly of FIG. 2A.

FIG. 2J is a top view of the frame of the buckle of the tie-down assembly of FIG. 2A.

FIG. 2M is a side view of a drum assembly of the buckle of the tie-down assembly of FIG. 2A.

FIG. 2N is a top view of the drum assembly of the buckle of the tie-down assembly of FIG. 2A.

FIG. 2O is a cross-sectional side view of the drum assembly of the buckle of the tie-down assembly of FIG. 2A, taken along line 2O-2O of FIG. 2N.

FIG. 2P is an exploded top view of the drum assembly of the buckle of the tie-down assembly of FIG. 2A.

FIG. 2Q is a side view of a link arm of the buckle of the tie-down assembly of FIG. 2A.

FIG. 2R is a top view of the link arm of the buckle of the tie-down assembly of FIG. 2A.

FIG. 2S is a side view of a latch of the buckle of the tie-down assembly of FIG. 2A.

FIG. 2T is an end view of the latch of the buckle of the tie-down assembly of FIG. 2A.

FIG. 3A is side view of a slack compensator in accordance with one or more embodiments of the disclosure, as may be used with a tie-down assembly.

FIG. 3B is a top view of the slack compensator of FIG. 3A.

FIG. 3C is a cross-sectional side view of the slack compensator of FIG. 3A, taken along line 3C-3C of FIG. 3B.

FIG. 3D is a top view of the slack compensator of FIG. 3A and a portion of the tie-down assembly of FIG. 2A, showing the slack compensator in a natural, undeformed configuration.

FIG. 3E is a cross-sectional side view of the slack compensator of FIG. 3A and a portion of the tie-down assembly of FIG. 2A, taken along line 3E-3E of FIG. 3D, showing the slack compensator in the natural, undeformed configuration.

FIG. 3F is a cross-sectional side view of the slack compensator of FIG. 3A and a portion of the tie-down assembly of FIG. 2A, taken along line 3E-3E of FIG. 3D, showing the slack compensator in a deformed configuration.

FIG. 4A is side view of a slack compensator in accordance with one or more embodiments of the disclosure, as may be used with a tie-down assembly.

FIG. 4B is a top view of the slack compensator of FIG. 4A.

FIG. 4C is a cross-sectional side view of the slack compensator of FIG. 4A, taken along line 4C-4C of FIG. 4B.

FIG. 4D is a top view of the slack compensator of FIG. 4A and a portion of the tie-down assembly of FIG. 2A, showing the slack compensator in a natural, undeformed configuration.

FIG. 4E is a cross-sectional side view of the slack compensator of FIG. 4A and a portion of the tie-down assembly of FIG. 2A, taken along line 4E-4E of FIG. 4D, showing the slack compensator in the natural, undeformed configuration.

FIG. 4F is a cross-sectional side view of the slack compensator of FIG. 4A and a portion of the tie-down assembly of FIG. 2A, taken along line 4E-4E of FIG. 4D, showing the slack compensator in a deformed configuration.

FIG. 5A is side view of a slack compensator assembly in accordance with one or more embodiments of the disclosure, as may be used with a tie-down assembly.

FIG. 5B is a top view of the slack compensator assembly of FIG. 5A.

FIG. 5C is a side view of the slack compensator assembly of FIG. 5A and a portion of the tie-down assembly of FIG. 2A, showing a slack compensator of the slack compensator assembly in a natural, undeformed configuration.

FIG. 5D is a top view of the slack compensator assembly of FIG. 5A and a portion of the tie-down assembly of FIG. 2A, showing the slack compensator in the natural, undeformed configuration.

DETAILED DESCRIPTION

Figure 1A:
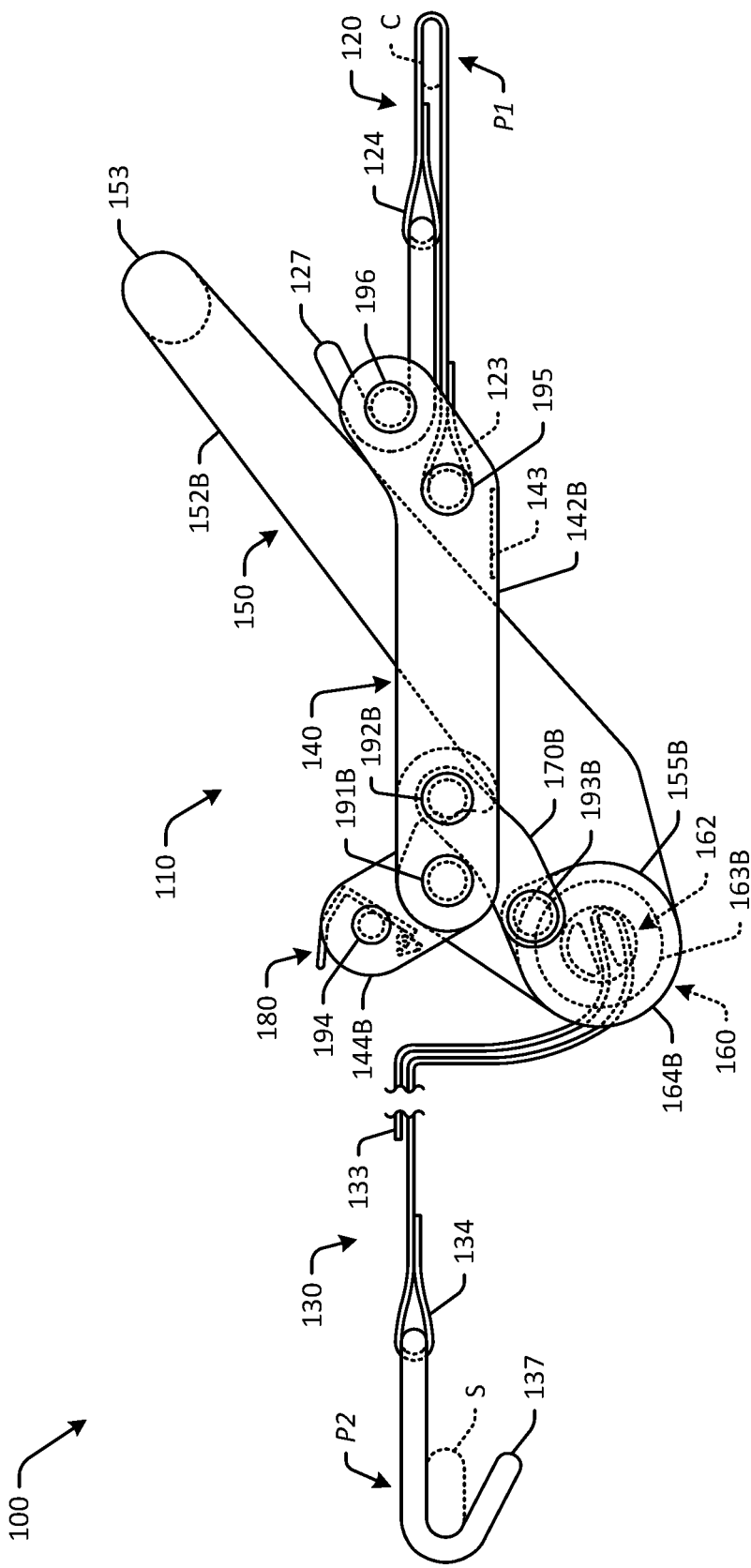
FIG. 1A is a side view of a tie-down assembly in accordance with one or more embodiments of the disclosure, showing a buckle of the tie-down assembly in an open configuration and connected to a cargo item and a support structure by a first strap, a first hook, a second strap, and a second hook of the tie-down assembly.
Figure 1B:
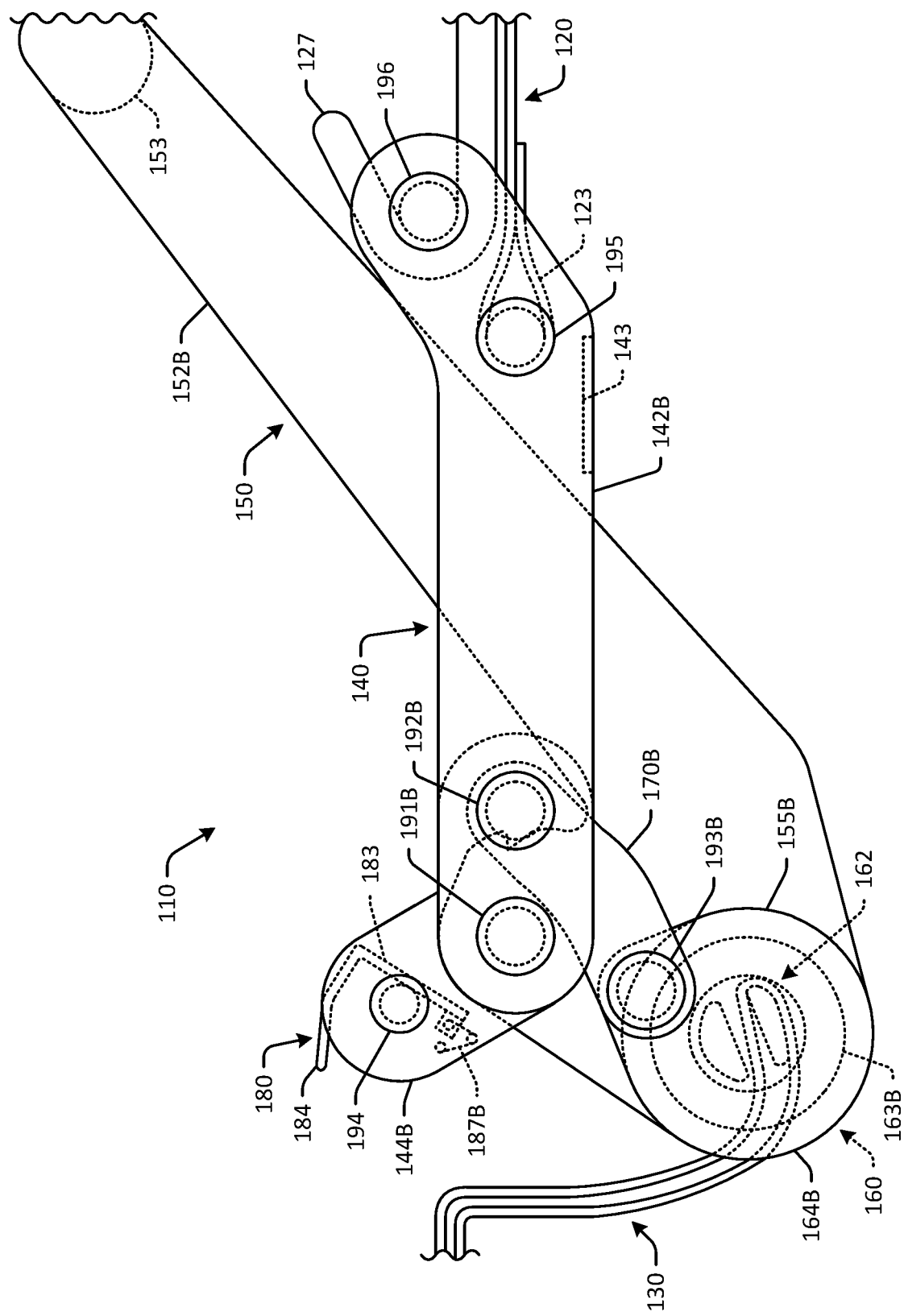
FIG. 1B is a detailed side view of a portion of the tie-down assembly of FIG. 1A, showing the buckle in the open configuration.
Figure 1C:
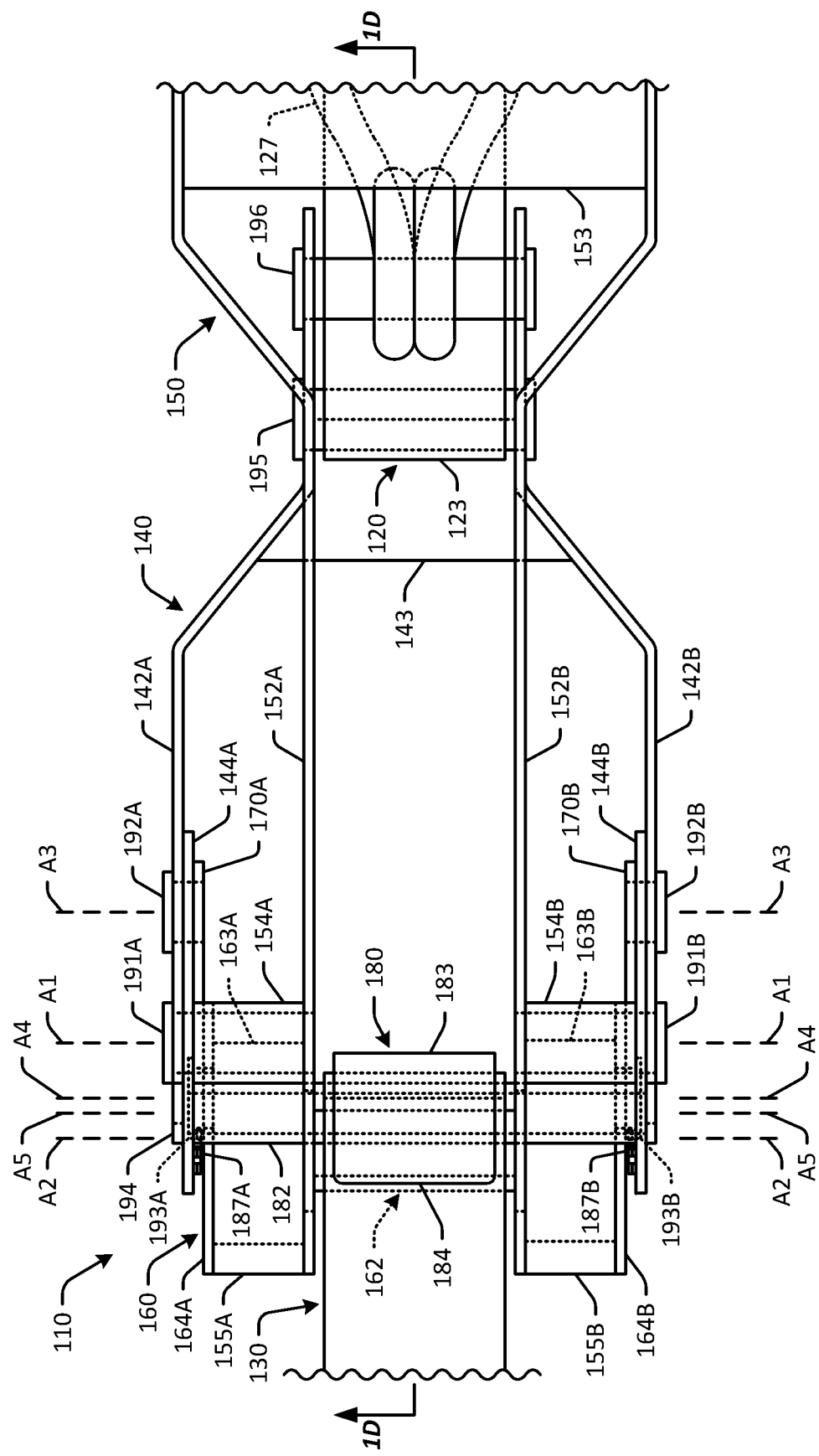
FIG. 1C is a detailed top view of a portion of the tie-down assembly of FIG. 1A, showing the buckle in the open configuration.
Figure 1D:
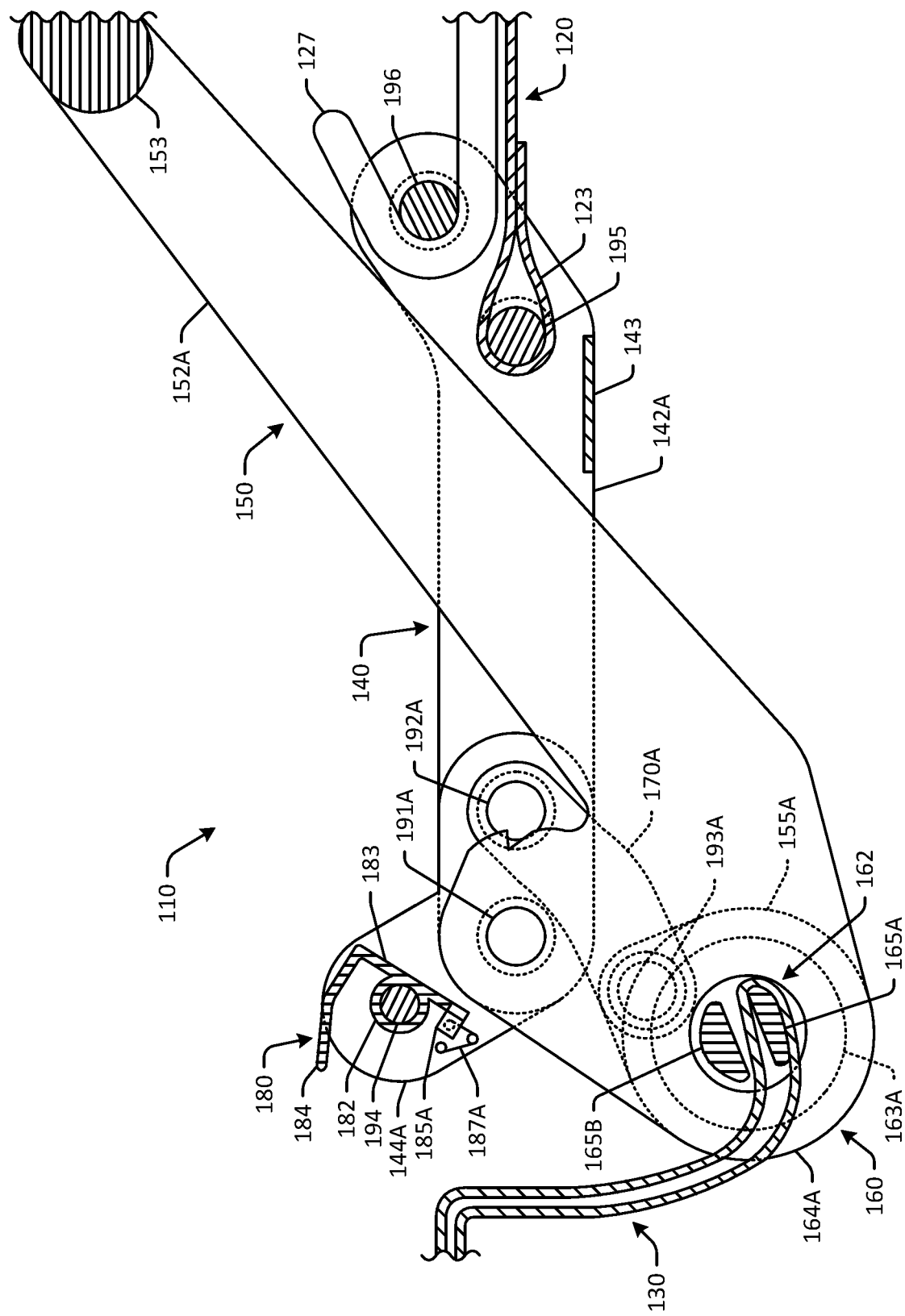
FIG. 1D is a detailed cross-sectional side view of a portion of the tie-down assembly of FIG. 1A, taken along line 1D-1D of FIG. 1C, showing the buckle in the open configuration.

Improved tie-down assemblies and methods have been developed for securing a cargo item to a support structure for transport or storage. Such tie-down assemblies and methods may address one or more of the above-described drawbacks associated with conventional ratchet tie-down assemblies. The tie-down assemblies provided herein may include a first strap for attaching to one of a cargo item or a support structure at a first connection point, a second strap for attaching to the other of the cargo item or the support structure at a second connection point, and a buckle for tightening the first strap and the second strap between the first connection point and the second connection point. As described herein, the buckle may include a ratchetless mechanism for tightening the first strap and the second strap, and thus the tie-down assemblies may avoid issues associated with ratchet mechanisms often used in conventional tie-down assemblies. In particular, the buckle may include a frame, a handle pivotably attached to the frame, and a drum rotatably attached to the handle. The first strap may be attached to the frame, and the second strap may be configured to attach to the drum. The handle may be configured to pivot relative to the frame between an open position and a closed position, and the drum may be configured to rotate relative to the handle when the handle is pivoted from the open position to the closed position. As described herein, the rotational movement of the drum may be facilitated by a pair of link arms that are pivotally attached to the frame and respective end plates that are attached to the drum. The second strap may be inserted through a slot of the drum and wrapped around the drum when the handle is pivoted from the open position to the closed position. In particular, a single actuation of the handle may cause the second strap to be wrapped around the drum such that the second strap is grabbed by the drum. In other words, the wrapping of the second strap around the drum may generate a sufficient amount of friction between overlapping layers of the second strap that are pulled in opposite directions, thereby causing the drum to grab the second strap. Such wrapping of the second strap also may tighten the first strap and the second strap between the first connection point and the second connection point and generate a desired degree of tension in the first strap and the second strap. In this manner, the cargo item and the support structure may be secured to one another upon a single actuation of the handle. The configuration of the buckle also may ease feeding of the second strap through the drum as well as removal of the second strap from the drum. In particular, when the handle is in the open position prior to use of the tie-down assembly, the drum may be clearly viewed and accessed relative to the remaining portions of the buckle, thereby allowing the second strap to be easily passed under the drum and fed through the slot of the drum. Additionally, when the handle is in the open position after use of the tie-down assembly, the second strap may be held in a non-overlapping manner, thereby allowing the second strap to be easily pulled and removed from the drum. Ultimately, the tie-down assemblies described herein may provide a robust mechanism for securing a cargo item to a support structure in a simple and intuitive manner.

FIGS. 1A-1X illustrate a tie-down assembly 100 (which also may be referred to as a "ratchetless tie-down assembly," a "tie-down buckle assembly," a "tie-down strap assembly," or simply an "assembly") configured to secure a cargo item to a support structure, in accordance with one or more embodiments of the disclosure. For example, the tie-down assembly 100 may be used in various applications for securing a car, a motorcycle, an all-terrain vehicle, or other heavy cargo item to a truck bed, a trailer, a vehicle container, or other support structure for transport or storage. It will be appreciated that the tie-down assembly 100 may be provided in various sizes suitable for light-duty, moderate-duty, and heavy-duty applications. Further, it will be appreciated that the tie-down assembly 100 illustrated in FIGS. 1A-1X provides one example configuration of the assembly 100 and components thereof, and that various other configurations may be used without departing from the scope of the present disclosure.

Figure 1E:
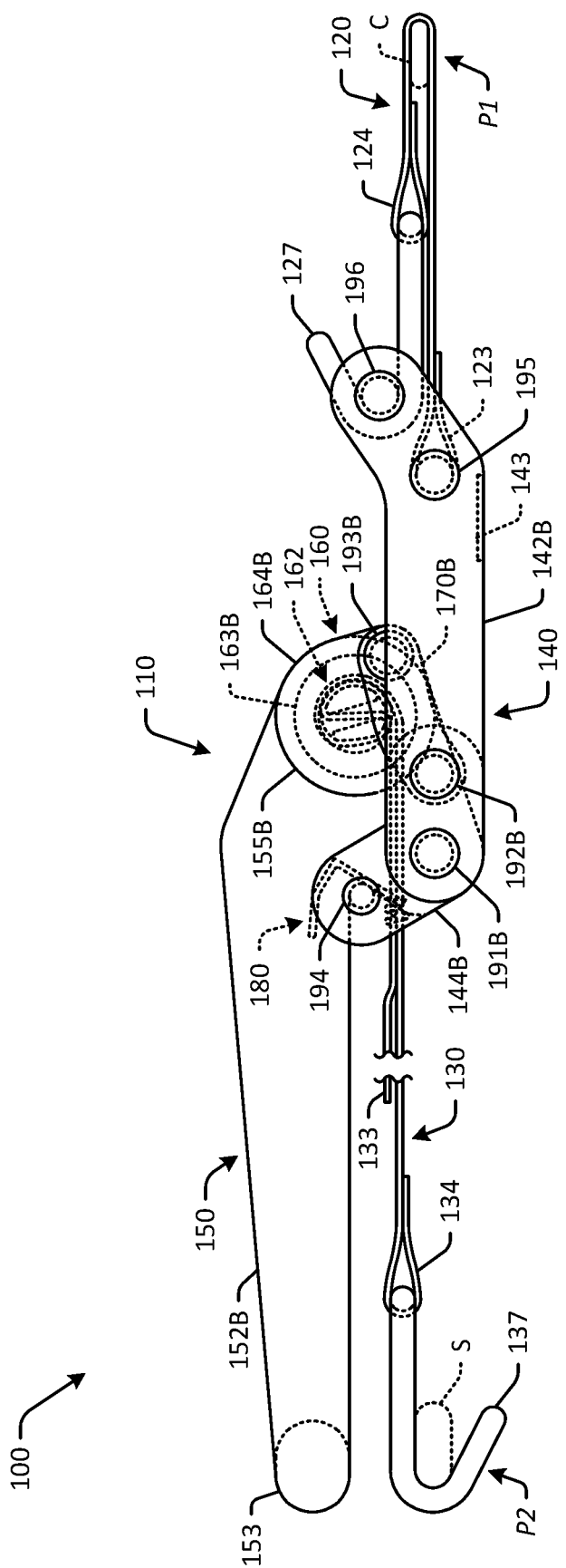
FIG. 1E is a side view of the tie-down assembly of FIG. 1A, showing the buckle in a closed configuration and connected to the cargo item and the support structure by the first strap and the second strap.

As shown in FIGS. 1A and 1E, the tie-down assembly 100 may include a buckle 110 (which also may be referred to as a "ratchetless buckle" or a "buckle assembly"), a first strap 120 (which also may be referred to as a "fixed strap"), and a second strap 130 (which also may be referred to as a "removable strap"). As described below, the first strap 120 may be fixedly attached to the buckle 110, and the second strap 130 may be removably attached to the buckle 110 during use of the tie-down assembly 100. The first strap 120 may be used to connect the tie-down assembly 100 to one of a cargo item or a support structure at a first connection point P1, and the second strap 130 may be used to connect the tie-down assembly 100 to the other of the cargo item or the support structure at a second connection point P2. The buckle 110 may be configured for tightening the first strap 120 and the second strap 130 between the first connection point P1 and the second connection point P2. In this manner, the tie-down assembly 100 may provide a secure hold of the cargo item relative to the support structure. As described further below, the buckle 110 may be configured to move or be transitioned between an open configuration (which also may be referred to as an "unlocked configuration" or a "first configuration"), as shown in FIGS. 1A-1D, and a closed configuration (which also may be referred to as a "locked configuration" or a "second configuration"), as shown in FIGS. 1E-1H. The components of the buckle 110 and their respective positions and orientations when the buckle 110 is in the open configuration and the closed configuration are described in detail below.

Figure 1F:
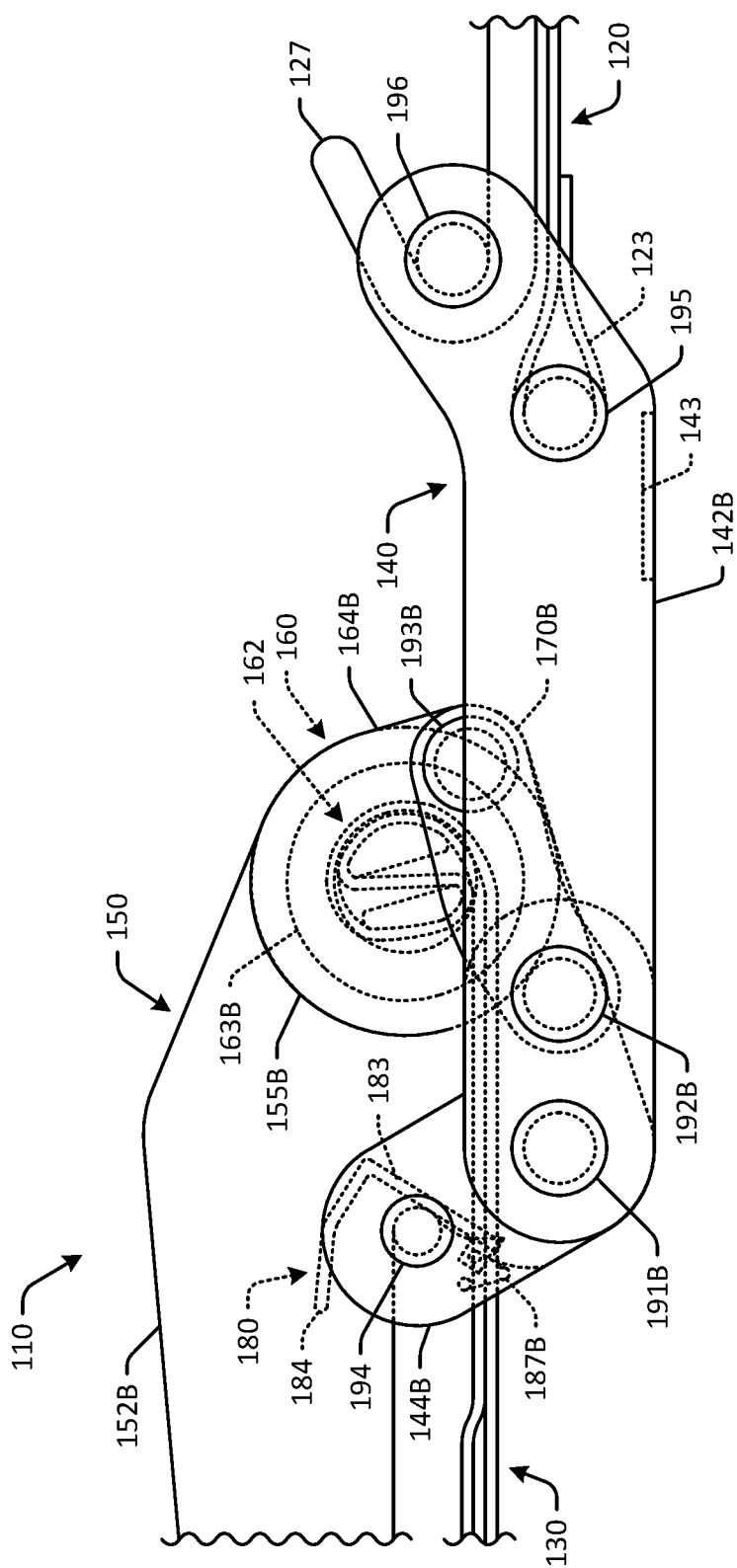
FIG. 1F is a detailed side view of a portion of the tie-down assembly of FIG. 1A, showing the buckle in the closed configuration.
Figure 1G:
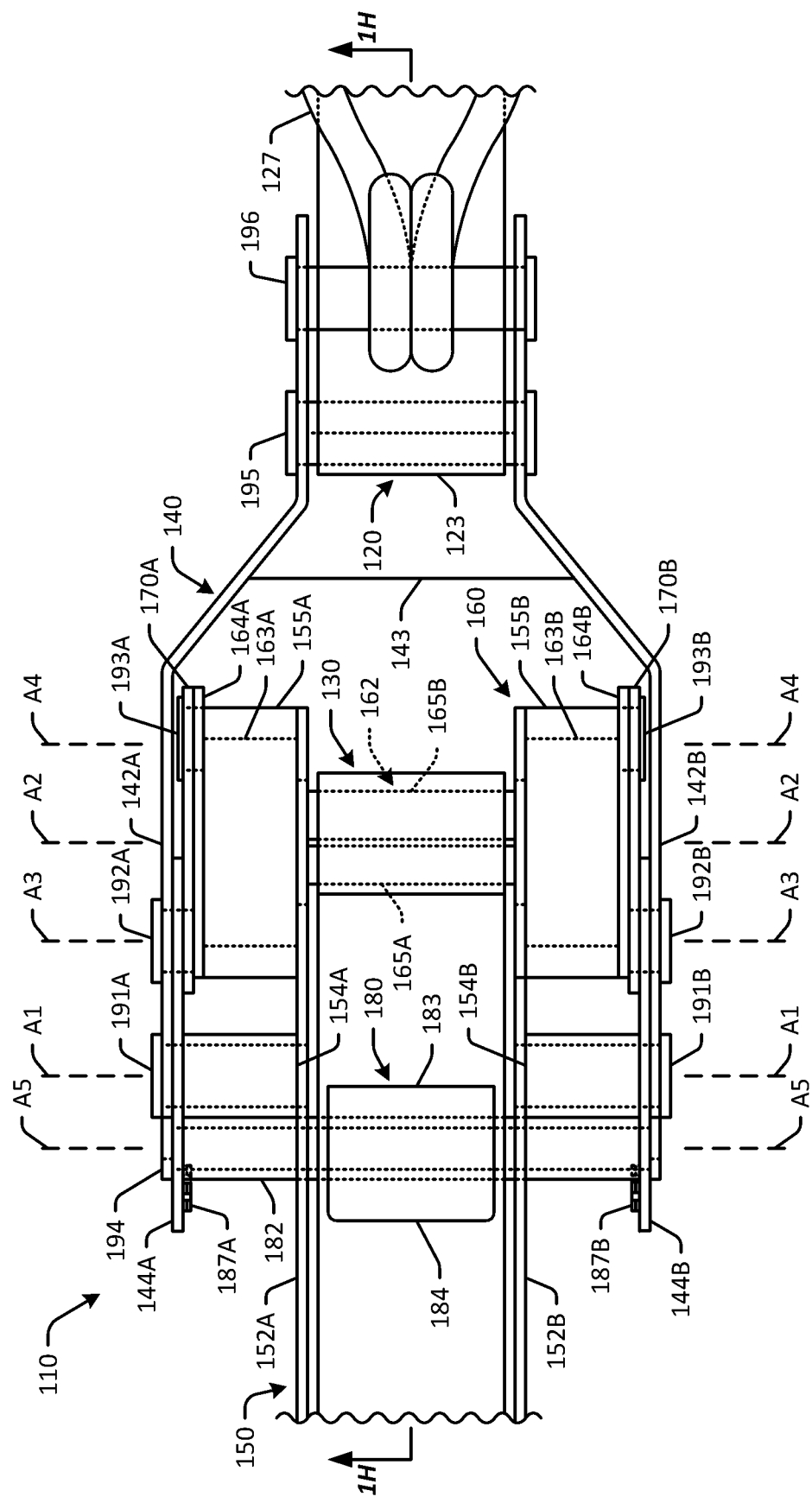
FIG. 1G is a detailed top view of a portion of the tie-down assembly of FIG. 1A, showing the buckle in the closed configuration.
Figure 1H:
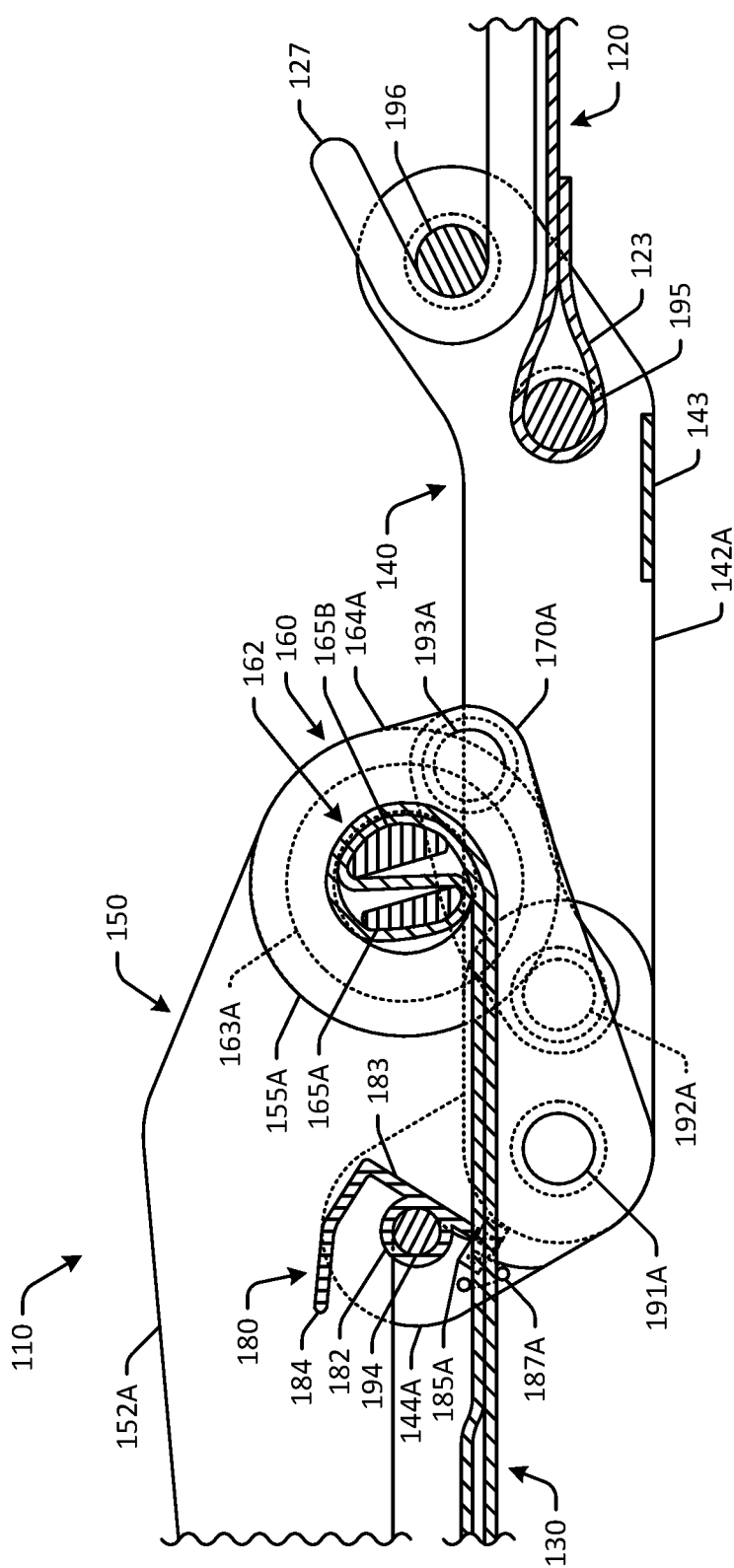
FIG. 1H is a detailed cross-sectional side view of a portion of the tie-down assembly of FIG. 1A, taken along line 1H-1H of FIG. 1G, showing the buckle in the closed configuration.
Figure 1O:
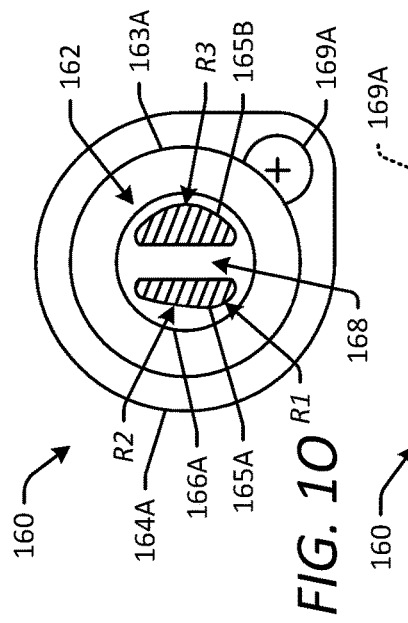
FIG. 1O is a cross-sectional side view of the drum assembly of the buckle of the tie-down assembly of FIG. 1A, taken along line 1O-1O of FIG. 1N.
Figure 1P:
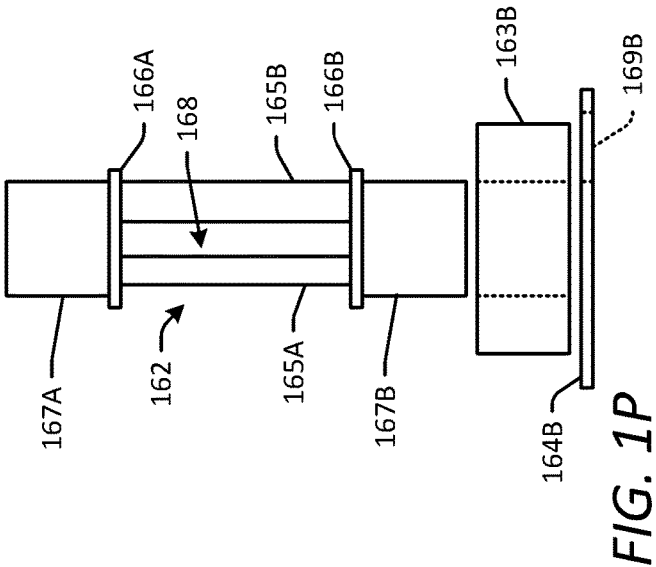
FIG. 1P is an exploded top view of the drum assembly of the buckle of the tie-down assembly of FIG. 1A.
Figure 1M:
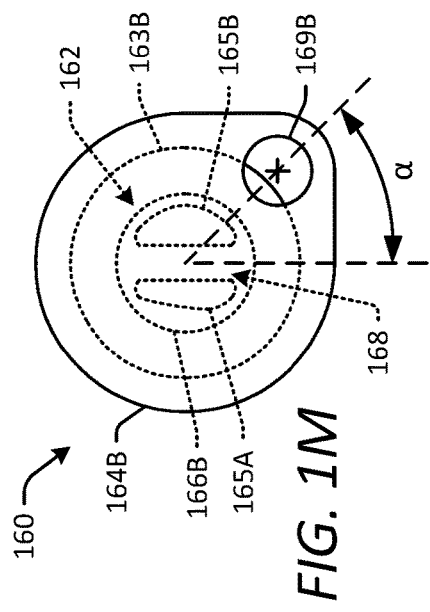
FIG. 1M is a side view of a drum assembly of the buckle of the tie-down assembly of FIG. 1A.
Figure 1N:
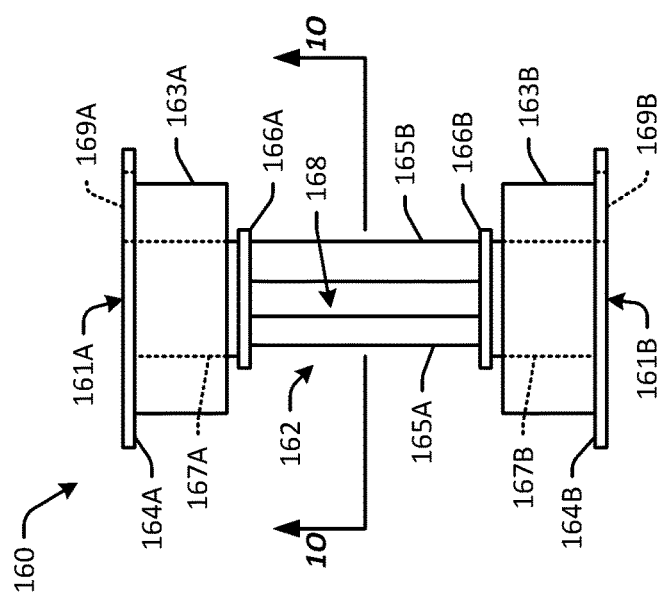
FIG. 1N is a top view of the drum assembly of the buckle of the tie-down assembly of FIG. 1A.
Figure 1U:
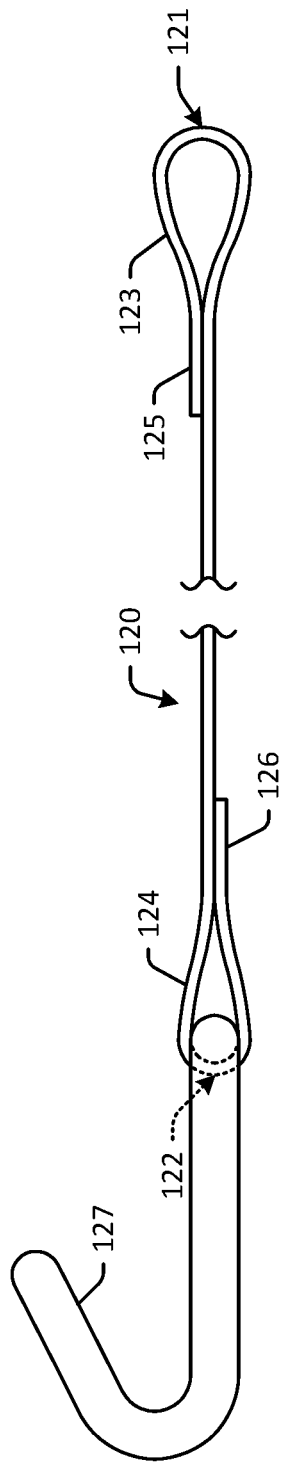
FIG. 1U is a side view of the first strap and the first hook of the tie-down assembly of FIG. 1A.
Figure 1V:
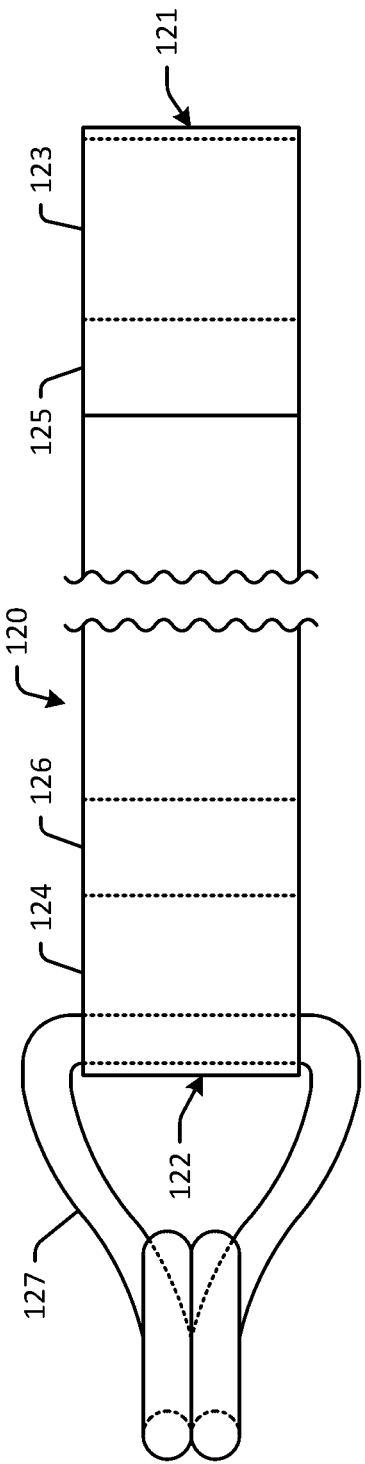
FIG. 1V is a top view of the first strap and the first hook of the tie-down assembly of FIG. 1A.

As shown in FIGS. 1U and 1V, the first strap 120 may be formed as an elongated member having a first end 121 and a second end 122 positioned opposite one another. In certain embodiments, as shown, the first strap 120 may include a first loop 123 positioned at the first end 121 and a second loop 124 positioned at the second end 122. The first loop 123 may be formed by overlapping portions of the first strap 120 that are attached to one another, for example, by stitching or other attachment means, along a first attachment region 125. In a similar manner, the second loop 124 may be formed by overlapping portions of the first strap 120 that are attached to one another, for example, by stitching or other attachment means, along a second attachment region 126. As described below, the first loop 123 may facilitate attachment of the first strap 120 to the buckle 110. In certain embodiments, as shown, a first hook 127 (which also may be referred to as a "first hardware component") may be attached to the second end 122 of the first strap 120 via the second loop 124. In certain embodiments, the first hook 127 may be fixedly attached to the first strap 120. In other embodiments, the first hook 127 may be removably attached to the first strap 120. In certain embodiments, the first hook 127 may be formed as a wire hook shaped in the manner shown, although other forms and configurations of the first hook 127 may be used. In certain embodiments, the first hook 127 may be formed of a metal, such as stainless steel, although other suitable materials may be used. Although the illustrated embodiment includes the first hook 127 attached to the first strap 120, alternative hardware components, such as a clip, a clamp, or a ring may be attached to the first strap 120 instead of the first hook 127. The first strap 120 may be formed of a woven, flexible material having a suitable tensile strength for use under tension generated by the buckle 110. In certain embodiments, the first strap 120 may be formed of nylon or polyester, although other suitable materials may be used.

As shown in FIGS. 1W and 1X, the second strap 130 may be formed as an elongated member having a first end 131 and a second end 132 positioned opposite one another. In certain embodiments, as shown, the first end 131 of the second strap 130 may be formed as a flat portion 133 for removably engaging the buckle 110, as described below, and the second strap 130 may include a loop 134 positioned at the second end 132. The loop 134 may be formed by overlapping portions of the second strap 130 that are attached to one another, for example, by stitching or other attachment means, along an attachment region 136. As described below, the flat portion 133 of the first end 131 may facilitate attachment of the second strap 130 to the buckle 110. In certain embodiments, as shown, a second hook 137 (which also may be referred to as a "second hardware component") may be attached to the second end 132 of the second strap 130 via the loop 134. In certain embodiments, the second hook 137 may be fixedly attached to the second strap 130. In other embodiments, the second hook 137 may be removably attached to the second strap 130. In certain embodiments, the second hook 137 may be formed as a wire hook shaped in the manner shown, although other forms and configurations of the second hook 137 may be used. In certain embodiments, the second hook 137 may be formed of a metal, such as stainless steel, although other suitable materials may be used. Although the illustrated embodiment includes the second hook 137 attached to the second strap 130, alternative hardware components, such as a clip, a clamp, or a ring may be attached to the second strap 130 instead of the second hook 137. The second strap 130 may be formed of a woven, flexible material having a suitable tensile strength for use under tension generated by the buckle 110. In certain embodiments, the second strap 130 may be formed of nylon or polyester, although other suitable materials may be used.

As shown in FIGS. 1A-1H, the buckle 110 may include various components for engaging and interacting with the first strap 120 and the second strap 130 to tighten the first strap 120 and the second strap 130 during use of the tie-down assembly 100. According to the illustrated embodiment, the buckle 110 may include a frame 140 (which also may be referred to as a "frame assembly," a "chassis," or a "base"), a handle 150 (which also may be referred to as a "handle assembly" or a "lever"), a drum assembly 160 (which also may be referred to as a "roller assembly" or a "barrel assembly"), a pair of link arms 170 (which also may be referred to as "pivot arms" or "links"), and a latch 180 (which also may be referred to as a "safety latch" or a "lock"). As described below, the components of the buckle 110 may cooperate with one another to generate tension in the first strap 120 and the second strap 130 when the buckle 110 is moved from the open configuration to the closed configuration and to release tension in the first strap 120 and the second strap 130 when the buckle 110 is moved from the closed configuration to the open configuration.

As shown in FIGS. 1I and 1J, the frame 140 may be formed as an elongated structure having a first end 141A and a second end 141B positioned opposite one another along a length of the frame 140. The frame 140 may include a pair of side plates 142 spaced apart from one another and extending along respective sides of the frame 140. In particular, the frame 140 may include a first side plate 142A extending along a first side of the frame 140 and a second side plate 142B extending along an opposite second side of the frame 140. In certain embodiments, as shown, the first side plate 142A and the second side plate 142B may be contoured such that a distance between the side plates 142A, 142B varies along the length of the frame 140. In particular, a first distance between the first side plate 142A and the second side plate 142B along a first portion of the frame 140 extending from the first end 141A may be greater than a second distance between the first side plate 142A and the second side plate 142B along a second portion of the frame 140 extending from the second end 141B. As shown, the frame 140 also may include an intermediate portion positioned between the first portion and the second portion, along which the distance between the first side plate 142A and the second side plate 142B transitions from the first distance to the second distance. Various shapes and configurations of the side plates 142A, 142B may be used. The frame 140 also may include a transverse plate 143 that extends along a width of the frame 140 and is attached to the side plates 142A, 142B. In certain embodiments, the transverse plate 143 may be positioned closer to the second end 141B than the first end 141A of the frame 140. In certain embodiments, the transverse plate 143 may extend along at least a portion of the intermediate portion of the frame 240 and at least a portion of the second portion of the frame 140, as shown. In certain embodiments, the side plates 142A, 142B and the transverse plate 143 may be separately formed and fixedly attached to one another, for example, by welding. In other embodiments, the side plates 142A, 142B and the transverse plate 143 may be integrally formed with one another. For example, sheet metal may be cut and bent or otherwise deformed to form the side plates 142A, 142B and the transverse plate 143. In certain embodiments, as shown, the frame 140 also may include a pair of inner side plates 144 positioned about the first end 141A of the frame 140 and extending along respective portions of the side plates 142A, 142B. In particular, the frame 140 may include a first inner side plate 144A extending along a portion of the first side plate 142A and attached thereto and a second inner side plate 144B extending along a portion of the second side plate 142B and attached thereto. In certain embodiments, the inner side plates 144A, 144B and the side plates 142A, 142B may be separately formed and fixedly attached to one another, for example, by welding. In certain embodiments, the frame 140 may be formed of a metal, such as stainless steel, although other suitable materials may be used.

The frame 140 may include a plurality of apertures defined therein and configured to facilitate attachment of other components of the tie-down assembly 100 to the frame 140. As shown, the frame 140 may include a pair of first apertures 145A, 145B, a pair of second apertures 146A, 146B, a pair of third apertures 147A, 147B, a pair of fourth apertures 148A, 148B, and a pair of fifth apertures 149A, 149B defined therein. The first apertures 145A, 145B may be coaxial with one another, with the first aperture 145A extending through the first side plate 142A and the first inner side plate 144A, and the first aperture 145B extending through the second side plate 142B and the second inner side plate 144B, as shown. As described below, the first apertures 145A, 145B may facilitate attachment of the handle 150 to the frame 140. The second apertures 146A, 146B may be coaxial with one another, with the second aperture 146A extending through the first side plate 142A and the first inner side plate 144A, and the second aperture 146B extending through the second side plate 142B and the second inner side plate 144B, as shown. As described below, the second apertures 146A, 146B may facilitate attachment of the link arms 170 to the frame 140. The third apertures 147A, 147B may be coaxial with one another, with the third aperture 147A extending through the first inner side plate 144A, and the third aperture 147B extending through the second inner side plate 144B, as shown. As described below, the third apertures 147A, 147B may facilitate attachment of the latch 180 to the frame 140. In certain embodiments, the third apertures 147A, 147B also may facilitate attachment of the first inner side plate 144A and the second inner side plate 144B to one another. The fourth apertures 148A, 148B may be coaxial with one another, with the fourth aperture 148A extending through the first side plate 142A, and the fourth aperture 148B extending through the second side plate 142B, as shown. As described below, the fourth apertures 148A, 148B may facilitate attachment of the first strap 120 to the frame 140. In certain embodiments, the fourth apertures 148A, 148B also may facilitate attachment of the first side plate 142A and the second side plate 142B to one another. The fifth apertures 149A, 149B may be coaxial with one another, with the fifth aperture 149A extending through the first side plate 142A, and the fifth aperture 149B extending through the second side plate 142B, as shown. As described below, the fifth apertures 149A, 149B may facilitate attachment of the first hook 127 to the frame 140. In certain embodiments, the fifth apertures 149A, 149B also may facilitate attachment of the first side plate 142A and the second side plate 142B to one another.

As shown in FIGS. 1K and 1L, the handle 150 may be formed as an elongated structure having a first end 151A and a second end 151B positioned opposite one another along a length of the handle 150. The handle 150 may include a pair of side plates 152 spaced apart from one another and extending along respective sides of the handle 150. In particular, the handle 150 may include a first side plate 152A extending along a first side of the handle 150 and a second side plate 152B extending along an opposite second side of the handle 150. In certain embodiments, as shown, the first side plate 152A and the second side plate 152B may be contoured such that a distance between the side plates 152A, 152B varies along the length of the handle 150. In particular, a distance between the first side plate 152A and the second side plate 152B along a first portion of the handle 150 extending from the first end 151A may be greater than a distance between the first side plate 152A and the second side plate 152B along a second portion of the handle 150 extending from the second end 151B. Various shapes and configurations of the side plates 152A, 152B may be used. The handle 150 also may include a grip 153 (which also may be referred to as a "transverse member") that extends along a width of the handle 150 and is attached to the side plates 152A, 152B. In certain embodiments, the grip 153 may be positioned at or near the first end 151A of the handle 150, although other positions of the grip 153 may be used. In certain embodiments, the side plates 152A, 152B and the grip 153 may be separately formed and fixedly attached to one another, for example, by welding. In other embodiments, the side plates 152A, 152B and the grip 153 may be integrally formed with one another. For example, the side plates 152A, 152B and the grip 153 may be machined from a workpiece of material. In certain embodiments, the handle 150 may be formed of a metal, such as stainless steel, although other suitable materials may be used.

As shown, the handle 150 also may include a plurality of protrusions configured to facilitate attachment of other components of the buckle 110 to the handle 150. In particular, the handle 150 may include a pair of first protrusions 154A, 154B and a pair of second protrusions 155A, 155B. As shown, the first protrusion 154A may extend outwardly from the first side plate 152A and perpendicular thereto, and the first protrusion 154B may extend outwardly from the second side plate 152B and perpendicular thereto. In certain embodiments, the first protrusions 154A, 154B may be formed as cylindrical members that are coaxial with one another and mirror images of one another about the longitudinal axis of the handle 150. In certain embodiments, the first protrusions 154A, 154B and the side plates 152A, 152B may be separately formed and attached to one another, for example, by welding. In other embodiments, the first protrusions 154A, 154B and the side plates 152A, 152B may be integrally formed with one another, for example, by machining a workpiece of material. As described below, the first protrusions 154A, 154B may facilitate attachment of the handle 150 to the frame 140. As shown, the second protrusion 155A may extend outwardly from the first side plate 152A and perpendicular thereto, and the second protrusion 155B may extend outwardly from the second side plate 152B and perpendicular thereto. In certain embodiments, the second protrusions 155A, 155B may be formed as cylindrical members that are coaxial with one another and mirror images of one another about the longitudinal axis of the handle 150. In certain embodiments, the second protrusions 155A, 155B and the side plates 152A, 152B may be separately formed and attached to one another, for example, by welding. In other embodiments, the second protrusions 155A, 155B and the side plates 152A, 152B may be integrally formed with one another, for example, by machining a workpiece of material. As described below, the second protrusions 155A, 155B may facilitate attachment of the drum assembly 160 to the handle 150.

As shown, the handle 150 further may include a plurality of apertures configured to facilitate attachment of other components of the buckle 110 to the handle 150. In particular, the handle 150 may include a pair of first apertures 156A, 156B, a pair of second apertures 157A, 157B, and a pair of third apertures 158A, 158B defined therein. The first apertures 156A, 156B may be coaxial with one another, with the first aperture 156A extending through the first side plate 152A and the first protrusion 154A, and the first aperture 156B extending through the second side plate 152B and the second protrusion 154B, as shown. In this manner, the first apertures 156A, 156B may be formed as thru holes extending through the respective protrusions 154A, 154B and the respective side plates 152A, 152B. In other embodiments, the first apertures 156A, 156B may be formed as blind holes extending only through the respective protrusions 154A, 154B or portions thereof (and not through the respective side plates 152A, 152B). As described below, the first apertures 156A, 156B may facilitate attachment of the handle 150 to the frame 140. The second apertures 157A, 157B may be coaxial with one another, with the second aperture 157A extending through the first side plate 152A, and the second aperture 157B extending through the second side plate 152B, as shown. The third apertures 158A, 158B may be coaxial with one another and with the second apertures 157A, 157B, with the third aperture 158A extending through the second protrusion 155A, and the third aperture 158B extending through the second protrusion 155B, as shown. The third apertures 158A, 158B may be in communication with the respective second apertures 157A, 157B, as shown. As described below, the second apertures 157A, 157B and the third apertures 158A, 158B may facilitate attachment of the drum assembly 160 to the handle 150. The handle 150 further may include one or more engagement features configured to releasably engage the latch 180. For example, the handle 150 may include a notch 159 defined along an outer edge of each of the first side plate 152A and the second side plate 152B, as shown. As described below, the notches 159 may be configured to engage the latch 180 when the buckle 110 is in the closed configuration, thereby inhibiting the handle 150 from moving relative to the frame 140. Although the illustrated embodiment includes the notches 159 of the handle for engaging the latch 180, it will be appreciated that other types of engagement features may be used to releasably engage the latch 180.

As shown in FIGS. 1M-1P, the drum assembly 160 may be formed as an elongated structure having a first end 161A and a second end 161B positioned opposite one another along a length of the drum assembly 160. The drum assembly 160 may include a drum 162 (which also may be referred to as a "roller" or a "barrel"), a pair of bearings 163, and a pair of end plates 164. As shown, the drum 162 may be formed as an elongated member that includes a pair of bars 165, a pair of inner plates 166, and a pair of protrusions 167. In particular, a first bar 165A and a second bar 165B may extend between and be attached to a first inner plate 166A and a second inner plate 166B. As shown, the first bar 165A and the second bar 165B may be spaced apart from one another to define a slot 168 therebetween, and the ends of the slot 168 may be bounded by the first inner plate 166A and the second inner plate 166B. The first bar 165A and the second bar 165B may extend parallel to one another and parallel to the longitudinal axis of the drum assembly 160, and the first inner plate 166A and the second inner plate 166B may extend perpendicular to the longitudinal axis of the drum assembly 160. As shown, the first bar 165A and the second bar 165B each may have a flat inner surface extending along the slot 168 and a contoured outer surface positioned opposite the flat inner surface. In certain embodiments, the first bar 165A and the second bar 165B may have identical shapes. In other embodiments, as shown, the first bar 165A and the second bar 165B may have different shapes. For example, the contoured outer surface of the first bar 165A may be different from the contoured outer surface of the second bar 165B. As shown, the contoured outer surface of the first bar 165A may be a curved surface having a variable radius of curvature. In particular, the contoured outer surface of the first bar 165A may have a first radius R1 along a first portion of the contoured outer surface and a second radius R2 along a second portion of the contoured outer surface, with the first radius R1 being less than the second radius R2. In certain embodiments, as shown, the first portion of the contoured outer surface may extend along a minority of the contoured outer surface, and the second portion of the contoured outer surface may extend along a majority of the contoured outer surface. As described below, the variable radius of curvature of the contoured outer surface of the first bar 165A may facilitate gripping of the second strap 130 as the second strap 130 is wrapped around the drum 162 during use of the tie-down assembly 100. As shown, the contoured outer surface of the second bar 165B may have a third radius R3 along a majority of the contoured outer surface thereof. In certain embodiments, the third radius R3 may be less than the second radius R2 and greater than or equal to the first radius R1. Various configurations of the first bar 165A and the second bar 165B may be used. The first inner plate 166A and the second inner plate 166B may be fixedly attached to the first bar 165A and the second bar 165B. In certain embodiments, as shown, the inner plates 166A, 166B may be formed as circular, disc-shaped members. As shown, a first protrusion 167A may be fixedly attached to and extend outwardly from the first inner plate 166A, and a second protrusion 167B may be fixedly attached to and extend outwardly from the second inner plate 166B. In certain embodiments, as shown, the protrusions 167A, 167B may be formed as cylindrical members. In certain embodiments, the bars 165A, 165B, the inner plates 166A, 166B, and the protrusions 167A, 167B may be integrally formed with one another, for example, by machining from a workpiece. In other embodiments, the bars 165A, 165B, the inner plates 166A, 166B, and the protrusions 167A, 167B may be separately formed and attached to one another, for example, by welding. In certain embodiments, the drum 162 may be formed of a metal, such as stainless steel, although other suitable materials may be used.

As shown, the drum assembly 160 may include a first bearing 163A and a second bearing 163B positioned about opposite ends of the drum 162. In particular, a portion of the first protrusion 167A may be positioned within the first bearing 163A, and a portion of the second protrusion 167B may be positioned within the second bearing 163B. In certain embodiments, as shown, the bearings 163A, 163B may be ring-shaped ball bearings configured to facilitate rotation of the drum 162 about the longitudinal axis of the drum assembly 160. The drum assembly 160 also may include a first end plate 164A and a second end plate 164B positioned at opposite ends of the drum 162 and attached thereto. In particular, the first end plate 164A may be attached to the end of the first protrusion 167A, and the second end plate 164B may be attached to the end of the second protrusion 167B. The end plates 164A, 164B may be fixedly attached to the respective protrusions 167A, 167B, for example, by welding or one of more fasteners. In this manner, the end plates 164A, 164B may rotate along with the drum 162 about the longitudinal axis of the drum assembly 160. As shown, each of the end plates 164A, 164B may include an aperture 169 defined therein. In particular, the first end plate 164A may include a first aperture 169A, and the second end plate 164B may include a second aperture 169B. As shown, the apertures 169A, 169B may be coaxial with one another, and the longitudinal axes of the apertures 169A, 169B may be spaced apart from and extend parallel to the longitudinal axis of the drum assembly 160. As described below, the apertures 169A, 169B may facilitate attachment of the link arms 170 to the drum assembly 160. In certain embodiments, an acute angle α may be defined between a first plane extending through the longitudinal axis of the drum assembly 160 and parallel to the flat inner surfaces of the first bar 165A and the second bar 165B and a second plane extending through the longitudinal axis of the drum assembly 160 and the longitudinal axes of the apertures 169A, 169B. The acute angle α may be selected such that the bars 165A, 165B are positioned relative to the apertures 169A, 169B to facilitate desired rotation of the drum 162 and clocking of the bars 165A, 165B throughout the rotational range of motion of the drum 162, as described below. In certain embodiments, the acute angle α may be between 30 degrees and 45 degrees, between 35 degrees and 40 degrees, or approximately 38 degrees, although other values of the acute angle α may be used.

As explained above, the buckle 110 may include a pair of the link arms 170. In particular, the buckle 110 may include a first link arm 170A for attaching to the frame 140 and the drum assembly 160 and a second link arm 170B for attaching to the frame 140 and the drum assembly 160. In certain embodiments, as shown, the first link arm 170A and the second link arm 170B may be configured in a similar manner. As shown in FIGS. 1Q and 1R, each link arm 170A, 170B may be formed as an elongated, planar structure having a first end 171A and a second end 171B positioned opposite one another along a length of the link arm 170A, 170B. In certain embodiments, as shown, each link arm 170A, 170B may have a contoured shape including one or more linear regions and one or more curved regions. In other embodiments, each link arm 170A, 170B may have a straight shape along the length of the link arm 170A, 170B. Each link arm 170A, 170B may include a plurality of apertures defined therein and configured to facilitate attachment of the link arm 170A, 170B to the frame 140 and the drum assembly 160. As shown, each link arm 170A, 170B may include a first aperture 172 and a second aperture 173 defined therein. The first aperture 172 may be positioned near the first end 171A of the link arm 170A, 170B, and the second aperture 173 may be positioned near the second end 171B of the link arm 170A, 170B. As shown, the first apertures 172 of the first link arm 170A and the second link arm 170B may be coaxial with one another, and the second apertures 173 of the first link arm 170A and the second link arm 170B may be coaxial with one another. As described below, the first aperture 172 of the first link arm 170A may facilitate attachment of the first link arm 170A to the drum assembly 160, and the second aperture 173 of the first link arm 170A may facilitate attachment of the first link arm 170A to the frame 140. In a similar manner, the first aperture 172 of the second link arm 170B may facilitate attachment of the second link arm 170B to the drum assembly 160, and the second aperture 173 of the second link arm 170B may facilitate attachment of the second link arm 170B to the frame 140. In certain embodiments, the link arms 170A, 170B may be formed of a metal, such as stainless steel, although other suitable materials may be used.

As shown in FIGS. 1S and 1T, the latch 180 may be formed as an elongated structure having a first end 181A and a second end 181B positioned opposite one another along a length of the latch 180. According to the illustrated embodiment, the latch 180 may include a tube 182, a lock member 183, a release member 184, and a pair of tabs 185. The tube 182 may extend along the length of the latch 180 and define an aperture 186 therethrough to facilitate attachment of the latch 180 to the frame 140. The lock member 183 may be attached to and extend along one side of the tube 182. As described below, the lock member 183 may be configured to engage the handle 150 when the buckle 110 is in the closed configuration. In particular, respective portions of the lock member 183 may be configured to engage the notches 159 of the handle 150 when the buckle 110 is in the closed configuration to inhibit movement of the handle 150 relative to the frame 140. As shown, the release member 184 may be attached to and extend transverse to the lock member 183. As described below, the release member 184 may be grasped and moved by a user to rotate the latch 180 relative to the frame 140. In particular, the release member 184 may be used to rotate the latch 180 relative to the frame 140 from a locked position to an unlocked position. As shown, the latch 180 may include a first tab 185A and a second tab 185B attached to and extending from the lock member 183. The first tab 185A may be positioned at or near the first end 181A of the latch 180, and the second tab 185B may be positioned at or near the second end 181B of the latch 180. The tabs 185A, 185B may be configured to facilitate attachment of a pair of biasing members 187 to the latch 180. In particular, a first biasing member 187A may be attached to the first tab 185A and the first inner side plate 144A of the frame 140, and a second biasing member 187B may be attached to the second tab 185B and the second inner side plate 144B of the frame 140. The biasing members 187A, 187B may be configured to bias the latch 180 toward the locked position. In certain embodiments, the biasing members 187A, 187B may be torsion springs, although other types of springs or other types of biasing elements may be used.

FIGS. 1A-1H illustrate the various components of the tie-down assembly 100 assembled to one another for use. A plurality of fasteners may be used to assemble the components of the tie-down assembly 100. As shown, the handle 150 may be attached to the frame 140 via a pair of first fasteners 191A, 191B. In particular, the first fastener 191A may extend through the first aperture 145A of the first side plate 142A of the frame 140 and engage the first aperture 156A of the first protrusion 154A of the handle 150, and the first fastener 191B may extend through the first aperture 145B of the second side plate 142B of the frame 140 and engage the first aperture 156B of the first protrusion 154B of the handle 150. As shown, the handle 150 may be pivotably attached to the frame 140 via the first fasteners 191A, 191B. In particular, the handle 150 may be configured to pivot between an open position (which also may be referred to as an "unlocked position" or a "first position") when the buckle 110 is in the open configuration, as shown in FIGS. 1A-1D, and a closed position (which also may be referred to as a "locked position" or a "second position") when the buckle 110 is in the closed configuration, as shown in FIGS. 1E-1H. As shown, the handle 150 may be configured to pivot relative to the frame 140 about a first axis A1 (which also may be referred to as a "pivot axis") between the open position and the closed position. It will be appreciated that the first axis A1 may be defined by the respective axes of the first apertures 145A, 145B, the first apertures 156A, 156B, and the first fasteners 191A, 191B. In certain embodiments, the first fasteners 191A, 191B may be formed as elongated, cylindrical members that are welded, threadably connected, or otherwise attached to the respective first protrusions 154A, 154B of the handle 150. In certain embodiments, the first fasteners 191A, 191B may be pins, bolts, screws, or other types of mechanical fasteners. In certain embodiments, one or more shims may be positioned between the outer ends of the respective first protrusions 154A, 154B and the adjacent inner surfaces of the inner sides plates 144A, 144B to facilitate smooth pivotal movement of the handle 150 and inhibit wear of the frame 140 and the handle 150.

As shown, the drum assembly 160 may be attached to and carried by the handle 150. The first bearing 163A of the drum assembly 160 may be positioned within the third aperture 158A of the second protrusion 155A of the handle 150, and the second bearing 163B of the drum assembly 160 may be positioned within the third aperture 158B of the second protrusion 155B of the handle 150. The drum 162 of the drum assembly 160 may extend between the side plates 152A, 152B of the handle 150 and engage the bearings 163A, 163B. In particular, the bars 165A, 165B of the drum 162 may be positioned between the side plates 152A, 152B of the handle 150, the first inner plate 166A of the drum 162 may be positioned within the second aperture 157A of the handle 150, and the second inner plate 166B of the drum 162 may be positioned within the second aperture 157B of the handle 150. Additionally, the first protrusion 167A of the drum 162 may be positioned within the third aperture 158A of the handle 150 and within the first bearing 163A, and the second protrusion 167B of the drum 162 may be positioned within the third aperture 158B of the handle 150 and within the second bearing 163B. The first end plate 164A of the drum assembly 160 may be positioned over the free end of the second protrusion 155A of the handle 150 and attached to the first protrusion 167A of the drum 162, such as by welding or other means of attachment, and the second end plate 164B of the drum assembly 160 may be positioned over the free end of the second protrusion 155B of the handle 150 and attached to the second protrusion 167B of the drum 162, such as by welding or other means of attachment. In this manner, the arrangement of the drum assembly 160 and the handle 150 may inhibit the drum assembly 160 from translating relative to the handle 150 in the direction of the longitudinal axis of the drum assembly 160. However, at least a portion of the drum assembly 160 may be configured to rotate relative to the handle 150. In particular, the drum 162 and the end plates 164A, 164B may be configured to rotate relative to the handle 150 about a second axis A2 (which also may be referred to as a "rotational axis"). It will be appreciated that the second axis A2 may be defined by the respective axes of the second apertures 157A, 157B, the third apertures 158A, 158B, the bearings 163A, 163B, and the drum 162. In certain embodiments, portions of the bearings 163A, 163B also may rotate relative to the handle 150, such as inner races of the bearings 163A, 163B. In certain embodiments, one or more shims may be positioned between respective adjacent surfaces of components or features of the drum assembly 160 and/or the handle 150 which rotate relative to one another to facilitate smooth rotational movement of and inhibit wear of the components and/or features.

As shown, the link arms 170A, 170B may be attached to the frame 140 via a pair of second fasteners 192A, 192B. In particular, the second fastener 192A may extend through the second aperture 146A of the first side plate 142A of the frame 140 and engage the second aperture 173 of the first link arm 170A, and the second fastener 192B may extend through the second aperture 146B of the second side plate 142B of the frame 140 and engage the second aperture 173 of the second link arm 170B. As shown, the link arms 170A, 170B may be pivotably attached to the frame 140 via the second fasteners 192A, 192B. In particular, the link arms 170A, 170B may be configured to pivot between an open position (which also may be referred to as an "unlocked position" or a "first position") when the buckle 110 is in the open configuration, as shown in FIGS. 1A-1D, and a closed position (which also may be referred to as a "locked position" or a "second position") when the buckle 110 is in the closed configuration, as shown in FIGS. 1E-1H. As shown, the link arms 170A, 170B may be configured to pivot relative to the frame 140 about a third axis A3 (which also may be referred to as a "pivot axis") between the open position and the closed position. It will be appreciated that the third axis A3 may be defined by the respective axes of the second apertures 146A, 146B, the second apertures 173, and the second fasteners 192A, 192B. In certain embodiments, the second fasteners 192A, 192B may be formed as elongated, cylindrical members that are welded, threadably connected, or otherwise attached to the respective link arms 170A, 170B. In certain embodiments, the second fasteners 192A, 192B may be pins, bolts, screws, or other types of mechanical fasteners. In certain embodiments, one or more shims may be positioned between the outer surfaces of the respective link arms 170A, 170B and the adjacent inner surfaces of the inner side plates 144A, 144B to facilitate smooth pivotal movement of the link arms 170A, 170B and inhibit wear of the frame 140 and the link arms 170A, 170B.

As shown, the link arms 170A, 170B also may be attached to the drum assembly 160 via a pair of third fasteners 193A, 193B. In particular, the third fastener 193A may extend through the first aperture 172 of the first link arm 170A and engage the aperture 169A of the first end plate 164A, and the third fastener 193B may extend through the first aperture 172 of the second link arm 170B and engage the aperture 169B of the second end plate 164B. As shown, the link arms 170A, 170B may be pivotably attached to the end plates 164A, 164B via the third fasteners 193A, 193B. In particular, the link arms 170A, 170B may be configured to pivot between the open position when the buckle 110 is in the open configuration, as shown in FIGS. 1A-1D, and the closed position when the buckle 110 is in the closed configuration, as shown in FIGS. 1E-1H. As shown, the link arms 170A, 170B may be configured to pivot relative to the end plates 164A, 164B about a fourth axis A4 (which also may be referred to as a "pivot axis") between the open position and the closed position. It will be appreciated that the fourth axis A4 may be defined by the respective axes of the first apertures 172, the apertures 169A, 169B, and the third fasteners 193A, 193B. In certain embodiments, the third fasteners 193A, 193B may be formed as elongated, cylindrical members that are welded, threadably connected, or otherwise attached to the respective end plates 164A, 164B. In certain embodiments, the third fasteners 193A, 193B may be pins, bolts, screws, or other types of mechanical fasteners. In certain embodiments, one or more shims may be positioned between the inner surfaces of the respective link arms 170A, 170B and the adjacent outer surfaces of the end plates 164A, 164B to facilitate smooth pivotal movement of the link arms 170A, 170B and inhibit wear of the end plates 164A, 164B and the link arms 170A, 170B.

As shown, the latch 180 may be attached to the frame 140 via a fourth fastener 194 (which also may be referred to as a "cross member" or a "transverse member"). In particular, the fourth fastener 194 may extend through the third apertures 147A, 147B of the inner side plates 144A, 144B of the frame 140 and through the aperture 186 of the latch 180. As shown, the latch 180 may be pivotably attached to the frame 140 via the fourth fastener 194. In particular, the latch 180 may be configured to pivot between a locked position (which also may be referred to as a "first position"), as shown in FIGS. 1A-1H, and an unlocked position (which also may be referred to as a "second position"). As shown, the latch 180 may be configured to pivot relative to the frame 140 about a fifth axis A5 (which also may be referred to as a "pivot axis") between the locked position and the unlocked position. It will be appreciated that the fifth axis A5 may be defined by the respective axes of the third apertures 147A, 147B, the aperture 186, and the fourth fastener 194. In certain embodiments, the fourth fastener 194 may be formed as an elongated, cylindrical member that is welded, threadably connected, or otherwise attached to the inner side plates 144A, 144B of the frame 140. It will be appreciated that, by attaching the fourth fastener 194 to the inner side plates 144A, 144B, the fourth fastener 194 may enhance the structural integrity of and inhibit deformation of the frame 140. In certain embodiments, the fourth fastener 194 may be a pin, a bolt, a screw, or other type of mechanical fasteners. In certain embodiments, one or more shims may be positioned between the end surfaces of the latch 180 and the adjacent inner surfaces of the inner side plates 144A, 144B to facilitate smooth pivotal movement of the latch 180 and inhibit wear of the frame 140 and the latch 180. As shown, the biasing members 187A, 187B may be attached to the frame 140 and the latch 180. In particular, the first biasing member 187A may be attached to the first inner side plate 144A of the frame 140 and to the first tab 185A of the latch 180, and the second biasing member 187B may be attached to the second inner side plate 144B of the frame 140 and to the second tab 185B of the latch 180. In certain embodiments, respective portions of the biasing members 187A, 187B may be welded to the inner side plates 144A, 144B and the tabs 185A, 185B, although other means of attachment, such as fasteners, may be used. As described above, the biasing members 187A, 187B may be configured to bias the latch 180 to the locked position.

As shown, the first strap 120 may be attached to the buckle 110 via a fifth fastener 195 (which also may be referred to as a "cross member" or a "transverse member"). In particular, the fifth fastener 195 may extend through the fourth apertures 148A, 148B of the side plates 142A, 142B of the frame 140 and through the first loop 123 of the first strap 120. In this manner, the fifth fastener 195 may be attached to the side plates 142A, 142B and may fixedly attach the first strap 120 to the frame 140. In certain embodiments, the fifth fastener 195 may be formed as an elongated, cylindrical member that is welded, threadably connected, or otherwise attached to the side plates 142A, 142B. It will be appreciated that, by attaching the fifth fastener 195 to the side plates 142A, 142B, the fifth fastener 195 may enhance the structural integrity of and inhibit deformation of the frame 140. In certain embodiments, the fifth fastener 195 may be a pin, a bolt, a screw, or other type of mechanical fastener. In certain embodiments, as shown, the tie-down assembly 100 may include a sixth fastener 196 configured to allow the first hook 127 to be removably attached to the buckle 110. In particular, the sixth fastener 196 may extend through the fifth apertures 149A, 149B of the side plates 142A, 142B of the frame 140. In this manner, the sixth fastener 196 may be attached to the side plates 142A, 142B and may allow the second hook 127 to be removably attached to the frame 140. For example, during use of the tie-down assembly 100, the first strap 120 may be wrapped around a portion of a cargo item or a support structure at a first connection point P1, and the first hook 127 may be attached to the sixth fastener 196, as shown in FIGS. 1A and 1E. Additionally, the first hook 127 may be attached to the sixth fastener 196 during storage of the tie-down assembly 100. In certain embodiments, the sixth fastener 196 may be formed as an elongated, cylindrical member that is welded, threadably connected, or otherwise attached to the side plates 142A, 142B. It will be appreciated that, by attaching the sixth fastener 196 to the side plates 142A, 142B, the sixth fastener 196 may enhance the structural integrity of and inhibit deformation of the frame 140. In certain embodiments, the sixth fastener 196 may be a pin, a bolt, a screw, or other type of mechanical fastener.

FIGS. 1A-1H illustrate an example use of the tie-down assembly 100 to secure a cargo item C to a support structure S for transport or storage. It will be appreciated that only a portion of the cargo item C and a portion of the support structure S are shown in the drawings for illustration purposes. Use of the tie-down assembly 100 may begin by attaching the assembly 100 to the cargo item C at a first connection point P1. In certain embodiments, as shown, the first strap 120 may be wrapped around a portion of the cargo item C, and the first hook 127 may be attached to the sixth fastener 196. In this manner, the buckle 110 may be connected to the cargo item C via the first strap 120. In other embodiments, when desired, the first hook 127 may be attached to a portion of the cargo item C, for example, when the cargo item C is shaped in a manner that allows secure engagement with the first hook 127. In this manner, the buckle 110 may be connected to the cargo item C via the first hook 127 and the first strap 120. In certain embodiments, the tie-down assembly 100 may be attached to the cargo item C while the buckle 110 is in the open configuration. In other embodiments, the tie-down assembly 100 may be attached to the cargo item C while the buckle 110 is in the closed configuration.

As shown, the second hook 137 may be attached to the support structure S at a second connection point P2. In certain embodiments, the second hook 137 may be attached to the support structure S after attaching the tie-down assembly 100 to the cargo item C. In other embodiments, the second hook 137 may be attached to the support structure S before attaching the tie-down assembly 100 to the cargo item C. Either before or after attaching the second hook 137 to the support structure S, the second strap 130 may be attached to the drum 162. In certain embodiments, as shown, the second strap 130 may be attached to the drum 162 while the buckle 110 is in the open configuration. As shown in FIGS. 1A-1D, the drum 162 may be positioned below the frame 140 when the buckle 110 is in the open configuration. In this manner, the drum 162 may be easily accessible and viewable for attaching the second strap 130 thereto. In particular, the first end 131 of the second strap 130 may be passed under the drum 162 and back through the slot 168 between the bars 165A, 165B toward the second end 132 of the second strap 130, as shown. In this manner, the buckle 110 may be connected to the support structure S via the second strap 130 and the second hook 137. In certain embodiments, the first end 131 of the second strap 130 may be pulled toward the second end 132 of the second strap 130 and the second hook 137 to remove some slack from the portion of the second strap 130 extending between the second hook 137 and the drum 162. In certain embodiments, as shown, an amount of slack may remain in the portion of the second strap 130 extending between the second hook 137 and the drum 162.

In other embodiments, an amount of slack may remain in a portion of the first strap 120 between the buckle 110 and the cargo item C, while less or no slack may remain in the in the portion of the second strap 130 extending between the second hook 137 and the drum 162. It will be appreciated that a limited amount of slack in one or both of the first strap 120 or the second strap 130 may be desirable to ease movement of the buckle 110 from the open configuration to the closed configuration and to achieve a desired degree of tension in the straps 120, 130. In certain embodiments, the tie-down assembly 100 may include or may be used with an additional component or mechanism configured to provide a desired amount of slack in one or both of the first strap 120 or the second strap 130, such as one of the components or mechanisms described below with respect to FIGS. 3A-5E.

After attaching the tie-down assembly 100 to the cargo item C and the support structure, the buckle 110 may be moved or transitioned from the open configuration to the closed configuration, as shown in FIGS. 1E-1H. In particular, a user may grasp the grip 153 of the handle 150 and pivot the handle 150 relative to the frame 140 from the open position to the closed position in order to move the buckle 110 from the open configuration to the closed configuration. As described above, the handle 150 may pivot relative to the frame 140 about the first axis A1. As the handle 150 is pivoted from the open position to the closed position, the link arms 170A, 170B may pivot relative to the side plates 142A, 142B of the frame 140 and relative to the end plates 164A, 164B of the drum assembly 162. As described above, the link arms 170A, 170B may pivot relative to the side plates 142A, 142B about the third axis A3, and the link arms 170A, 170B may pivot relative to the end plates 164A, 164B about the fourth axis A4. In view of the configuration of the frame 140, the handle 150, the drum assembly 160, and the link arms 170A, 170B and the respective positions of the axes A1, A2, A3, A4, the pivotal movement of the link arms 170A, 170B may cause the drum 162 to rotate relative to the handle 150. In particular, the drum 162 may rotate relative to the handle 150 in a first direction as the handle 150 is pivoted from the open position to the closed position. As described above, the drum 162 may rotate relative to the handle 150 about the second axis A2.

As shown, the rotation of the drum 162 relative to the handle 150 in the first direction may cause the second strap 130 to wrap around the drum 162. In particular, the second strap 130 may wrap around the bars 165A, 165B of the drum 162. In certain embodiments, when the buckle 110 is in the closed configuration, the second strap 130 may overlap itself in the manner shown in FIGS. 1E-1H. The wrapping of the second strap 130 around the drum 162 may remove the slack from and generate tension in the portion of the second strap 130 extending between the second hook 137 and the drum 162. In this manner, the movement of the buckle 110 from the open configuration to the closed configuration may tighten the first strap 120 and the second strap 130 between the first connection point P1 and the second connection point P2. In certain embodiments, as shown, the link arms 170A, 170B and the respective axes A1, A2, A3, A4 may be configured such that the drum 162 rotates relative to the handle 150 at a varying rate when the handle 150 is pivoted relative to the frame 140 at a constant rate. In particular, the drum 162 may rotate at a first rate during a first portion of the pivotal movement of the handle 150 from the open position to the closed position, and the drum 162 may rotate at a second rate during a subsequent second portion of the pivotal movement of the handle 150 from the open position to the closed position, with the first rate being greater than the second rate. In this manner, the second strap 130 may wrap around the drum 162 more quickly during the first portion of the pivotal movement than during the second portion of the pivotal movement. As a result, the drum 162 may grip the engaged portion of the second strap 130 soon after the handle 150 begins to pivot from the open position to the closed position. In particular, the rapid rate of rotation of the drum 162 during the first portion of the pivotal movement of the handle 150 may cause the engaged portion of the second strap 130 to overlap itself quickly around the drum 162. For example, the initial rotation of the drum 162 may cause the second strap 130 to overlap itself initially along the second bar 165B of the drum 162, as shown in FIGS. 1F and 1H. Such overlapping of the engaged portion of the second strap 130 may generate a sufficient amount of friction between the overlapping layers of the second strap 130 as the overlapping layers of the second strap 130 are pulled in opposite directions during rotation of the drum 162, thereby causing the drum 162 to securely grip the engaged portion of the second strap 130. Quick gripping engagement between the drum 162 and the engaged portion of the second strap 130 also may be facilitated by the variable radius of curvature of the contoured outer surface of the first bar 165A. As described above, the first portion of the contoured outer surface of the first bar 165A may have the first radius R1 that is less than the second radius R2 of the second portion of the contoured outer surface of the first bar 165A. The smaller first radius R1 may provide greater friction between the first bar 165A and the engaged portion of the second strap 130, thereby allowing the drum 162 to grip the engaged portion of the second strap 130 soon after the handle 150 begins to pivot from the open position to the closed position.

As the handle 150 approaches the closed position, the side plates 152A, 152B may engage the lock member 183 of the latch 180 and cause the latch 180 to pivot away from the locked position toward the unlocked position. As described above, the latch 180 may pivot relative to the frame 140 about the fifth axis A5. When the handle 150 reaches the closed position, the biasing members 187A, 187B may bias the latch 180 back to the locked position, thereby causing the tabs 185A, 185B to engage the respective notches 159 of the handle 150, as shown. The engagement between the tabs 185A, 185B of the latch 180 and the notches 159 of the handle 150 may maintain the handle 150 in the closed position while the latch 180 is maintained in the locked position by the biasing members 187A, 187B. In this manner, the latch 180 may maintain the buckle 110 in the closed configuration. While the buckle 110 is in the closed configuration, the buckle 110 may maintain the tension in the first strap 120 and the second strap 130, thereby securing the cargo item C relative to the support structure S for transport or storage.

It will be appreciated that the configuration of the frame 140, the handle 150, the drum assembly 160, and the link arms 170A, 170B may function as an over-center locking mechanism as the buckle 110 is moved between the open configuration and the closed configuration. In particular, as the handle 150 is pivoted from the open position to the closed position, the drum 162 may move toward a center position, through the center position, and beyond the center position to an over-center position. The center position of the drum 162 may be the position at which a greatest amount of tension is generated in the first strap 120 and the second strap 130 between the connection points P1, P2. In this manner, the tension in the straps 120, 130 may increase as the drum 162 moves, along with the handle 150, toward the center position, and the tension in the straps 120, 130 may decrease as the drum 162 moves, along with the handle 150, beyond the center position to the over-center position. In certain embodiments, the center position of the drum 162 may be the position in which the second axis A2 is coplanar with the first axis A1 and the third axis A3. In certain embodiments, as shown, the rapid rate of rotation of the drum 162 during the first portion of the pivotal movement of the handle 150 from the open position to the closed position may cause the drum 162 to grip the engaged portion of the second strap 130, by overlapping the second strap 130, before the drum 162 reaches the center position. Further, the slower rate of rotation of the drum 162 during the second portion of the pivotal movement of the handle 150 may begin before the drum 162 reaches the center position. In this manner, the slower rate of rotation of the drum 162 may ease movement of the drum 162 through and beyond the center position (i.e., the position of greatest tension in the straps 120, 130), requiring less pressure on the handle 150 to achieve such movement. The over-center locking mechanism may provide a primary locking feature for maintaining the handle 150 in the closed position and the overall buckle 110 in the closed configuration. In particular, when the handle 150 is in the closed position and the drum 162 is in the over-center position, the tension in the straps 120, 130 may inhibit movement of the handle 150 from the closed position toward the open position. In this manner, the engagement between the tabs 185A, 185B of the latch 180 and the notches 159 of the handle 150 may function as a secondary locking feature in addition to the locking function provided by the over-center locking mechanism.

When the tie-down assembly 100 is no longer needed to secure the cargo item C to the support structure S, the assembly 100 may be removed therefrom. The buckle 110 may be moved from the closed configuration to the open configuration to allow the tie-down assembly 100 to be removed from the cargo item C and the support structure S. The latch 180 may be pivoted relative to the frame 140 from the locked position to the unlocked position, and the handle 150 may be pivoted from the closed position to the open position to move the buckle 110 from the closed configuration to the open configuration. As the handle 150 is moved from the closed position to the open position, the drum 162 may rotate in a second direction opposite the first direction. In this manner, the engaged portion of the second strap 130 may be unwrapped from around the drum 162 as the drum 162 rotates in the second direction. When the buckle 110 is in the open configuration, the portion of the second strap 130 extending between the second hook 137 and the drum 162 may be pulled away from the drum 162, such that at least a portion of the remainder of the second strap 130 is pulled through the slot 168 and removed from the drum 162. Once a sufficient amount of tension has been removed from the straps 120, 130, the first strap 120 (or the first hook 127) may be detached from the cargo item C, and the second hook 137 may be detached from the support structure S.

Figure 2A:
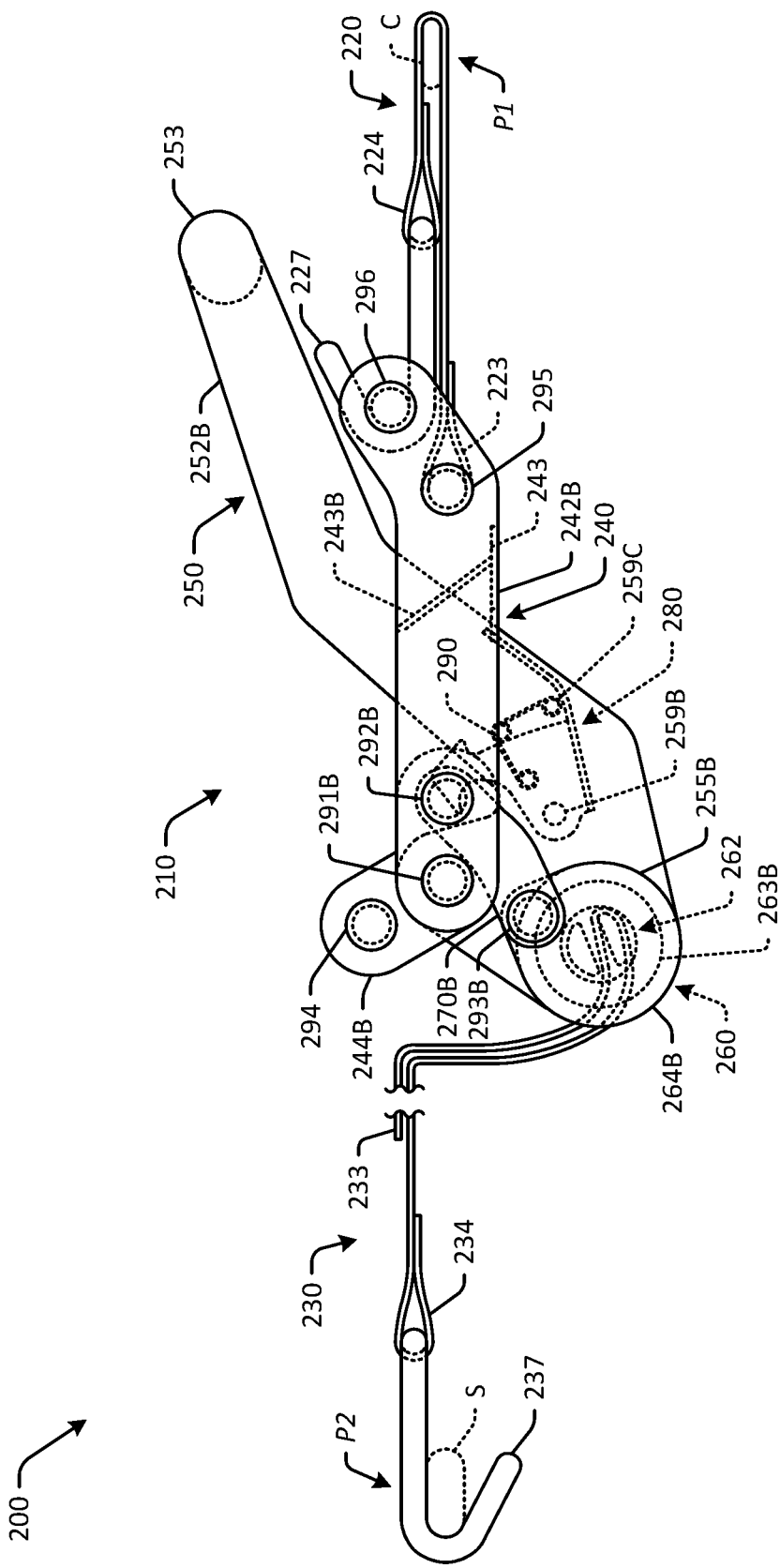
FIG. 2A is a side view of a tie-down assembly in accordance with one or more embodiments of the disclosure, showing a buckle of the tie-down assembly in an open configuration and connected to a cargo item and a support structure by a first strap, a first hook, a second strap, and a second hook of the tie-down assembly.
Figure 2B:
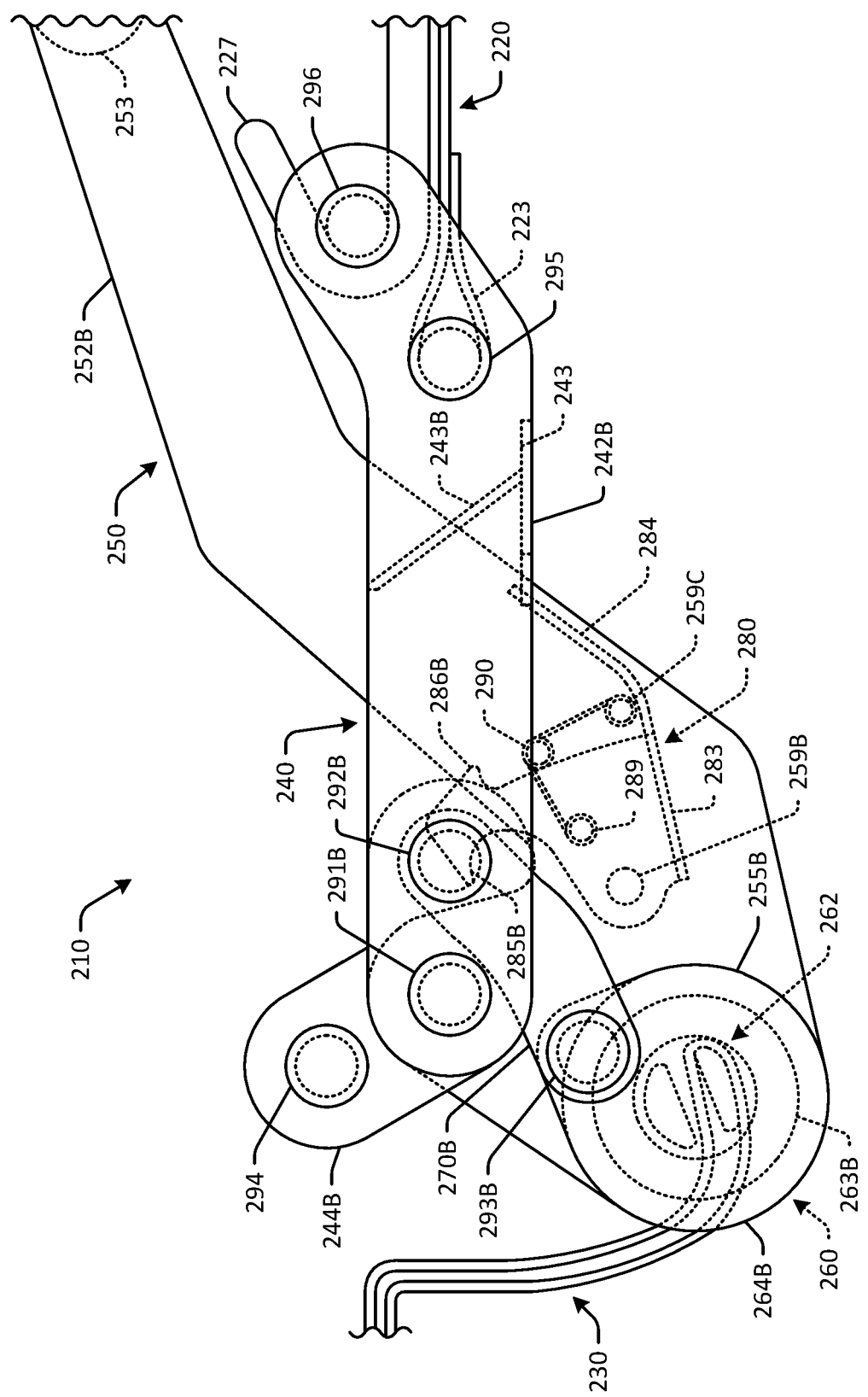
FIG. 2B is a detailed side view of a portion of the tie-down assembly of FIG. 2A, showing the buckle in the open configuration.
Figure 2C:
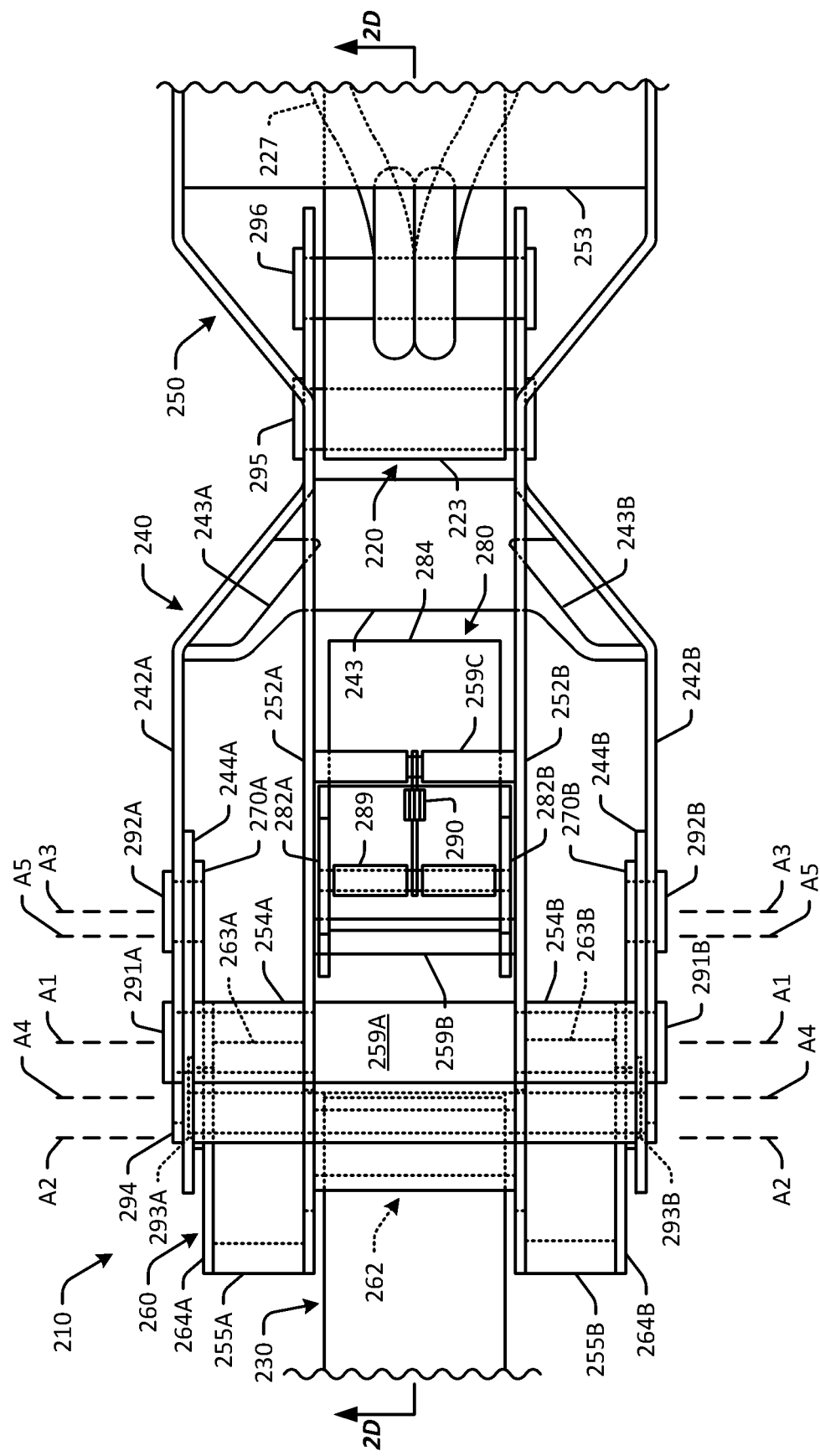
FIG. 2C is a detailed top view of a portion of the tie-down assembly of FIG. 2A, showing the buckle in the open configuration.
Figure 2D:
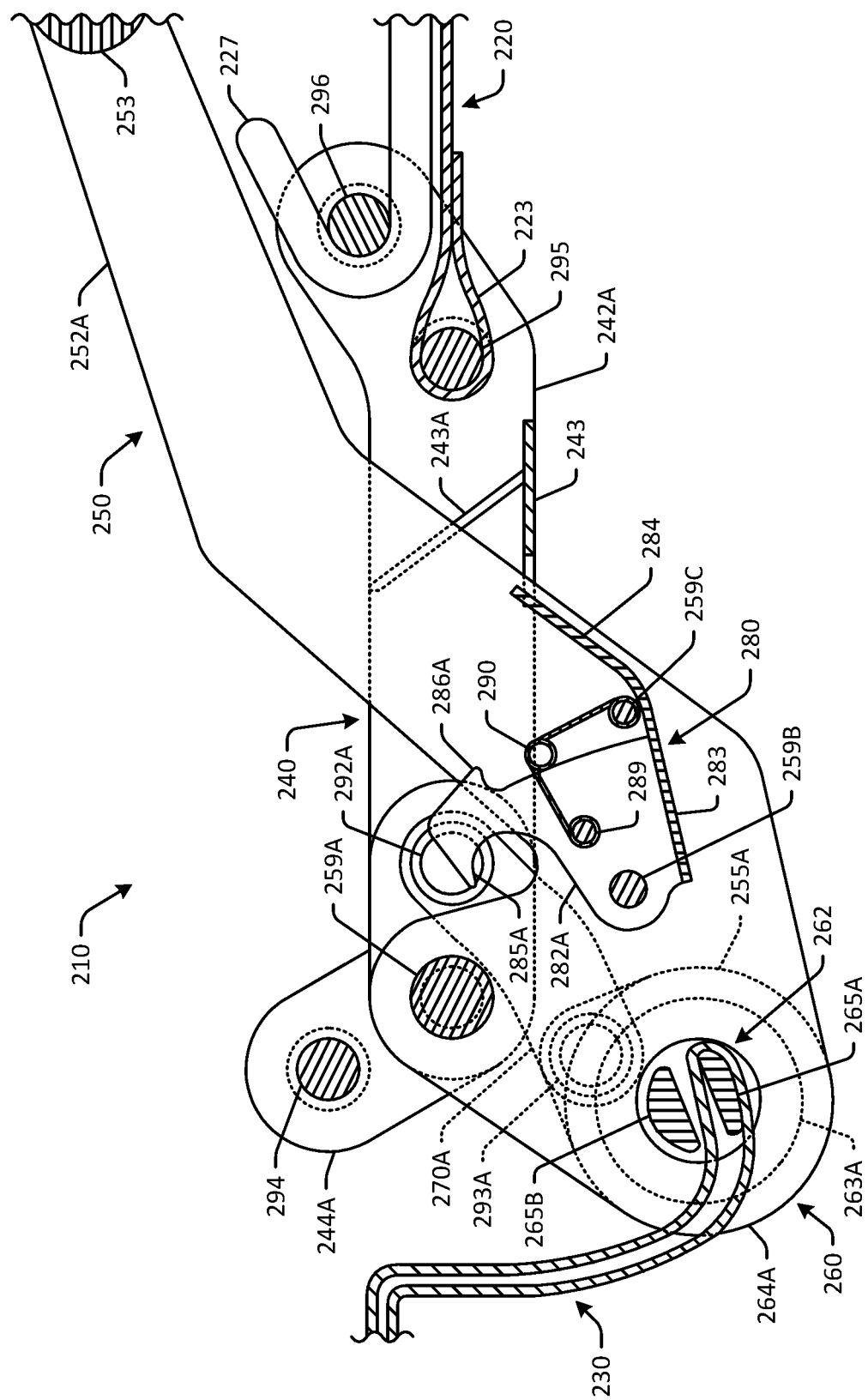
FIG. 2D is a detailed cross-sectional side view of a portion of the tie-down assembly of FIG. 2A, taken along line 2D-2D of FIG. 2C, showing the buckle in the open configuration.
Figure 2E:
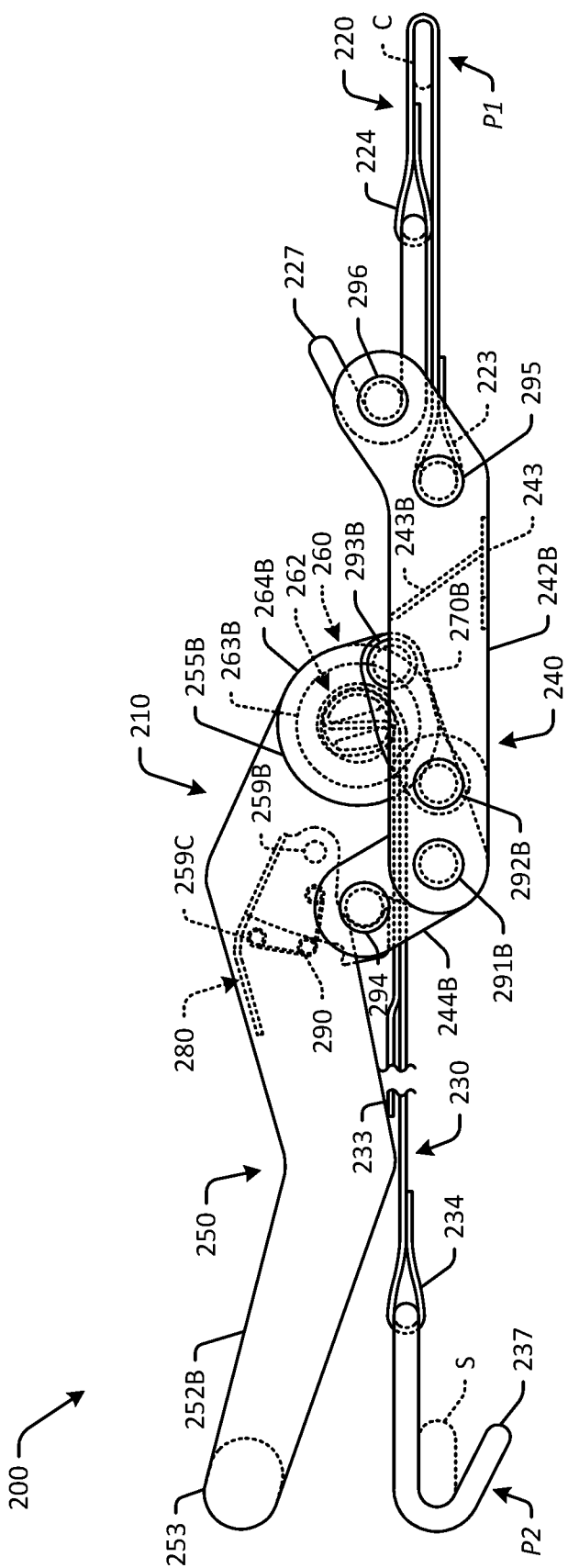
FIG. 2E is a side view of the tie-down assembly of FIG. 2A, showing the buckle in a closed configuration and connected to the cargo item and the support structure by the first strap and the second strap.
Figure 2F:
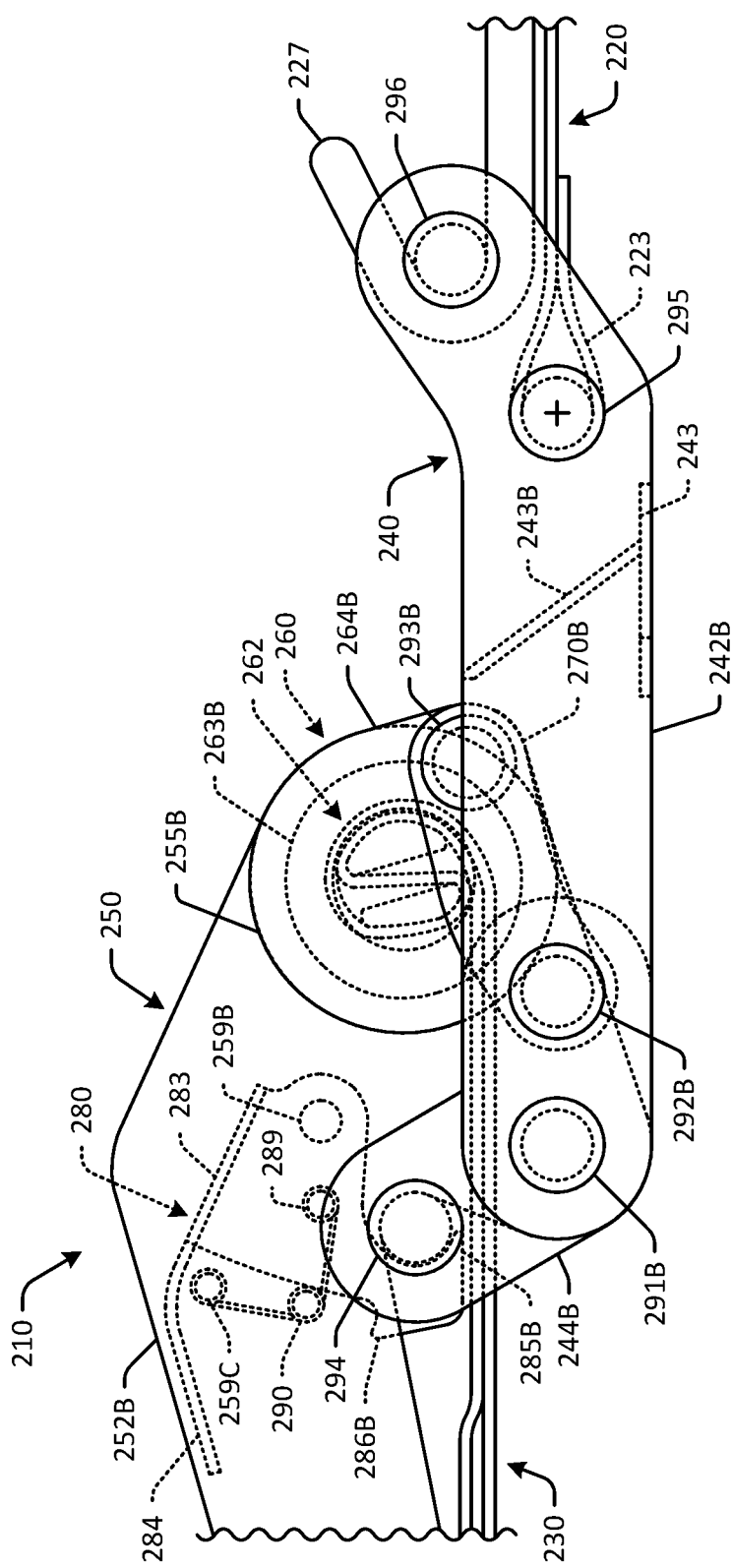
FIG. 2F is a detailed side view of a portion of the tie-down assembly of FIG. 2A, showing the buckle in the closed configuration.
Figure 2G:
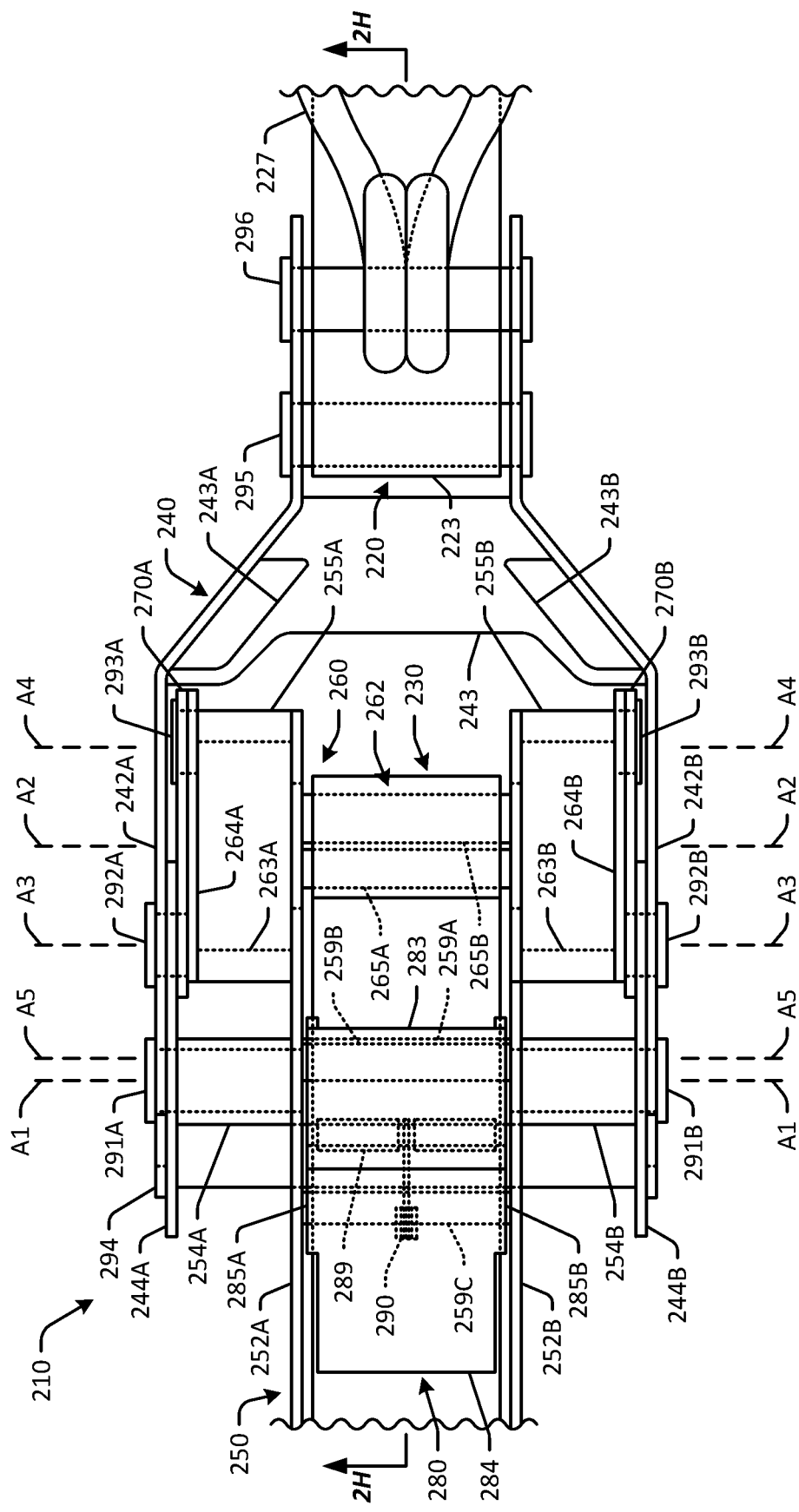
FIG. 2G is a detailed top view of a portion of the tie-down assembly of FIG. 2A, showing the buckle in the closed configuration.
Figure 2H:
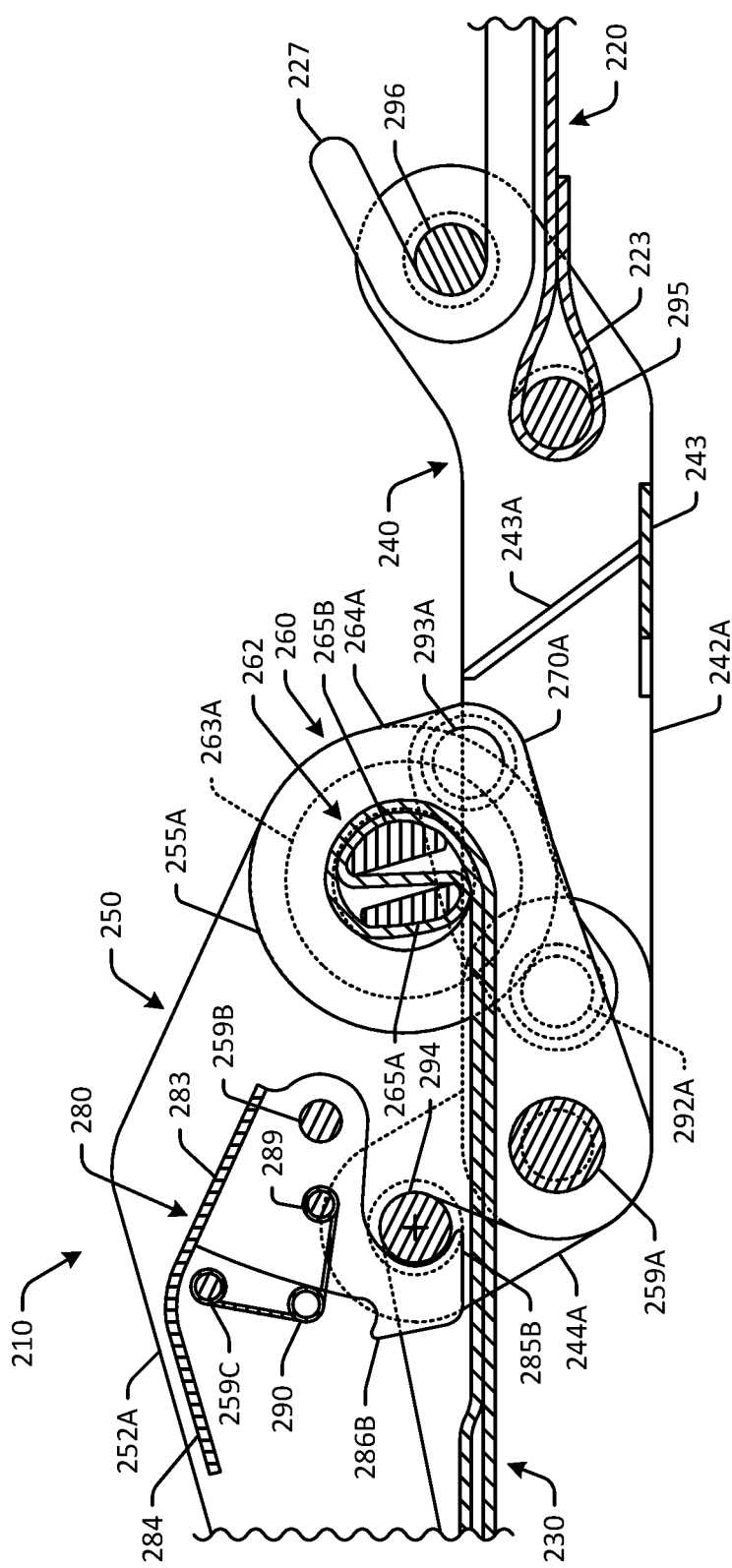
FIG. 2H is a detailed cross-sectional side view of a portion of the tie-down assembly of FIG. 2A, taken along line 2H-2H of FIG. 2G, showing the buckle in the closed configuration.
Figure 2K:
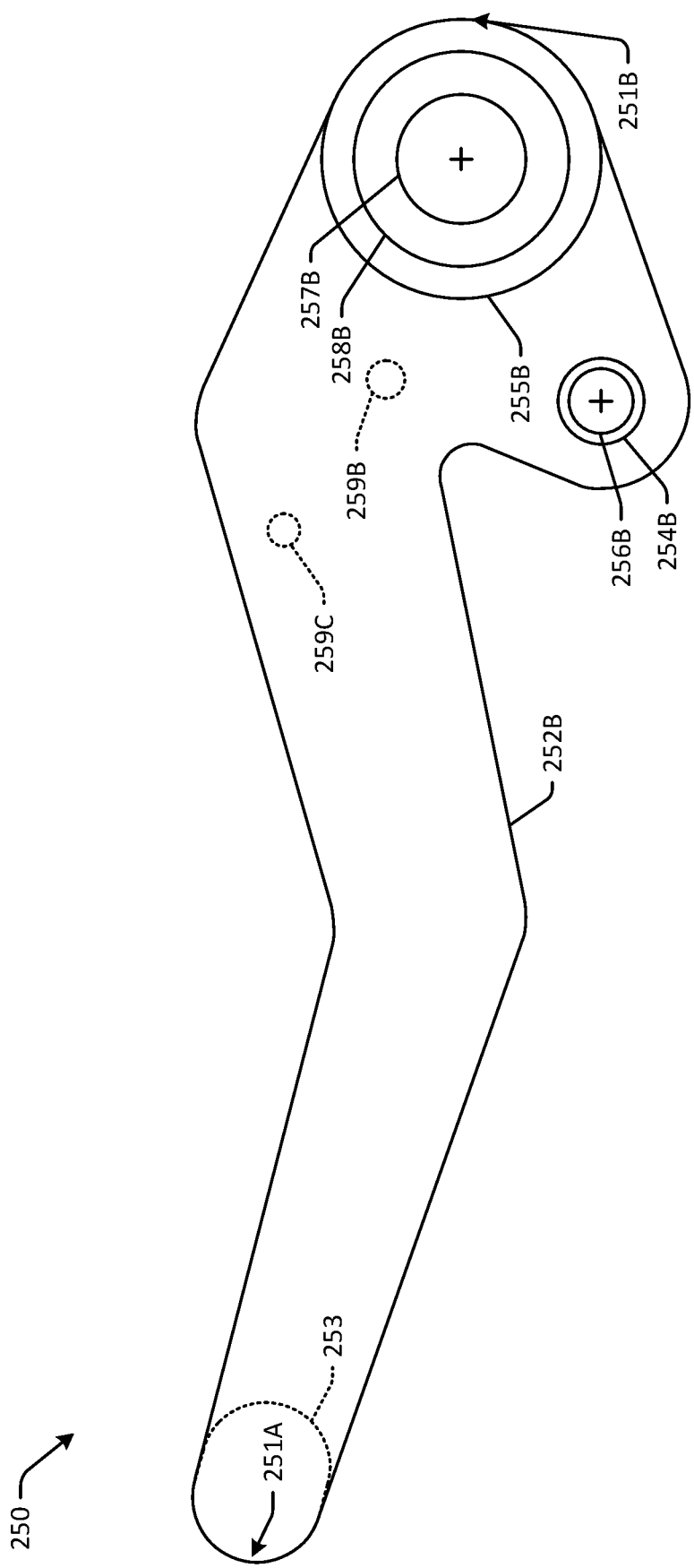
FIG. 2K is a side view of a handle of the buckle of the tie-down assembly of FIG. 2A.
Figure 2L:
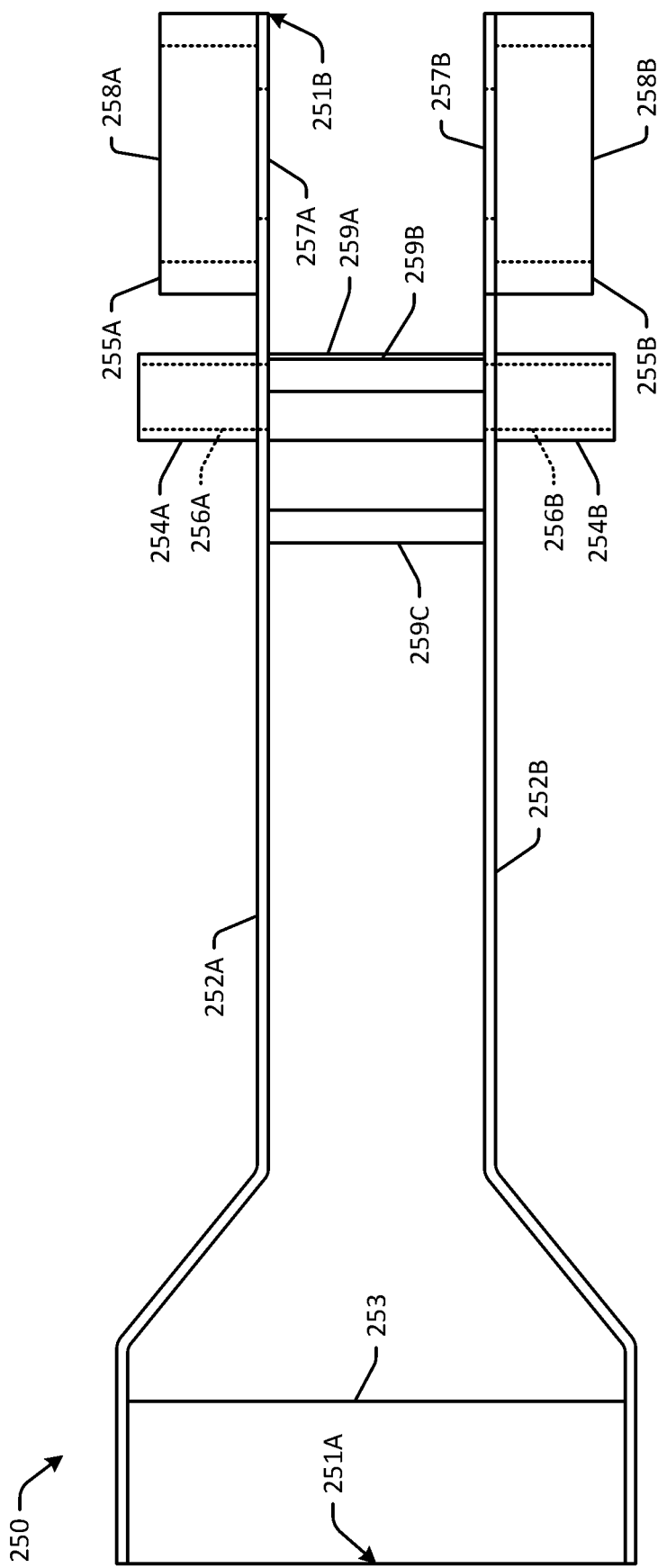
FIG. 2L is a top view of the handle of the buckle of the tie-down assembly of FIG. 2A.
Figure 2U:
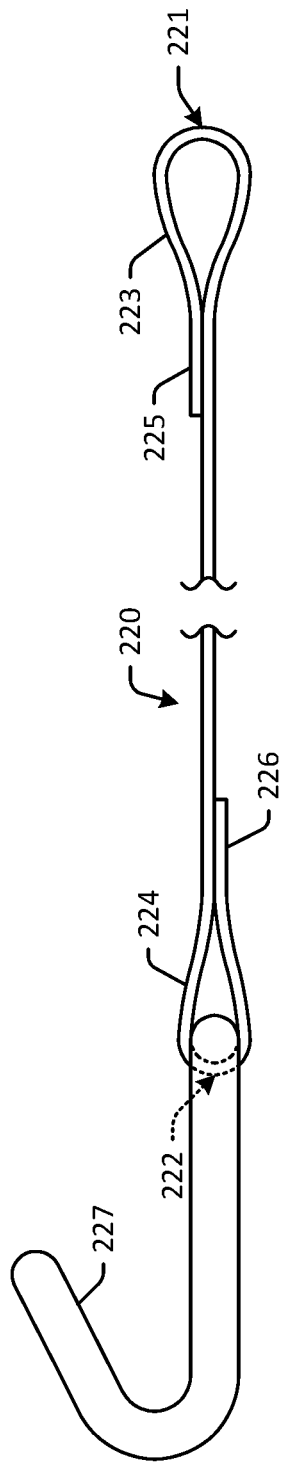
FIG. 2U is a side view of the first strap and the first hook of the tie-down assembly of FIG. 2A.
Figure 2V:
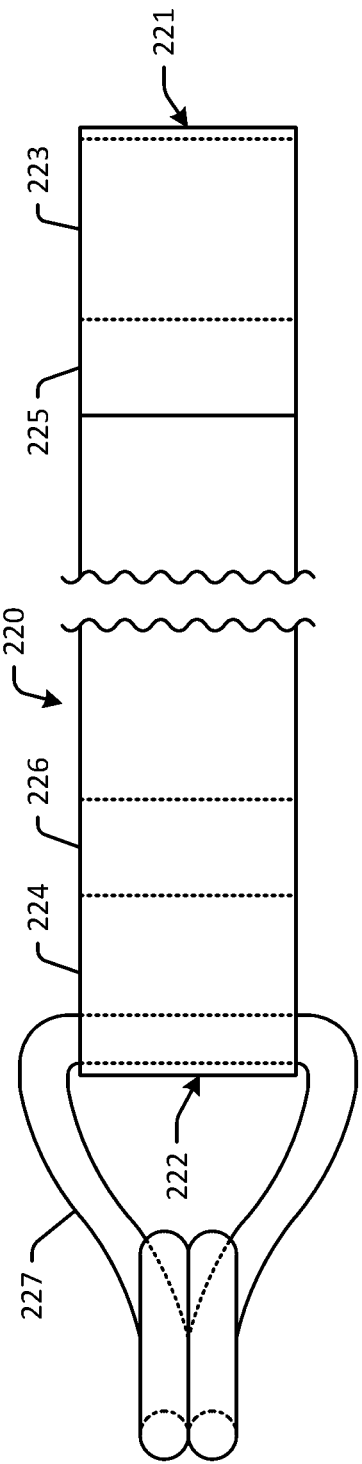
FIG. 2V is a top view of the first strap and the first hook of the tie-down assembly of FIG. 2A.
Figure 2W:
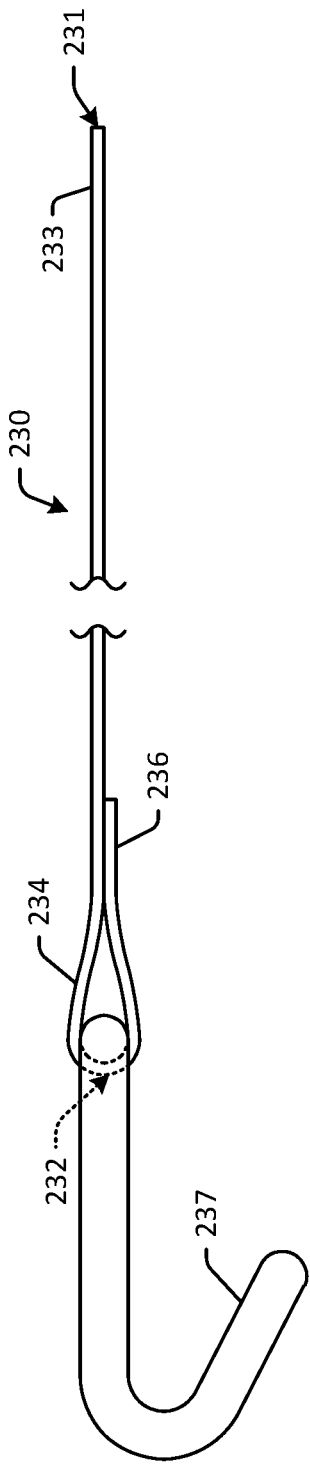
FIG. 2W is a side view of the second strap and the second hook of the tie-down assembly of FIG. 2A.
Figure 2X:
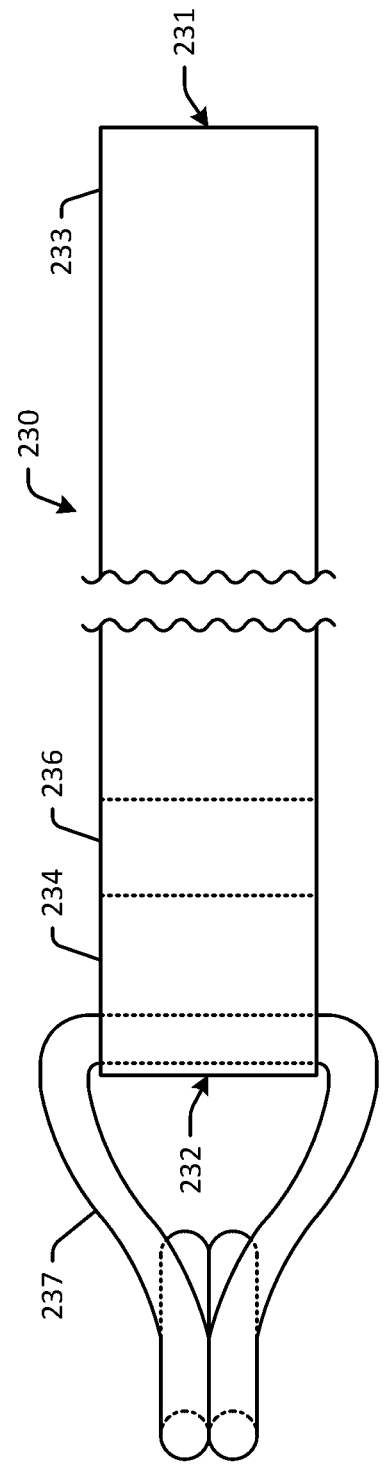
FIG. 2X is a top view of the second strap and the second hook of the tie-down assembly of FIG. 2A.

FIGS. 2A-2X illustrate a tie-down assembly 200 (which also may be referred to as a "ratchetless tie-down assembly," a "tie-down buckle assembly," a "tie-down strap assembly," or simply an "assembly") configured to secure a cargo item to a support structure, in accordance with one or more embodiments of the disclosure. For example, the tie-down assembly 200 may be used in various applications for securing a car, a motorcycle, an all-terrain vehicle, or other heavy cargo item to a truck bed, a trailer, a vehicle container, or other support structure for transport or storage. It will be appreciated that the tie-down assembly 200 may be provided in various sizes suitable for light-duty, moderate-duty, and heavy-duty applications. Further, it will be appreciated that the tie-down assembly 200 illustrated in FIGS. 2A-2X provides one example configuration of the assembly 200 and components thereof, and that various other configurations may be used without departing from the scope of the present disclosure.

As shown in FIGS. 2A and 2E, the tie-down assembly 200 may include a buckle 210 (which also may be referred to as a "ratchetless buckle" or a "buckle assembly"), a first strap 220 (which also may be referred to as a "fixed strap"), and a second strap 230 (which also may be referred to as a "removable strap"). As described below, the first strap 220 may be fixedly attached to the buckle 210, and the second strap 230 may be removably attached to the buckle 210 during use of the tie-down assembly 200. The first strap 220 may be used to connect the tie-down assembly 200 to one of a cargo item or a support structure at a first connection point P1, and the second strap 230 may be used to connect the tie-down assembly 200 to the other of the cargo item or the support structure at a second connection point P2. The buckle 210 may be configured for tightening the first strap 220 and the second strap 230 between the first connection point P1 and the second connection point P2. In this manner, the tie-down assembly 200 may provide a secure hold of the cargo item relative to the support structure. As described further below, the buckle 210 may be configured to move or be transitioned between an open configuration (which also may be referred to as an "unlocked configuration" or a "first configuration"), as shown in FIGS. 2A-2D, and a closed configuration (which also may be referred to as a "locked configuration" or a "second configuration"), as shown in FIGS. 2E-2H. The components of the buckle 210 and their respective positions and orientations when the buckle 210 is in the open configuration and the closed configuration are described in detail below.

As shown in FIGS. 2U and 2V, the first strap 220 may be formed as an elongated member having a first end 221 and a second end 222 positioned opposite one another. In certain embodiments, as shown, the first strap 220 may include a first loop 223 positioned at the first end 221 and a second loop 224 positioned at the second end 222. The first loop 223 may be formed by overlapping portions of the first strap 220 that are attached to one another, for example, by stitching or other attachment means, along a first attachment region 225. In a similar manner, the second loop 224 may be formed by overlapping portions of the first strap 220 that are attached to one another, for example, by stitching or other attachment means, along a second attachment region 226. As described below, the first loop 223 may facilitate attachment of the first strap 220 to the buckle 210. In certain embodiments, as shown, a first hook 227 (which also may be referred to as a "first hardware component") may be attached to the second end 222 of the first strap 220 via the second loop 224. In certain embodiments, the first hook 227 may be fixedly attached to the first strap 220. In other embodiments, the first hook 227 may be removably attached to the first strap 220. In certain embodiments, the first hook 227 may be formed as a wire hook shaped in the manner shown, although other forms and configurations of the first hook 227 may be used. In certain embodiments, the first hook 227 may be formed of a metal, such as stainless steel, although other suitable materials may be used. Although the illustrated embodiment includes the first hook 227 attached to the first strap 220, alternative hardware components, such as a clip, a clamp, or a ring may be attached to the first strap 220 instead of the first hook 227. The first strap 220 may be formed of a woven, flexible material having a suitable tensile strength for use under tension generated by the buckle 210. In certain embodiments, the first strap 220 may be formed of nylon or polyester, although other suitable materials may be used.

As shown in FIGS. 2W and 2X, the second strap 230 may be formed as an elongated member having a first end 231 and a second end 232 positioned opposite one another. In certain embodiments, as shown, the first end 231 of the second strap 230 may be formed as a flat portion 233 for removably engaging the buckle 210, as described below, and the second strap 230 may include a loop 234 positioned at the second end 232. The loop 234 may be formed by overlapping portions of the second strap 230 that are attached to one another, for example, by stitching or other attachment means, along an attachment region 236. As described below, the flat portion 233 of the first end 231 may facilitate attachment of the second strap 230 to the buckle 210. In certain embodiments, as shown, a second hook 237 (which also may be referred to as a "second hardware component") may be attached to the second end 232 of the second strap 230 via the loop 234. In certain embodiments, the second hook 237 may be fixedly attached to the second strap 230. In other embodiments, the second hook 237 may be removably attached to the second strap 230. In certain embodiments, the second hook 237 may be formed as a wire hook shaped in the manner shown, although other forms and configurations of the second hook 237 may be used. In certain embodiments, the second hook 237 may be formed of a metal, such as stainless steel, although other suitable materials may be used. Although the illustrated embodiment includes the second hook 237 attached to the second strap 230, alternative hardware components, such as a clip, a clamp, or a ring may be attached to the second strap 230 instead of the second hook 237. The second strap 230 may be formed of a woven, flexible material having a suitable tensile strength for use under tension generated by the buckle 210. In certain embodiments, the second strap 230 may be formed of nylon or polyester, although other suitable materials may be used.

As shown in FIGS. 2A-2H, the buckle 210 may include various components for engaging and interacting with the first strap 220 and the second strap 230 to tighten the first strap 220 and the second strap 230 during use of the tie-down assembly 200. According to the illustrated embodiment, the buckle 210 may include a frame 240 (which also may be referred to as a "frame assembly," a "chassis," or a "base"), a handle 250 (which also may be referred to as a "handle assembly" or a "lever"), a drum assembly 260 (which also may be referred to as a "roller assembly" or a "barrel assembly"), a pair of link arms 270 (which also may be referred to as "pivot arms" or "links"), and a latch 280 (which also may be referred to as a "safety latch" or a "lock"). As described below, the components of the buckle 210 may cooperate with one another to generate tension in the first strap 220 and the second strap 230 when the buckle 210 is moved from the open configuration to the closed configuration and to release tension in the first strap 220 and the second strap 230 when the buckle 210 is moved from the closed configuration to the open configuration.

As shown in FIGS. 2I and 2J, the frame 240 may be formed as an elongated structure having a first end 241A and a second end 241B positioned opposite one another along a length of the frame 240. The frame 240 may include a pair of side plates 242 spaced apart from one another and extending along respective sides of the frame 240. In particular, the frame 240 may include a first side plate 242A extending along a first side of the frame 240 and a second side plate 242B extending along an opposite second side of the frame 240. In certain embodiments, as shown, the first side plate 242A and the second side plate 242B may be contoured such that a distance between the side plates 242A, 242B varies along the length of the frame 240. In particular, a first distance between the first side plate 242A and the second side plate 242B along a first portion of the frame 240 extending from the first end 241A may be greater than a second distance between the first side plate 242A and the second side plate 242B along a second portion of the frame 240 extending from the second end 241B. As shown, the frame 240 also may include an intermediate portion positioned between the first portion and the second portion, along which the distance between the first side plate 242A and the second side plate 242B transitions from the first distance to the second distance. Various shapes and configurations of the side plates 242A, 242B may be used. The frame 240 also may include a transverse plate 243 that extends along a width of the frame 240 and is attached to the side plates 242A, 242B. In certain embodiments, the transverse plate 243 may be positioned closer to the second end 241B than the first end 241A of the frame 240. In certain embodiments, the transverse plate 243 may extend along at least a portion of, or the entirety of, the intermediate portion of the frame 240, as shown. In certain embodiments, the side plates 242A, 242B and the transverse plate 243 may be separately formed and fixedly attached to one another, for example, by welding. In other embodiments, the side plates 242A, 242B and the transverse plate 243 may be integrally formed with one another. For example, sheet metal may be cut and bent or otherwise deformed to form the side plates 242A, 242B and the transverse plate 243. In certain embodiments, as shown, the frame 240 also may include a pair of support ribs 243A, 243B positioned between the side plates 242A, 242B and configured to enhance the structural integrity of and inhibit deformation of the frame 240. The first support rib 243A may be attached to the first side plate 242A and the transverse plate 243, and the second support rib 243B may be attached to the second side plate 242B and the transverse plate 243. As shown, the support ribs 243A, 243B may extend along the inner surfaces of the respective side plates 242A, 242B and downward to the top surface of the transverse plate 243 in a direction from the first end 241A toward the second end 242B of the frame 240. In certain embodiments, the support ribs 243A, 243B may be positioned along the intermediate portion of the frame 240, as shown. In certain embodiments, the support ribs 243A, 243B may be separately formed from and fixedly attached to the side plates 242A, 242B and the transverse plate 243. In certain embodiments, as shown, the frame 240 also may include a pair of inner side plates 244 positioned about the first end 241A of the frame 240 and extending along respective portions of the side plates 242A, 242B. In particular, the frame 240 may include a first inner side plate 244A extending along a portion of the first side plate 242A and attached thereto and a second inner side plate 244B extending along a portion of the second side plate 242B and attached thereto. In certain embodiments, the inner side plates 244A, 244B and the side plates 242A, 242B may be separately formed and fixedly attached to one another, for example, by welding. In certain embodiments, the frame 240 may be formed of a metal, such as stainless steel, although other suitable materials may be used.

The frame 240 may include a plurality of apertures defined therein and configured to facilitate attachment of other components of the tie-down assembly 200 to the frame 240. As shown, the frame 240 may include a pair of first apertures 245A, 245B, a pair of second apertures 246A, 246B, a pair of third apertures 247A, 247B, a pair of fourth apertures 248A, 248B, and a pair of fifth apertures 249A, 249B defined therein. The first apertures 245A, 245B may be coaxial with one another, with the first aperture 245A extending through the first side plate 242A and the first inner side plate 244A, and the first aperture 245B extending through the second side plate 242B and the second inner side plate 244B, as shown. As described below, the first apertures 245A, 245B may facilitate attachment of the handle 250 to the frame 240. The second apertures 246A, 246B may be coaxial with one another, with the second aperture 246A extending through the first side plate 242A and the first inner side plate 244A, and the second aperture 246B extending through the second side plate 242B and the second inner side plate 244B, as shown. As described below, the second apertures 246A, 246B may facilitate attachment of the link arms 270 to the frame 240. The third apertures 247A, 247B may be coaxial with one another, with the third aperture 247A extending through the first inner side plate 244A, and the third aperture 247B extending through the second inner side plate 244B, as shown. As described below, the third apertures 247A, 247B may facilitate attachment of the first inner side plate 244A and the second inner side plate 244B to one another via a cross member that interacts with the latch 280 when the buckle 210 is moved from the open configuration to the closed configuration. The fourth apertures 248A, 248B may be coaxial with one another, with the fourth aperture 248A extending through the first side plate 242A, and the fourth aperture 248B extending through the second side plate 242B, as shown. As described below, the fourth apertures 248A, 248B may facilitate attachment of the first strap 220 to the frame 240. In certain embodiments, the fourth apertures 248A, 248B also may facilitate attachment of the first side plate 242A and the second side plate 242B to one another via a cross member that attaches the first strap 220 to the frame 240. The fifth apertures 249A, 249B may be coaxial with one another, with the fifth aperture 249A extending through the first side plate 242A, and the fifth aperture 249B extending through the second side plate 242B, as shown. As described below, the fifth apertures 249A, 249B may facilitate attachment of the first hook 227 to the frame 240. In certain embodiments, the fifth apertures 249A, 249B also may facilitate attachment of the first side plate 242A and the second side plate 242B to one another via a cross member that allows for attachment of the first hook 227 to the frame 240.

As shown in FIGS. 2K and 2L, the handle 250 may be formed as an elongated structure having a first end 251A and a second end 251B positioned opposite one another along a length of the handle 250. The handle 250 may include a pair of side plates 252 spaced apart from one another and extending along respective sides of the handle 250. In particular, the handle 250 may include a first side plate 252A extending along a first side of the handle 250 and a second side plate 252B extending along an opposite second side of the handle 250. In certain embodiments, as shown, the first side plate 252A and the second side plate 252B may be contoured such that a distance between the side plates 252A, 252B varies along the length of the handle 250. In particular, a first distance between the first side plate 252A and the second side plate 252B along a first portion of the handle 250 extending from the first end 251A may be greater than a second distance between the first side plate 252A and the second side plate 252B along a second portion of the handle 250 extending from the second end 251B. As shown, the handle 250 also may include an intermediate portion positioned between the first portion and the second portion, along which the distance between the first side plate 252A and the second side plate 252B transitions from the first distance to the second distance. In certain embodiments, the intermediate portion of the handle 250 may be positioned closer to the first end 251A than the second end 251B of the handle 250. Various shapes and configurations of the side plates 252A, 252B may be used. The handle 250 also may include a grip 253 (which also may be referred to as a "transverse member") that extends along a width of the handle 250 and is attached to the side plates 252A, 252B. In certain embodiments, the grip 253 may be positioned at or near the first end 251A of the handle 250, although other positions of the grip 253 may be used. In certain embodiments, the side plates 252A, 252B and the grip 253 may be separately formed and fixedly attached to one another, for example, by welding. In other embodiments, the side plates 252A, 252B and the grip 253 may be integrally formed with one another. For example, the side plates 252A, 252B and the grip 253 may be machined from a workpiece of material. In certain embodiments, the handle 250 may be formed of a metal, such as stainless steel, although other suitable materials may be used.

As shown, the handle 250 also may include a plurality of protrusions configured to facilitate attachment of other components of the buckle 210 to the handle 250. In particular, the handle 250 may include a pair of first protrusions 254A, 254B and a pair of second protrusions 255A, 255B. As shown, the first protrusion 254A may extend outwardly from the first side plate 252A and perpendicular thereto, and the first protrusion 254B may extend outwardly from the second side plate 252B and perpendicular thereto. In certain embodiments, the first protrusions 254A, 254B may be formed as cylindrical members that are coaxial with one another and mirror images of one another about the longitudinal axis of the handle 250. In certain embodiments, the first protrusions 254A, 254B and the side plates 252A, 252B may be separately formed and attached to one another, for example, by welding. In other embodiments, the first protrusions 254A, 254B and the side plates 252A, 252B may be integrally formed with one another, for example, by machining a workpiece of material. As described below, the first protrusions 254A, 254B may facilitate attachment of the handle 250 to the frame 240. As shown, the second protrusion 255A may extend outwardly from the first side plate 252A and perpendicular thereto, and the second protrusion 255B may extend outwardly from the second side plate 252B and perpendicular thereto. In certain embodiments, the second protrusions 255A, 255B may be formed as cylindrical members that are coaxial with one another and mirror images of one another about the longitudinal axis of the handle 250. In certain embodiments, the second protrusions 255A, 255B and the side plates 252A, 252B may be separately formed and attached to one another, for example, by welding. In other embodiments, the second protrusions 255A, 255B and the side plates 252A, 252B may be integrally formed with one another, for example, by machining a workpiece of material. As described below, the second protrusions 255A, 255B may facilitate attachment of the drum assembly 260 to the handle 250.

As shown, the handle 250 further may include a plurality of apertures configured to facilitate attachment of other components of the buckle 210 to the handle 250. In particular, the handle 250 may include a pair of first apertures 256A, 256B, a pair of second apertures 257A, 257B, and a pair of third apertures 258A, 258B defined therein. The first apertures 256A, 256B may be coaxial with one another, with the first aperture 256A extending through the first side plate 252A and the first protrusion 254A, and the first aperture 256B extending through the second side plate 252B and the second protrusion 254B, as shown. In this manner, the first apertures 256A, 256B may be formed as thru holes extending through the respective protrusions 254A, 254B and the respective side plates 252A, 252B. In other embodiments, the first apertures 256A, 256B may be formed as blind holes extending only through the respective protrusions 254A, 254B or portions thereof (and not through the respective side plates 252A, 252B). As described below, the first apertures 256A, 256B may facilitate attachment of the handle 250 to the frame 240. The second apertures 257A, 257B may be coaxial with one another, with the second aperture 257A extending through the first side plate 252A, and the second aperture 257B extending through the second side plate 252B, as shown. The third apertures 258A, 258B may be coaxial with one another and with the second apertures 257A, 257B, with the third aperture 258A extending through the second protrusion 255A, and the third aperture 258B extending through the second protrusion 255B, as shown. The third apertures 258A, 258B may be in communication with the respective second apertures 257A, 257B, as shown. As described below, the second apertures 257A, 257B and the third apertures 258A, 258B may facilitate attachment of the drum assembly 260 to the handle 250.

As shown, the handle 250 also may include a plurality of cross members (which also may be referred to as "transverse members") configured to enhance the structural integrity of and inhibit deformation of the handle 250 and/or to interact with other components of the buckle 210. In particular, the handle 250 may include a first cross member 259A, a second cross member 259B, and a third cross member 259C. As shown, the first cross member 259A may extend between the side plates 252A, 252B and be coaxial with the first protrusions 254A, 254B. The first cross member 259A may be attached to the respective side plates 252A, 252B and/or the respective first protrusions 254A, 254B, for example, by welding, and may be configured to provide structural support to the side plates 252A, 252B and inhibit deformation of the handle 250 near the second end 251B thereof. In certain embodiments, as shown, the first cross member 259A may be formed as a solid cylindrical member. In other embodiments, the first cross member 259A may be formed as a tubular cylindrical member or may have other shapes or configurations. As shown, the second cross member 259B (which also may be referred to as a "pivot member") may extend between the side plates 252A, 252B and may be attached to the respective side plates 252A, 252B, for example, by welding. The second cross member 259B may be configured to provide structural support to the side plates 252A, 252B and inhibit deformation of the handle 250 near the second end 251B thereof. As described below, the second cross member 259B also may be configured to pivotably support the latch 280 for pivotal movement relative to the handle 250. In certain embodiments, as shown, the second cross member 259B may be formed as a solid cylindrical member, although other shapes and configurations of the second cross member 259B may be used. As shown, the third cross member 259C (which also may be referred to as a "stop member") may extend between the side plates 252A, 252B and may be attached to the respective side plates 252A, 252B, for example, by welding. The third cross member 259C may be configured to provide structural support to the side plates 252A, 252B and inhibit deformation of the handle 250 near the second end 251B thereof. As described below, the third cross member 259C also may be configured to limit pivotal movement of the latch 280 relative to the handle 250. In certain embodiments, as shown, the third cross member 259C may be formed as a solid cylindrical member, although other shapes and configurations of the third cross member 259C may be used. In certain embodiments, one or more or all of the cross members 259A, 259B, 259C may be attached to the side plates 252A, 252B via apertures formed in the respective side plates 252A, 252B and welding or other means of attachment. In other embodiments, one or more or all of the cross members 259A, 259B, 259C may be attached to the inner surfaces of the respective side plates 252A, 252B by welding or other means of attachment.

As shown in FIGS. 2M-2P, the drum assembly 260 may be formed as an elongated structure having a first end 261A and a second end 261B positioned opposite one another along a length of the drum assembly 260. The drum assembly 260 may include a drum 262 (which also may be referred to as a "roller" or a "barrel"), a pair of bearings 263, and a pair of end plates 264. As shown, the drum 262 may be formed as an elongated structure that includes a pair of bars 265 and a pair of protrusions 267 extending from opposite ends of each of the bars 265. In particular, a first bar 265A and a second bar 265B may extend along a longitudinal axis of the drum 262. As shown, the first bar 265A and the second bar 265B may be spaced apart from one another to define a slot 268 therebetween. The first bar 265A and the second bar 265B may extend parallel to one another and parallel to the longitudinal axis of the drum assembly 260. As shown, the first bar 265A and the second bar 265B each may have a flat inner surface extending along the slot 268 and a contoured outer surface positioned opposite the flat inner surface. In certain embodiments, the first bar 265A and the second bar 265B may have identical shapes. In other embodiments, as shown, the first bar 265A and the second bar 265B may have different shapes. For example, the contoured outer surface of the first bar 265A may be different from the contoured outer surface of the second bar 265B. As shown, the contoured outer surface of the first bar 265A may be a curved surface having a variable radius of curvature. In particular, the contoured outer surface of the first bar 265A may have a first radius R1 along a first portion of the contoured outer surface and a second radius R2 along a second portion of the contoured outer surface, with the first radius R1 being less than the second radius R2. In certain embodiments, as shown, the first portion of the contoured outer surface may extend along a minority of the contoured outer surface, and the second portion of the contoured outer surface may extend along a majority of the contoured outer surface. As described below, the variable radius of curvature of the contoured outer surface of the first bar 265A may facilitate gripping of the second strap 230 as the second strap 230 is wrapped around the drum 262 during use of the tie-down assembly 200. As shown, the contoured outer surface of the second bar 265B may have a third radius R3 along a majority of the contoured outer surface thereof. In certain embodiments, the third radius R3 may be less than the second radius R2 and greater than or equal to the first radius R1. Various configurations of the first bar 265A and the second bar 265B may be used. As shown, a first protrusion 267A may extend from one end of the first bar 265A, and a second protrusion 267B may extend from the other end of the first bar 265A. In a similar manner, a first protrusion 267A may extend from one end of the second bar 265B, and a second protrusion 267B may extend from the other end of the second bar 265B. In certain embodiments, the protrusions 267A, 267B may be integrally formed with the respective bars 265A, 265B, for example, by machining from a workpiece. In other embodiments, the protrusions 267A, 267B may be separately formed and fixedly attached to the respective bars 265A, 265B, for example, by welding. In certain embodiments, as shown, the protrusions 267A, 267B may have smaller cross-sectional profiles than the respective bars 265A, 265B. In certain embodiments, the drum 262 may be formed of a metal, such as stainless steel, although other suitable materials may be used.

As shown, the drum assembly 260 may include a first bearing 263A and a second bearing 263B positioned about opposite ends of the drum 262. In particular, respective portions of the first protrusions 267A may be positioned within the first bearing 263A, and respective portions of the second protrusion 267B may be positioned within the second bearing 263B. In certain embodiments, as shown, the bearings 263A, 263B may be ring-shaped ball bearings configured to facilitate rotation of the drum 262 about the longitudinal axis of the drum assembly 260. The drum assembly 260 also may include a first end plate 264A and a second end plate 264B positioned at opposite ends of the drum 262 and attached thereto. In particular, the first end plate 264A may be attached to respective end portions of the first protrusions 267A, and the second end plate 264B may be attached to the respective end portions of the second protrusions 267B. In certain embodiments, as shown, the end plates 264A, 264B may include respective apertures or recesses for receiving the protrusions 267A, 267B, and the end plates 264A, 264B may be fixedly attached to the respective protrusions 267A, 267B, for example, by welding or one or more fasteners. In this manner, the end plates 264A, 264B may rotate along with the drum 262 about the longitudinal axis of the drum assembly 260. As shown, each of the end plates 264A, 264B may include an aperture 269 defined therein. In particular, the first end plate 264A may include a first aperture 269A, and the second end plate 264B may include a second aperture 269B. As shown, the apertures 269A, 269B may be coaxial with one another, and the longitudinal axes of the apertures 269A, 269B may be spaced apart from and extend parallel to the longitudinal axis of the drum assembly 260. As described below, the apertures 269A, 269B may facilitate attachment of the link arms 270 to the drum assembly 260. In certain embodiments, an acute angle $\alpha$ may be defined between a first plane extending through the longitudinal axis of the drum assembly 260 and parallel to the flat inner surfaces of the first bar 265A and the second bar 265B and a second plane extending through the longitudinal axis of the drum assembly 260 and the longitudinal axes of the apertures 269A, 269B. The acute angle $\alpha$ may be selected such that the bars 265A, 265B are positioned relative to the apertures 269A, 269B to facilitate desired rotation of the drum 262 and clocking of the bars 265A, 265B throughout the rotational range of motion of the drum 262, as described below. In certain embodiments, the acute angle $\alpha$ may be between 30 degrees and 45 degrees, between 35 degrees and 40 degrees, or approximately 38 degrees, although other values of the acute angle $\alpha$ may be used. In certain embodiments, as shown, the drum assembly 260 also may include a first shim 266A positioned between the first end plate 264A and the first bearing 263A, and a second shim 266B positioned between the second end plate 264B and the second bearing 263B. The shims 266A, 266B may facilitate smooth rotational movement of the end plates 264A, 264B relative to the bearings 263A, 263B and the second protrusions 255A, 255B of the handle 250 and inhibit wear of the respective components.

As explained above, the buckle 210 may include a pair of the link arms 270. In particular, the buckle 210 may include a first link arm 270A for attaching to the frame 240 and the drum assembly 260 and a second link arm 270B for attaching to the frame 240 and the drum assembly 260. In certain embodiments, as shown, the first link arm 270A and the second link arm 270B may be configured in a similar manner. As shown in FIGS. 2Q and 2R, each link arm 270A, 270B may be formed as an elongated, planar structure having a first end 271A and a second end 271B positioned opposite one another along a length of the link arm 270A, 270B. In certain embodiments, as shown, each link arm 270A, 270B may have a contoured shape including one or more linear regions and one or more curved regions. In other embodiments, each link arm 270A, 270B may have a straight shape along the length of the link arm 270A, 270B. Each link arm 270A, 270B may include a plurality of apertures defined therein and configured to facilitate attachment of the link arm 270A, 270B to the frame 240 and the drum assembly 260. As shown, each link arm 270A, 270B may include a first aperture 272 and a second aperture 273 defined therein. The first aperture 272 may be positioned near the first end 271A of the link arm 270A, 270B, and the second aperture 273 may be positioned near the second end 271B of the link arm 270A, 270B. As shown, the first apertures 272 of the first link arm 270A and the second link arm 270B may be coaxial with one another, and the second apertures 273 of the first link arm 270A and the second link arm 270B may be coaxial with one another. As described below, the first aperture 272 of the first link arm 270A may facilitate attachment of the first link arm 270A to the drum assembly 260, and the second aperture 273 of the first link arm 270A may facilitate attachment of the first link arm 270A to the frame 240. In a similar manner, the first aperture 272 of the second link arm 270B may facilitate attachment of the second link arm 270B to the drum assembly 260, and the second aperture 273 of the second link arm 270B may facilitate attachment of the second link arm 270B to the frame 240. In certain embodiments, the link arms 270A, 270B may be formed of a metal, such as stainless steel, although other suitable materials may be used.

As shown in FIGS. 2S and 2T, the latch 280 may be formed as an elongated structure having a first end 281A and a second end 281B positioned opposite one another along a length of the latch 280. According to the illustrated embodiment, the latch 280 may include a pair of side plates 282, a transverse plate 283, and a release member 284. The side plates 282 may be spaced apart from one another and extend along respective sides of the latch 280. In particular, the latch 280 may include a first side plate 282A extending along a first side of the latch 280 and a second side plate 282B extending along an opposite second side of the latch 280. As shown, the first side plate 282A may include a lock protrusion 285A positioned at or near a bottom end thereof, and the second side plate 282B similarly may include a lock protrusion 285B positioned at or near a bottom end thereof. As described below, the lock protrusions 285A, 285B may be configured to engage a mating cross member when the buckle 210 is in the closed configuration to maintain the latch 280 in a locked position. In some embodiments, as shown, the lock protrusions 285A, 285B may be formed as generally hook-shaped members, although other shapes and configurations of the lock protrusions 285A, 285B may be used. As shown, the first side plate 282A also may include a stop protrusion 286A positioned at or near a bottom end thereof, and the second side plate 282B similarly may include a stop protrusion 286B positioned at or near a bottom end thereof. As described below, the stop protrusions 286A, 286B may be configured to engage the third cross member 259C of the handle 250 when the latch 280 is moved from the locked position to an unlocked position. In some embodiments, as shown, the stop protrusions 286A, 286B may be formed as generally hook-shaped members, although other shapes and configurations of the stop protrusions 286A, 286B may be used. The side plates 282A, 282B also may include a plurality of apertures for cooperating with mating components of the buckle 210. As shown, the first side plate 282A may include a first aperture 287A and a second aperture 288A extending therethrough, and the second side plate 282B similarly may include a first aperture 287B and a second aperture 288B extending therethrough. As described below, the latch 280 may be pivotably attached to the handle 250 via the second cross member 259 extending through the first apertures 287A, 287B. In this manner, the latch 280 may pivot relative to the handle 250 between the locked position and the unlocked position. The second apertures 288A, 288B of the side plates 282A, 282B may facilitate attachment of a cross member 289 of the latch 280. The cross member 289 may extend between the side plates 282A, 282B and facilitate attachment of a biasing member 290 to the latch 280. As described below, the biasing member 290 may be configured to bias the latch 280 toward the locked position. In certain embodiments, as shown, the biasing member 290 may be a torsion spring, although other types of springs or other types of biasing elements may be used. As shown, the transverse plate 283 may be attached to the side plates 282A, 282B and extend along the top of the latch 280. The release member 284 may be attached to the transverse plate 283 and extend from the transverse plate 283 to the first end 281A of the latch 280. As described below, the release member 284 may be grasped and moved by a user to pivot the latch 280 relative to the handle 250 from the locked position to the unlocked position.

FIGS. 2A-2H illustrate the various components of the tie-down assembly 200 assembled to one another for use. A plurality of fasteners may be used to assemble the components of the tie-down assembly 200. As shown, the handle 250 may be attached to the frame 240 via a pair of first fasteners 291A, 291B. In particular, the first fastener 291A may extend through the first aperture 245A of the first side plate 242A of the frame 240 and engage the first aperture 256A of the first protrusion 254A of the handle 250, and the first fastener 291B may extend through the first aperture 245B of the second side plate 242B of the frame 240 and engage the first aperture 256B of the first protrusion 254B of the handle 250. As shown, the handle 250 may be pivotably attached to the frame 240 via the first fasteners 291A, 291B. In particular, the handle 250 may be configured to pivot between an open position (which also may be referred to as an "unlocked position" or a "first position") when the buckle 210 is in the open configuration, as shown in FIGS. 2A-2D, and a closed position (which also may be referred to as a "locked position" or a "second position") when the buckle 210 is in the closed configuration, as shown in FIGS. 2E-2H. As shown, the handle 250 may be configured to pivot relative to the frame 240 about a first axis A1 (which also may be referred to as a "pivot axis") between the open position and the closed position. It will be appreciated that the first axis A1 may be defined by the respective axes of the first apertures 245A, 245B, the first apertures 256A, 256B, and the first fasteners 291A, 291B. In certain embodiments, the first fasteners 291A, 291B may be formed as elongated, cylindrical members that are welded, threadably connected, or otherwise attached to the respective first protrusions 254A, 254B of the handle 250. In certain embodiments, the first fasteners 291A, 291B may be pins, bolts, screws, or other types of mechanical fasteners. In certain embodiments, one or more shims may be positioned between the outer ends of the respective first protrusions 254A, 254B and the adjacent inner surfaces of the inner sides plates 244A, 244B to facilitate smooth pivotal movement of the handle 250 and inhibit wear of the frame 240 and the handle 250.

As shown, the drum assembly 260 may be attached to and carried by the handle 250. The first bearing 263A of the drum assembly 260 may be positioned within the third aperture 258A of the second protrusion 255A of the handle 250, and the second bearing 263B of the drum assembly 260 may be positioned within the third aperture 258B of the second protrusion 255B of the handle 250. The drum 262 of the drum assembly 260 may extend between the side plates 252A, 252B of the handle 250 and engage the bearings 263A, 263B. In particular, the bars 265A, 265B of the drum 262 may be positioned between the side plates 252A, 252B of the handle 250. Additionally, the first protrusions 267A of the drum 262 may be positioned within the third aperture 258A of the handle 250 and within the first bearing 263A, and the second protrusions 267B of the drum 262 may be positioned within the third aperture 258B of the handle 250 and within the second bearing 263B. The first end plate 264A of the drum assembly 260 may be positioned over the free end of the second protrusion 255A of the handle 250 and attached to the first protrusions 267A of the drum 262, such as by welding or other means of attachment, and the second end plate 264B of the drum assembly 260 may be positioned over the free end of the second protrusion 255B of the handle 250 and attached to the second protrusions 267B of the drum 262, such as by welding or other means of attachment. In this manner, the arrangement of the drum assembly 260 and the handle 250 may inhibit the drum assembly 260 from translating relative to the handle 250 in the direction of the longitudinal axis of the drum assembly 260. However, at least a portion of the drum assembly 260 may be configured to rotate relative to the handle 250. In particular, the drum 262 and the end plates 264A, 264B may be configured to rotate relative to the handle 250 about a second axis A2 (which also may be referred to as a "rotational axis"). It will be appreciated that the second axis A2 may be defined by the respective axes of the second apertures 257A, 257B, the third apertures 258A, 258B, the bearings 263A, 263B, and the drum 262. In certain embodiments, portions of the bearings 263A, 263B also may rotate relative to the handle 250, such as inner races of the bearings 263A, 263B. In certain embodiments, one or more shims may be positioned between respective adjacent surfaces of components or features of the drum assembly 260 and/or the handle 250 which rotate relative to one another to facilitate smooth rotational movement of and inhibit wear of the components and/or features.

As shown, the link arms 270A, 270B may be attached to the frame 240 via a pair of second fasteners 292A, 292B. In particular, the second fastener 292A may extend through the second aperture 246A of the first side plate 242A of the frame 240 and engage the second aperture 273 of the first link arm 270A, and the second fastener 292B may extend through the second aperture 246B of the second side plate 242B of the frame 240 and engage the second aperture 273 of the second link arm 270B. As shown, the link arms 270A, 270B may be pivotably attached to the frame 240 via the second fasteners 292A, 292B. In particular, the link arms 270A, 270B may be configured to pivot between an open position (which also may be referred to as an "unlocked position" or a "first position") when the buckle 210 is in the open configuration, as shown in FIGS. 2A-2D, and a closed position (which also may be referred to as a "locked position" or a "second position") when the buckle 210 is in the closed configuration, as shown in FIGS. 2E-2H. As shown, the link arms 270A, 270B may be configured to pivot relative to the frame 240 about a third axis A3 (which also may be referred to as a "pivot axis") between the open position and the closed position. It will be appreciated that the third axis A3 may be defined by the respective axes of the second apertures 246A, 246B, the second apertures 273, and the second fasteners 292A, 292B. In certain embodiments, the second fasteners 292A, 292B may be formed as elongated, cylindrical members that are welded, threadably connected, or otherwise attached to the respective link arms 270A, 270B. In certain embodiments, the second fasteners 292A, 292B may be pins, bolts, screws, or other types of mechanical fasteners. In certain embodiments, one or more shims may be positioned between the outer surfaces of the respective link arms 270A, 270B and the adjacent inner surfaces of the inner side plates 244A, 244B to facilitate smooth pivotal movement of the link arms 270A, 270B and inhibit wear of the frame 240 and the link arms 270A, 270B.

As shown, the link arms 270A, 270B also may be attached to the drum assembly 260 via a pair of third fasteners 293A, 293B. In particular, the third fastener 293A may extend through the first aperture 272 of the first link arm 270A and engage the aperture 269A of the first end plate 264A, and the third fastener 293B may extend through the first aperture 272 of the second link arm 270B and engage the aperture 269B of the second end plate 264B. As shown, the link arms 270A, 270B may be pivotably attached to the end plates 264A, 264B via the third fasteners 293A, 293B. In particular, the link arms 270A, 270B may be configured to pivot between the open position when the buckle 210 is in the open configuration, as shown in FIGS. 2A-2D, and the closed position when the buckle 210 is in the closed configuration, as shown in FIGS. 2E-2H. As shown, the link arms 270A, 270B may be configured to pivot relative to the end plates 264A, 264B about a fourth axis A4 (which also may be referred to as a "pivot axis") between the open position and the closed position. It will be appreciated that the fourth axis A4 may be defined by the respective axes of the first apertures 272, the apertures 269A, 269B, and the third fasteners 293A, 293B. In certain embodiments, the third fasteners 293A, 293B may be formed as elongated, cylindrical members that are welded, threadably connected, or otherwise attached to the respective end plates 264A, 264B. In certain embodiments, the third fasteners 293A, 293B may be pins, bolts, screws, or other types of mechanical fasteners. In certain embodiments, one or more shims may be positioned between the inner surfaces of the respective link arms 270A, 270B and the adjacent outer surfaces of the end plates 264A, 264B to facilitate smooth pivotal movement of the link arms 270A, 270B and inhibit wear of the end plates 264A, 264B and the link arms 270A, 270B.

As shown, the latch 280 may be attached to the handle 250 via the second cross member 259B. In particular, the second cross member 259B may extend through the first apertures 287A, 287B of the latch 280 and be fixedly attached to the side plates 252A, 252B of the handle 250, for example, by welding or other means of attachment. As shown, the latch 280 may be pivotably attached to the handle 250 via the second cross member 259B. In particular, the latch 280 may be configured to pivot between a locked position (which also may be referred to as a "first position"), as shown in FIGS. 2A-2H, and an unlocked position (which also may be referred to as a "second position"). As shown, the latch 280 may be configured to pivot relative to the handle 250 about a fifth axis A5 (which also may be referred to as a "pivot axis") between the locked position and the unlocked position. It will be appreciated that the fifth axis A5 may be defined by the respective axes of the first apertures 287A, 287B and the second cross member 259B. In certain embodiments, the second cross member 259B may be formed as an elongated, cylindrical member that is welded, threadably connected, or otherwise attached to the side plates 252A, 252B of the handle 250. In certain embodiments, the second cross member 259B may be a pin, a bolt, a screw, or other type of mechanical fasteners. In certain embodiments, one or more shims may be positioned between the outer surfaces of the side plates 282A, 282B of the latch 280 and the adjacent inner surfaces of the side plates 252A, 252B to facilitate smooth pivotal movement of the latch 280 and inhibit wear of the handle 250 and the latch 280. As shown, the biasing member 290 may be attached to the handle 250 and the latch 280. In particular, the biasing member 290 may be attached to the third cross member 259C of the handle 250 and to the cross member 289 of the latch 280. In certain embodiments, the biasing member 290 may be formed as a torsion spring, with one arm of the spring attached to the third cross member 259C and the other arm of the spring attached to the cross member 289. As described above, the biasing member 290 may be configured to bias the latch 280 to the locked position.

As shown, the inner side plates 244A, 244B of the frame 240 may be attached to one another via a fourth fastener 294 (which also may be referred to as a "cross member" or a "transverse member"). In particular, the fourth fastener 294 may extend through the third apertures 247A, 247B of the inner side plates 244A, 244B. In certain embodiments, the fourth fastener 294 may be formed as an elongated, cylindrical member that is welded, threadably connected, or otherwise attached to the inner side plates 244A, 244B of the frame 240. It will be appreciated that, by attaching the fourth fastener 294 to the inner side plates 244A, 244B, the fourth fastener 294 may enhance the structural integrity of and inhibit deformation of the frame 240. In certain embodiments, the fourth fastener 294 may be a pin, a bolt, a screw, or other type of mechanical fasteners. As described above, the latch 280 may engage the fourth fastener 294 when the latch 280 is in the locked position. In particular, the lock protrusions 285A, 285B of the latch 280 may engage the fourth fastener 294 to inhibit movement of the latch 280 from the locked position, while the biasing member 290 biases the latch 280 toward the locked position.

As shown, the first strap 220 may be attached to the buckle 210 via a fifth fastener 295 (which also may be referred to as a "cross member" or a "transverse member"). In particular, the fifth fastener 295 may extend through the fourth apertures 248A, 248B of the side plates 242A, 242B of the frame 240 and through the first loop 223 of the first strap 220. In this manner, the fifth fastener 295 may be attached to the side plates 242A, 242B and may fixedly attach the first strap 220 to the frame 240. In certain embodiments, the fifth fastener 295 may be formed as an elongated, cylindrical member that is welded, threadably connected, or otherwise attached to the side plates 242A, 242B. It will be appreciated that, by attaching the fifth fastener 295 to the side plates 242A, 242B, the fifth fastener 295 may enhance the structural integrity of and inhibit deformation of the frame 240. In certain embodiments, the fifth fastener 295 may be a pin, a bolt, a screw, or other type of mechanical fastener. In certain embodiments, as shown, the tie-down assembly 200 may include a sixth fastener 296 configured to allow the first hook 227 to be removably attached to the buckle 210. In particular, the sixth fastener 296 may extend through the fifth apertures 249A, 249B of the side plates 242A, 242B of the frame 240. In this manner, the sixth fastener 296 may be attached to the side plates 242A, 242B and may allow the second hook 227 to be removably attached to the frame 240. For example, during use of the tie-down assembly 200, the first strap 220 may be wrapped around a portion of a cargo item or a support structure at a first connection point P1, and the first hook 227 may be attached to the sixth fastener 296, as shown in FIGS. 2A and 2E. Additionally, the first hook 227 may be attached to the sixth fastener 296 during storage of the tie-down assembly 200. In certain embodiments, the sixth fastener 296 may be formed as an elongated, cylindrical member that is welded, threadably connected, or otherwise attached to the side plates 242A, 242B. It will be appreciated that, by attaching the sixth fastener 296 to the side plates 242A, 242B, the sixth fastener 296 may enhance the structural integrity of and inhibit deformation of the frame 240. In certain embodiments, the sixth fastener 296 may be a pin, a bolt, a screw, or other type of mechanical fastener.

FIGS. 2A-2H illustrate an example use of the tie-down assembly 200 to secure a cargo item C to a support structure S for transport or storage. It will be appreciated that only a portion of the cargo item C and a portion of the support structure S are shown in the drawings for illustration purposes. Use of the tie-down assembly 200 may begin by attaching the assembly 200 to the cargo item C at a first connection point P1. In certain embodiments, as shown, the first strap 220 may be wrapped around a portion of the cargo item C, and the first hook 227 may be attached to the sixth fastener 296. In this manner, the buckle 210 may be connected to the cargo item C via the first strap 220. In other embodiments, when desired, the first hook 227 may be attached to a portion of the cargo item C, for example, when the cargo item C is shaped in a manner that allows secure engagement with the first hook 227. In this manner, the buckle 210 may be connected to the cargo item C via the first hook 227 and the first strap 220. In certain embodiments, the tie-down assembly 200 may be attached to the cargo item C while the buckle 210 is in the open configuration. In other embodiments, the tie-down assembly 200 may be attached to the cargo item C while the buckle 210 is in the closed configuration.

As shown, the second hook 237 may be attached to the support structure S at a second connection point P2. In certain embodiments, the second hook 237 may be attached to the support structure S after attaching the tie-down assembly 200 to the cargo item C. In other embodiments, the second hook 237 may be attached to the support structure S before attaching the tie-down assembly 200 to the cargo item C. Either before or after attaching the second hook 237 to the support structure S, the second strap 230 may be attached to the drum 262. In certain embodiments, as shown, the second strap 230 may be attached to the drum 262 while the buckle 210 is in the open configuration. As shown in FIGS. 2A-2D, the drum 162 may be positioned below the frame 240 when the buckle 210 is in the open configuration. In this manner, the drum 262 may be easily accessible and viewable for attaching the second strap 230 thereto. In particular, the first end 231 of the second strap 230 may be passed under the drum 262 and back through the slot 268 between the bars 265A, 265B toward the second end 232 of the second strap 230, as shown. In this manner, the buckle 210 may be connected to the support structure S via the second strap 230 and the second hook 237. In certain embodiments, the first end 231 of the second strap 230 may be pulled toward the second end 232 of the second strap 230 and the second hook 237 to remove some slack from the portion of the second strap 230 extending between the second hook 237 and the drum 262. In certain embodiments, as shown, an amount of slack may remain in the portion of the second strap 230 extending between the second hook 237 and the drum 262. In other embodiments, an amount of slack may remain in a portion of the first strap 220 between the buckle 210 and the cargo item C, while less or no slack may remain the in the portion of the second strap 230 extending between the second hook 237 and the drum 262. It will be appreciated that a limited amount of slack in one or both of the first strap 220 or the second strap 230 may be desirable to ease movement of the buckle 210 from the open configuration to the closed configuration and to achieve a desired degree of tension in the straps 220, 230. In certain embodiments, the tie-down assembly 200 may include or may be used with an additional component or mechanism configured to provide a desired amount of slack in one or both of the first strap 220 or the second strap 230, such as one of the components or mechanisms described below with respect to FIGS. 3A-5E.

After attaching the tie-down assembly 200 to the cargo item C and the support structure, the buckle 210 may be moved or transitioned from the open configuration to the closed configuration, as shown in FIGS. 2E-2H. In particular, a user may grasp the grip 253 of the handle 250 and pivot the handle 250 relative to the frame 240 from the open position to the closed position in order to move the buckle 210 from the open configuration to the closed configuration. As described above, the handle 250 may pivot relative to the frame 240 about the first axis A1. As the handle 250 is pivoted from the open position to the closed position, the link arms 270A, 270B may pivot relative to the side plates 242A, 242B of the frame 240 and relative to the end plates 264A, 264B of the drum assembly 262. As described above, the link arms 270A, 270B may pivot relative to the side plates 242A, 242B about the third axis A3, and the link arms 270A, 270B may pivot relative to the end plates 264A, 264B about the fourth axis A4. In view of the configuration of the frame 240, the handle 250, the drum assembly 260, and the link arms 270A, 270B and the respective positions of the axes A1, A2, A3, A4, the pivotal movement of the link arms 270A, 270B may cause the drum 262 to rotate relative to the handle 250. In particular, the drum 262 may rotate relative to the handle 250 in a first direction as the handle 250 is pivoted from the open position to the closed position. As described above, the drum 262 may rotate relative to the handle 250 about the second axis A2.

As shown, the rotation of the drum 262 relative to the handle 250 in the first direction may cause the second strap 230 to wrap around the drum 262. In particular, the second strap 230 may wrap around the bars 265A, 265B of the drum 262. In certain embodiments, when the buckle 210 is in the closed configuration, the second strap 230 may overlap itself in the manner shown in FIGS. 2E-2H. The wrapping of the second strap 230 around the drum 262 may remove the slack from and generate tension in the portion of the second strap 230 extending between the second hook 237 and the drum 262. In this manner, the movement of the buckle 210 from the open configuration to the closed configuration may tighten the first strap 220 and the second strap 230 between the first connection point P1 and the second connection point P2. In certain embodiments, as shown, the link arms 270A, 270B and the respective axes A1, A2, A3, A4 may be configured such that the drum 262 rotates relative to the handle 250 at a varying rate when the handle 250 is pivoted relative to the frame 240 at a constant rate. In particular, the drum 262 may rotate at a first rate during a first portion of the pivotal movement of the handle 250 from the open position to the closed position, and the drum 262 may rotate at a second rate during a subsequent second portion of the pivotal movement of the handle 250 from the open position to the closed position, with the first rate being greater than the second rate. In this manner, the second strap 230 may wrap around the drum 262 more quickly during the first portion of the pivotal movement than during the second portion of the pivotal movement. As a result, the drum 262 may grip the engaged portion of the second strap 230 soon after the handle 250 begins to pivot from the open position to the closed position. In particular, the rapid rate of rotation of the drum 262 during the first portion of the pivotal movement of the handle 250 may cause the engaged portion of the second strap 230 to overlap itself quickly around the drum 262. For example, the initial rotation of the drum 262 may cause the second strap 230 to overlap itself initially along the second bar 265B of the drum 262, as shown in FIGS. 2F and 2H. Such overlapping of the engaged portion of the second strap 230 may generate a sufficient amount of friction between the overlapping layers of the second strap 230 as the overlapping layers of the second strap 230 are pulled in opposite directions during rotation of the drum 262, thereby causing the drum 262 to securely grip the engaged portion of the second strap 230. Quick gripping engagement between the drum 262 and the engaged portion of the second strap 230 also may be facilitated by the variable radius of curvature of the contoured outer surface of the first bar 265A. As described above, the first portion of the contoured outer surface of the first bar 265A may have the first radius R1 that is less than the second radius R2 of the second portion of the contoured outer surface of the first bar 265A. The smaller first radius R1 may provide greater friction between the first bar 265A and the engaged portion of the second strap 230, thereby allowing the drum 262 to grip the engaged portion of the second strap 230 soon after the handle 250 begins to pivot from the open position to the closed position.

As the handle 250 approaches the closed position, the side plates 282A, 282B of the latch 280 may engage the fourth fastener 294 and cause the latch 280 to pivot away from the locked position toward the unlocked position. As described above, the latch 280 may pivot relative to the handle 250 about the fifth axis A5. When the handle 250 reaches the closed position, the biasing member 290 may bias the latch 280 back to the locked position, thereby causing the lock protrusions 285A, 285B of the latch 280 to engage the fourth fastener 294, as shown. The engagement between the lock protrusions 285A, 285B of the latch 280 and the fourth fastener 294 may maintain the handle 250 in the closed position while the latch 280 is maintained in the locked position by the biasing member 290. In this manner, the latch 280 may maintain the buckle 210 in the closed configuration. While the buckle 210 is in the closed configuration, the buckle 210 may maintain the tension in the first strap 220 and the second strap 230, thereby securing the cargo item C relative to the support structure S for transport or storage.

It will be appreciated that the configuration of the frame 240, the handle 250, the drum assembly 260, and the link arms 270A, 270B may function as an over-center locking mechanism as the buckle 210 is moved between the open configuration and the closed configuration. In particular, as the handle 250 is pivoted from the open position to the closed position, the drum 262 may move toward a center position, through the center position, and beyond the center position to an over-center position. The center position of the drum 262 may be the position at which a greatest amount of tension is generated in the first strap 220 and the second strap 230 between the connection points P1, P2. In this manner, the tension in the straps 220, 230 may increase as the drum 262 moves, along with the handle 250, toward the center position, and the tension in the straps 220, 230 may decrease as the drum 262 moves, along with the handle 250, beyond the center position to the over-center position. In certain embodiments, the center position of the drum 262 may be the position in which the second axis A2 is coplanar with the first axis A1 and the third axis A3. In certain embodiments, as shown, the rapid rate of rotation of the drum 262 during the first portion of the pivotal movement of the handle 250 from the open position to the closed position may cause the drum 262 to grip the engaged portion of the second strap 230, by overlapping the second strap 230, before the drum 262 reaches the center position. Further, the slower rate of rotation of the drum 262 during the second portion of the pivotal movement of the handle 250 may begin before the drum 262 reaches the center position. In this manner, the slower rate of rotation of the drum 262 may ease movement of the drum 262 through and beyond the center position (i.e., the position of greatest tension in the straps 220, 230), requiring less pressure on the handle 250 to achieve such movement. The over-center locking mechanism may provide a primary locking feature for maintaining the handle 250 in the closed position and the overall buckle 210 in the closed configuration. In particular, when the handle 250 is in the closed position and the drum 262 is in the over-center position, the tension in the straps 220, 230 may inhibit movement of the handle 250 from the closed position toward the open position. In this manner, the engagement between the lock protrusions 285A, 285B of the latch 280 and the fourth fastener 294 may function as a secondary locking feature in addition to the locking function provided by the over-center locking mechanism.

When the tie-down assembly 200 is no longer needed to secure the cargo item C to the support structure S, the assembly 200 may be removed therefrom. The buckle 210 may be moved from the closed configuration to the open configuration to allow the tie-down assembly 200 to be removed from the cargo item C and the support structure S. The latch 280 may be pivoted relative to the handle 250 and the fourth fastener 294 from the locked position to the unlocked position, and the handle 250 may be pivoted from the closed position to the open position to move the buckle 210 from the closed configuration to the open configuration. As the handle 250 is moved from the closed position to the open position, the drum 262 may rotate in a second direction opposite the first direction. In this manner, the engaged portion of the second strap 230 may be unwrapped from around the drum 262 as the drum 262 rotates in the second direction. When the buckle 210 is in the open configuration, the portion of the second strap 230 extending between the second hook 237 and the drum 262 may be pulled away from the drum 262, such that at least a portion of the remainder of the second strap 230 is pulled through the slot 268 and removed from the drum 262. Once a sufficient amount of tension has been removed from the straps 220, 230, the first strap 220 (or the first hook 227) may be detached from the cargo item C, and the second hook 237 may be detached from the support structure S.

FIGS. 3A-3F illustrate a slack compensator 300 in accordance with one or more embodiments of the disclosure, as may be used with the tie-down assembly 200 or the tie-down assembly 100 described above. As shown, the slack compensator 300 may be formed as an elongated structure having a first end 301, a second end 302, a first side 303, a second side 304, a top 305, and a bottom 306. The slack compensator 300 may include a first side member 313 extending along the first side 303 from the first end 301 to the second end 302, and a second side member 314 extending along the first side 303 from the first end 301 to the second end 302. As shown, the slack compensator 300 also may include a plurality of transverse members 315 extending transverse to the side members 313, 314 and connected thereto. The transverse members 315 may be spaced apart from one another to define a plurality of apertures 316 therebetween, as shown. The slack compensator 300 may be formed of an elastomeric material, such as an elastic urethane. In this manner, the slack compensator 300 may be moved or transitioned between a natural, undeformed configuration, as shown in FIGS. 3A-3E, and a deformed configuration, as shown in FIG. 3F. In certain embodiments, as shown, the side members 313, 314 and the transverse members 315 may be integrally formed with one another, for example, by molding the slack compensator 300.

During use of the slack compensator 300 with the tie-down assembly 200, the first strap 220 may be fed through the apertures 316 as shown in FIGS. 3D-3F. In this manner, a portion of the first strap 220 initially may be arranged in a zig-zag pattern through the slack compensator 300, as shown in FIG. 3E, upon initial tightening of the second strap 230 before the buckle 210 is moved from the unlocked configuration to the locked configuration. The slack compensator 300 therefore may create a desired amount of slack in the first strap 220, as shown. When the buckle 210 is moved from the unlocked configuration to the locked configuration, such movement may cause the slack compensator 300 to move from the natural, undeformed configuration to the deformed configuration, as shown in FIG. 3F. In this manner, the slack in the first strap 220 may be removed and the slack compensator 300 may be deformed. In certain embodiments, as shown, the slack compensator 300 thus may provide the desired amount of slack in the first strap 220 to allow for optimal locking of the buckle 210 and the overall tie-down assembly 200, as described above. Further, the elastic tension provided by the slack compensator 300 in the deformed configuration may facilitate the over-center locking function of the buckle 210 and the overall tie-down assembly 200 described above. Overall, the slack compensator 300 may be used with or as a part of the tie-down assembly 200 to enhance ease of use, provide the desired amount of slack in the first strap 220, and ensure optimal locking of the tie-down assembly 200 in the locked configuration. It will be appreciated that FIGS. 3A-3F illustrate merely one example configuration of the slack compensator 300, and that other configurations may be used in other embodiments. Further, it will be appreciated that the slack compensator 300 may be used with the tie-down assembly 100 in a similar manner in other embodiments.

FIGS. 4A-4F illustrate a slack compensator 400 in accordance with one or more embodiments of the disclosure, as may be used with the tie-down assembly 200 or the tie-down assembly 100 described above. As shown, the slack compensator 400 may be formed as an elongated structure having a first end 401, a second end 402, a first side 403, a second side 404, a top 405, and a bottom 406. The slack compensator 400 may include a first side member 413 extending along the first side 403 from the first end 401 to the second end 402, and a second side member 414 extending along the first side 403 from the first end 401 to the second end 402. As shown, the slack compensator 400 also may include a plurality of intermediate transverse members 415 extending transverse to the side members 413, 414 and connected thereto. The intermediate transverse members 415 may be positioned along an intermediate portion of the slack compensator 400 and spaced apart from one another to define a plurality of first apertures 416 therebetween, as shown. The slack compensator 400 also may include a plurality of end transverse members 417 extending transverse to the side members 413, 414 and connected thereto. The end transverse members 417 may be positioned at or near the respective ends 401, 402 of the slack compensator 400 and spaced apart from the intermediate transverse members 415 to define a plurality of second apertures 418 therebetween, as shown. In certain embodiments, as shown, the slack compensator 400 also may include a plurality of lower end transverse members 419 extending transverse to the side members 413, 414 and connected thereto. The lower end transverse members 419 may be positioned at or near the respective ends 401, 402 of the slack compensator 400 and spaced apart from the end transverse members 417 to define a plurality of third apertures 420 therebetween, as shown. The slack compensator 400 may be formed of an elastomeric material, such as an elastic urethane. In this manner, the slack compensator 400 may be moved or transitioned between a natural, undeformed configuration, as shown in FIGS. 4A-4E, and a deformed configuration, as shown in FIG. 4F. In certain embodiments, as shown, the side members 413, 414, the intermediate transverse members 415, the end transverse members 417, and the lower end transverse members 419 may be integrally formed with one another, for example, by molding the slack compensator 400.

During use of the slack compensator 400 with the tie-down assembly 200, the first strap 420 may be fed through the apertures 416, 416, 420, as shown in FIGS. 4D-4F. In this manner, a portion of the first strap 220 initially may be arranged in a zig-zag pattern through the slack compensator 400, as shown in FIG. 4E, upon initial tightening of the second strap 230 before the buckle 210 is moved from the unlocked configuration to the locked configuration. The slack compensator 400 therefore may create a desired amount of slack in the first strap 220, as shown. When the buckle 210 is moved from the unlocked configuration to the locked configuration, such movement may cause the slack compensator 400 to move from the natural, undeformed configuration to the deformed configuration, as shown in FIG. 4F. In this manner, the slack in the first strap 220 may be removed and the slack compensator 400 may be deformed. In certain embodiments, as shown, the slack compensator 400 thus may provide the desired amount of slack in the first strap 220 to allow for optimal locking of the buckle 210 and the overall tie-down assembly 200, as described above. Further, the elastic tension provided by the slack compensator 400 in the deformed configuration may facilitate the over-center locking function of the buckle 210 and the overall tie-down assembly 200 described above. Overall, the slack compensator 400 may be used with or as a part of the tie-down assembly 200 to enhance ease of use, provide the desired amount of slack in the first strap 220, and ensure optimal locking of the tie-down assembly 200 in the locked configuration. It will be appreciated that FIGS. 4A-4F illustrate merely one example configuration of the slack compensator 400, and that other configurations may be used in other embodiments. Further, it will be appreciated that the slack compensator 400 may be used with the tie-down assembly 100 in a similar manner in other embodiments. Certain similarities and differences between the slack compensator 400 and the slack compensator 300 described above will be appreciated by those skilled in the art. As compared to the slack compensator 300, the slack compensator 400 may provide certain advantages, such as ease of manufacturability, for example by molding, reduced overall length, and reduced mass and weight of the slack compensator, although various shapes and configurations of slack compensators may be used to achieve the functions and benefits described herein for use with various types of tie-down assemblies.

Figure 5E:
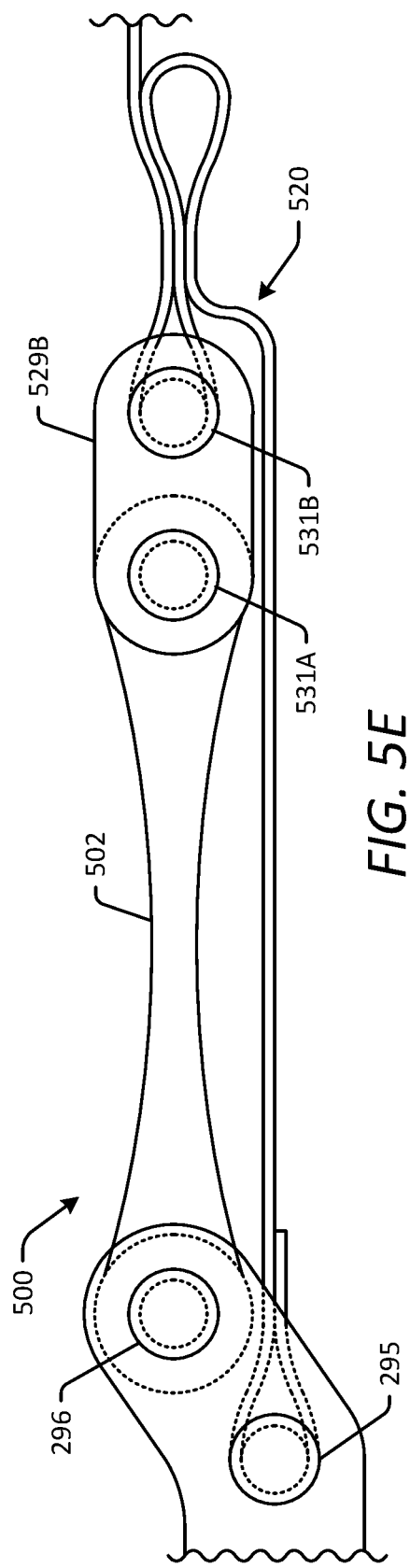
FIG. 5E is a side view of the slack compensator assembly of FIG. 5A and a portion of the tie-down assembly of FIG. 2A, showing the slack compensator in a deformed configuration.

FIGS. 5A-5E illustrate a slack compensator assembly 500 in accordance with one or more embodiments of the disclosure, as may be used with the tie-down assembly 200 or the tie-down assembly 100 described above. As shown, the slack compensator assembly 500 may include a slack compensator 502, a first strap 520, a first hook 527, and a pair of side plates 529A, 529B. The slack compensator 502 may be formed of an elastomeric material, such as an elastic urethane. In this manner, the slack compensator 502 may be moved or transitioned between a natural, undeformed configuration, as shown in FIGS. 5A-5D, and a deformed configuration, as shown in FIG. 5E. In certain embodiments, the slack compensator 502 may be formed as an elongated, generally dog-bone shaped member, although other shapes and configurations may be used. The first hook 527 may be used in a manner similar to the first hook 227 described above for connecting to a support structure or cargo, or for connecting to a loop of the first strap 520. The side plates 529A, 529B may facilitate connection of the slack compensator 502 and the first strap 520, as shown, via fasteners 531A, 531B extending through respective apertures of the slack compensator 502 and the first strap 520.

During use of the slack compensator assembly 500 with the tie-down assembly 200, the slack compensator 502 and the first strap 520, may be attached to the frame 240, as shown, via the fasteners 295, 296 extending through the respective apertures of the slack compensator 502 and the first strap 520. As shown in FIG. 5C, a desired amount of slack may be provided in the first strap 520 upon initial tightening of the second strap 230 before the buckle 210 is moved from the unlocked configuration to the locked configuration. The slack compensator assembly 500 therefore may create a desired amount of slack in the first strap 520, as shown. When the buckle 210 is moved from the unlocked configuration to the locked configuration, such movement may cause the slack compensator 502 to move from the natural, undeformed configuration to the deformed configuration, as shown in FIG. 5E. In this manner, the slack in the first strap 520 may be removed and the slack compensator 502 may be deformed. In certain embodiments, as shown, the slack compensator assembly 500 thus may provide the desired amount of slack in the first strap 520 to allow for optimal locking of the buckle 210 and the overall tie-down assembly 200, as described above. Further, the elastic tension provided by the slack compensator 502 in the deformed configuration may facilitate the over-center locking function of the buckle 210 and the overall tie-down assembly 200 described above. Overall, the slack compensator 500 may be used with or as a part of the tie-down assembly 200 to enhance ease of use, provide the desired amount of slack in the first strap 520, and ensure optimal locking of the tie-down assembly 200 in the locked configuration. It will be appreciated that FIGS. 5A-5E illustrate merely one example configuration of the slack compensator assembly 500, and that other configurations may be used in other embodiments. Further, it will be appreciated that the slack compensator assembly 500 may be used with the tie-down assembly 100 in a similar manner in other embodiments.

Many modifications of the embodiments of the present disclosure will come to mind to one skilled in the art to which the disclosure pertains upon having the benefit of the teachings presented herein through the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A tie-down assembly comprising:
  a buckle comprising:
    a frame;
    a handle pivotably attached to the frame and configured to pivot about a first axis between an open position and a closed position; and
    a drum rotatably attached to the handle and configured to rotate about a second axis, wherein the second axis is spaced apart from and extends parallel to the first axis;
  a first strap attached to the frame; and
  a second strap configured to removably attach to the drum;
  wherein the drum comprises a first bar and a second bar spaced apart from one another and defining a slot therebetween, and wherein the second strap is configured to pass through the slot.

2. The tie-down assembly of claim 1, wherein the frame comprises a first side plate and a second side plate spaced apart from one another, and wherein the handle is pivotably attached to the first side plate and the second side plate via one or more fasteners.

3. The tie-down assembly of claim 1, wherein the first bar comprises a curved outer surface having a variable radius of curvature.

4. The tie-down assembly of claim 3, wherein the curved outer surface comprises a first portion having a first radius and a second portion having a second radius, wherein the first radius is less than the second radius.

5. The tie-down assembly of claim 1, wherein the buckle further comprises:
  a first end plate attached to a first end of the drum;
  a second end plate attached to a second end of the drum;
  a first link arm pivotably attached to each of the frame and the first end plate; and
  a second link arm pivotably attached to each of the frame and the second end plate.

6. The tie-down assembly of claim 5, wherein the first link arm and the second link arm are configured to pivot relative to the frame about a third axis, and wherein the third axis is spaced apart from and extends parallel to the first axis.

7. The tie-down assembly of claim 6, wherein the first link arm is configured to pivot relative to the first end plate about a fourth axis, wherein the second link arm is configured to pivot relative to the second end plate about the fourth axis, and wherein the fourth axis is spaced apart from and extends parallel to the second axis.

8. The tie-down assembly of claim 1, wherein the drum is configured to rotate about the second axis in a first direction when the handle is pivoted from the open position to the closed position, and wherein the drum is configured to rotate about the second axis in a second direction opposite the first direction when the handle is pivoted from the closed position to the open position.

9. The tie-down assembly of claim 1, wherein the buckle further comprises:
a first bearing attached to the handle and positioned about a first end portion of the drum; and
a second bearing attached to the handle and positioned about a second end portion of the drum.

10. The tie-down assembly of claim 1, wherein the buckle further comprises a latch rotatably attached to the handle and configured to rotate between a locked position and an unlocked position, and wherein the latch is configured to releasably engage the frame when the handle is in the closed position.

11. The tie-down assembly of claim 10, wherein the latch comprises a locking member configured to releasably engage the frame when the handle is in the closed position.

12. The tie-down assembly of claim 10, wherein the buckle further comprises a biasing member attached to each of the handle and the latch and configured to bias the latch toward the locked position.

13. The tie-down assembly of claim 1, further comprising:
a first hook attached to an end of the first strap; and
a second hook attached to an end of the second strap.

14. The tie-down assembly of claim 1, wherein the buckle further comprises a latch rotatably attached to the frame and configured to rotate between a locked position and an unlocked position, and wherein the latch is configured to releasably engage the handle when the handle is in the closed position.

15. The tie-down assembly of claim 14, wherein the handle comprises a notch, and wherein the latch comprises a locking member configured to releasably engage the notch when the handle is in the closed position.

16. The tie-down assembly of claim 14, wherein the buckle further comprises a biasing member attached to each of the frame and the latch and configured to bias the latch toward the locked position.

17. A buckle for a tie-down assembly, the buckle comprising:
a frame;
a handle pivotably attached to the frame and configured to pivot about a first axis between an open position and a closed position; and
a drum rotatably attached to the handle and configured to rotate about a second axis, wherein the second axis is spaced apart from and extends parallel to the first axis;
wherein the drum comprises a first bar and a second bar spaced apart from one another and defining a slot therebetween, and wherein the second strap is configured to pass through the slot.

18. The buckle of claim 17, wherein the frame comprises a first side plate and a second side plate spaced apart from one another, and wherein the handle is pivotably attached to the first side plate and the second side plate via one or more fasteners.

19. The buckle of claim 17, wherein the first bar comprises a curved outer surface having a variable radius of curvature.

20. The buckle of claim 19, wherein the curved outer surface comprises a first portion having a first radius and a second portion having a second radius, wherein the first radius is less than the second radius.

21. The buckle of claim 17, further comprising:
a first end plate attached to a first end of the drum;
a second end plate attached to a second end of the drum;
a first link arm pivotably attached to each of the frame and the first end plate; and
a second link arm pivotably attached to each of the frame and the second end plate.

22. The buckle of claim 21, wherein the first link arm and the second link arm are configured to pivot relative to the frame about a third axis, and wherein the third axis is spaced apart from and extends parallel to the first axis.

23. The buckle of claim 22, wherein the first link arm is configured to pivot relative to the first end plate about a fourth axis, wherein the second link arm is configured to pivot relative to the second end plate about the fourth axis, and wherein the fourth axis is spaced apart from and extends parallel to the second axis.

24. The buckle of claim 17, wherein the drum is configured to rotate about the second axis in a first direction when the handle is pivoted from the open position to the closed position, and wherein the drum is configured to rotate about the second axis in a second direction opposite the first direction when the handle is pivoted from the closed position to the open position.

25. The buckle of claim 17, further comprising:
a first bearing attached to the handle and positioned about a first end portion of the drum; and
a second bearing attached to the handle and positioned about a second end portion of the drum.

26. The buckle of claim 17, further comprising a latch rotatably attached to the handle and configured to rotate between a locked position and an unlocked position, and wherein the latch is configured to releasably engage the frame when the handle is in the closed position.

27. The buckle of claim 26, wherein the latch comprises a locking member configured to releasably engage the frame when the handle is in the closed position.

28. The buckle of claim 26, further comprising a biasing member attached to each of the handle and the latch and configured to bias the latch toward the locked position.

29. The buckle of claim 17, further comprising a latch rotatably attached to the frame and configured to rotate between a locked position and an unlocked position, and wherein the latch is configured to releasably engage the handle when the handle is in the closed position.

30. The buckle of claim 29, wherein the handle comprises a notch, and wherein the latch comprises a locking member configured to releasably engage the notch when the handle is in the closed position.

31. The buckle of claim 29, further comprising a biasing member attached to each of the frame and the latch and configured to bias the latch toward the locked position.

32. A tie-down assembly comprising:
a buckle comprising:
a frame comprising a first side plate and a second side plate spaced apart from one another;
a handle pivotably attached to each of the first side plate and the second side plate and configured to pivot about a first axis between an open position and a closed position;
a drum rotatably attached to the handle and configured to rotate about a second axis, wherein the second axis is spaced apart from and extends parallel to the first axis;
a first end plate attached to a first end of the drum;
a second end plate attached to a second end of the drum;
a first link arm pivotably attached to each of the first side plate and the first end plate; and a second link arm pivotably attached to each of the second side plate and the second end plate;
a first strap attached to the frame;
a first hook attached to an end of the first strap;
a second strap configured to removably attach to the drum; and
a second hook attached to an end of the second strap.

33. A buckle for a tie-down assembly, the buckle comprising:
a frame;
a handle pivotably attached to the frame and configured to pivot about a first axis between an open position and a closed position; and
a drum rotatably attached to the handle and configured to rotate about a second axis, wherein the second axis is spaced apart from and extends parallel to the first axis;
a first end plate attached to a first end of the drum;
a second end plate attached to a second end of the drum;
a first link arm pivotably attached to each of the frame and the first end plate; and
a second link arm pivotably attached to each of the frame and the second end plate.

34. A buckle for a tie-down assembly, the buckle comprising:
a frame;
a handle pivotably attached to the frame and configured to pivot about a first axis between an open position and a closed position; and
a drum rotatably attached to the handle and configured to rotate about a second axis, wherein the second axis is spaced apart from and extends parallel to the first axis;
a first bearing attached to the handle and positioned about a first end portion of the drum; and
a second bearing attached to the handle and positioned about a second end portion of the drum.

35. A buckle for a tie-down assembly, the buckle comprising:
a frame;
a handle pivotably attached to the frame and configured to pivot about a first axis between an open position and a closed position; and
a drum rotatably attached to the handle and configured to rotate about a second axis, wherein the second axis is spaced apart from and extends parallel to the first axis; and
a latch rotatably attached to the handle and configured to rotate between a locked position and an unlocked position, and wherein the latch is configured to releasably engage the frame when the handle is in the closed position.

* * * * *